United States Patent
Cooper et al.

(10) Patent No.: US 10,700,970 B2
(45) Date of Patent: *Jun. 30, 2020

(54) DATA COMMUNICATION SYSTEM AND METHOD

(71) Applicant: GE Global Sourcing LLC, Norwalk, CT (US)

(72) Inventors: Jared Klineman Cooper, Palm Bay, FL (US); Todd William Goodermuth, Melbourne, FL (US); Mark Bradshaw Kraeling, Melbourne, FL (US); David Allen Eldredge, Melbourne, FL (US); Samuel William Golden, Melbourne, FL (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/918,267

(22) Filed: Mar. 12, 2018

(65) Prior Publication Data

US 2018/0205650 A1 Jul. 19, 2018

Related U.S. Application Data

(63) Continuation of application No. 15/238,501, filed on Aug. 16, 2016, now Pat. No. 9,917,773, which is a (Continued)

(51) Int. Cl.
*H04L 12/741* (2013.01)
*H04L 29/08* (2006.01)
(Continued)

(52) U.S. Cl.
CPC ............. *H04L 45/74* (2013.01); *B61C 17/12* (2013.01); *B61L 15/0027* (2013.01);
(Continued)

(58) Field of Classification Search
CPC .......... H04L 45/74; H04L 67/12; H04W 4/42; H04W 4/46; H04W 4/44; H04B 3/546;
(Continued)

(56) References Cited

U.S. PATENT DOCUMENTS 6,283,765 B1   9/2001   Lumbis et al.
6,435,624 B1   8/2002   Kull et al.
(Continued)

FOREIGN PATENT DOCUMENTS

CN   1630596 A     6/2005
CN   1740020 A     3/2006
CN   201044455 Y   4/2008

OTHER PUBLICATIONS

Search Report and Written Opinion for corresponding Brazilian Application No. PI1000932-9 published Aug. 20, 2019.

*Primary Examiner* — Russell Frejd
(74) *Attorney, Agent, or Firm* — Christopher R. Carroll; The Small Patent Law Group LLC

(57) ABSTRACT

A controller in a vehicle consist is configured to receive data of measured brake system characteristics of a first vehicle of the consist and one or more remote vehicles of the consist. The controller is configured to communicate with the remote vehicles for coordinated travel along a route based on the received data. The controller is configured to switch from communicating with the remote vehicles, and receiving the brake system data from the remote vehicles, over a first wireless channel to a second wireless channel responsive to when the first wireless channel becomes unavailable.

18 Claims, 31 Drawing Sheets

Related U.S. Application Data continuation-in-part of application No. 14/633,255, filed on Feb. 27, 2015, now Pat. No. 9,637,147, which is a continuation-in-part of application No. 14/566,344, filed on Dec. 10, 2014, now Pat. No. 9,379,775, which is a continuation of application No. 14/154,373, filed on Jan. 14, 2014, now Pat. No. 8,935,022, which is a continuation-in-part of application No. 13/189,944, filed on Jul. 25, 2011, now Pat. No. 8,798,821, and a continuation-in-part of application No. 13/523,967, filed on Jun. 15, 2012, now abandoned, and a continuation-in-part of application No. 12/948,053, filed on Nov. 17, 2010, now abandoned, and a continuation-in-part of application No. 13/168,482, filed on Jun. 24, 2011, now abandoned, and a continuation-in-part of application No. 13/186,651, filed on Jul. 20, 2011, now abandoned, and a continuation-in-part of application No. 13/082,738, filed on Apr. 8, 2011, now Pat. No. 8,825,239, and a continuation-in-part of application No. 13/082,864, filed on Apr. 8, 2011, now Pat. No. 8,655,517, said application No. 13/189,944 is a continuation-in-part of application No. 12/683,874, filed on Jan. 7, 2010, now Pat. No. 8,532,850, said application No. 13/523,967 is a continuation-in-part of application No. 12/683,874, filed on Jan. 7, 2010, now Pat. No. 8,532,850, said application No. 13/082,738 is a continuation-in-part of application No. 12/891,938, filed on Sep. 28, 2010, now Pat. No. 8,457,815, and a continuation-in-part of application No. 12/891,936, filed on Sep. 28, 2010, now Pat. No. 8,702,043, and a continuation-in-part of application No. 12/891,925, filed on Sep. 28, 2010, now Pat. No. 8,423,208, said application No. 13/082,864 is a continuation-in-part of application No. 12/891,938, filed on Sep. 28, 2010, now Pat. No. 8,457,815, and a continuation-in-part of application No. 12/891,936, filed on Sep. 28, 2010, now Pat. No. 8,702,043, and a continuation-in-part of application No. 12/891,925, filed on Sep. 28, 2010, now Pat. No. 8,423,208, said application No. 13/082,864 is a continuation-in-part of application No. 12/891,938, filed on Sep. 28, 2010, now Pat. No. 8,457,815, and a continuation-in-part of application No. 12/891,936, filed on Sep. 28, 2010, now Pat. No. 8,702,043, and a continuation-in-part of application No. 12/891,925, filed on Sep. 28, 2010, now Pat. No. 8,423,208, application No. 15/918,267, filed on Mar. 12, 2018, which is a continuation-in-part of application No. 12/212,079, filed on Sep. 17, 2008, now Pat. No. 9,419,816, said application No. 15/238,501 is a continuation-in-part of application No. 13/493,315, filed on Jun. 11, 2012, now abandoned.

(60) Provisional application No. 61/382,765, filed on Sep. 14, 2010, provisional application No. 61/160,930, filed on Mar. 17, 2009, provisional application No. 61/498,152, filed on Jun. 17, 2011, provisional application No. 61/346,448, filed on May 19, 2010, provisional application No. 61/361,702, filed on Jul. 6, 2010, provisional application No. 61/086,144, filed on Aug. 4, 2008, provisional application No. 61/495,878, filed on Jun. 10, 2011.

(51) Int. Cl.
| | |
|---|---|
| *H04W 4/42* | (2018.01) |
| *B61L 15/00* | (2006.01) |
| *H04B 3/00* | (2006.01) |
| *H04B 3/54* | (2006.01) |
| *B61C 17/12* | (2006.01) |
| *H04W 4/44* | (2018.01) |
| *H04W 4/46* | (2018.01) |

(52) U.S. Cl.
CPC ....... *B61L 15/0036* (2013.01); *B61L 15/0072* (2013.01); *H04B 3/00* (2013.01); *H04B 3/546* (2013.01); *H04B 3/548* (2013.01); *H04L 67/12* (2013.01); *H04W 4/42* (2018.02); *H04W 4/44* (2018.02); *H04W 4/46* (2018.02); *H04B 2203/5445* (2013.01)

(58) Field of Classification Search
CPC .. H04B 3/548; H04B 3/00; H04B 2203/5445; B61C 17/12; B61L 15/0036; B61L 15/0027; B61L 15/0072
See application file for complete search history.

(56) References Cited

U.S. PATENT DOCUMENTS

| | | |
|---|---|---|
| 7,618,011 B2 | 11/2009 | Oleski et al. |
| 2006/0025903 A1 | 2/2006 | Kumar |
| 2006/0170285 A1 | 8/2006 | Morimitsu et al. |

DATA COMMUNICATION SYSTEM AND METHOD

CROSS-REFERENCE TO RELATED APPLICATIONS

This application is a continuation of U.S. application Ser. No. 15/238,501, filed Aug. 16, 2016, which is a continuation-in-part of U.S. application Ser. No. 14/633,255, filed Feb. 27, 2015 and issued as U.S. Pat. No. 9,637,147 on May 2, 2017, which is a continuation-in-part of U.S. patent application Ser. No. 14/566,344, filed Dec. 10, 2014 (the "'344 Application") and issued as U.S. Pat. No. 9,379,775 on Jun. 28, 2016, which is a continuation of U.S. patent application Ser. No. 14/154,373, filed Jan. 14, 2014 (the "'373 Application")(now U.S. Pat. No. 8,935,022 issued Jan. 15, 2015), which is a continuation-in-part of U.S. patent application Ser. No. 13/189,944 (the "'944 Application"), U.S. patent application Ser. No. 13/523,967 (the "'967 Application"), U.S. patent application Ser. No. 12/948,053 (the "'053 Application"), U.S. patent application Ser. No. 13/168,482 (the "'482 Application"), U.S. patent application Ser. No. 13/186,651 (the "'651 Application"), U.S. patent application Ser. No. 13/082,738 (the "'738 Application"), and U.S. patent application Ser. No. 13/082,864 (the "'864 Application").

The '944 Application, entitled "System And Method For Communicating Data In A Locomotive Consist Or Other Vehicle Consist," was filed on Jul. 25, 2011, and is now U.S. Pat. No. 8,798,821 issued Aug. 5, 2014. The '944 Application is a continuation-in-part of U.S. patent application Ser. No. 12/683,874, which is entitled "System And Method For Communicating Data In Locomotive Consist Or Other Vehicle Consist" and was filed on Jan. 7, 2010 (the "'874 Application"), now U.S. Pat. No. 8,532,850 issued Sep. 10, 2013, which claims priority to U.S. Provisional Application Ser. No. 61/160,930, which was filed on Mar. 17, 2009 (the "'930 Application"). The '944 Application also claims priority to U.S. Provisional Application Ser. No. 61/382,765, filed on Sep. 14, 2010 (the "'765 Application").

The '967 Application, entitled "System And Method For Communicating Data In A Passenger Vehicle Or Other Vehicle Consist," was filed on Jun. 15, 2012, and is now abandoned. The '967 Application claims priority to U.S. Provisional Patent Application Ser. No. 61/498,152, which was filed Jun. 17, 2011 (the "'152 Application"). The '967 Application is also a continuation-in-part of the '874 Application, which claims priority to the '930 Application.

The '053 Application, entitled "Methods And Systems For Data Communications," was filed Nov. 17, 2010, and is now abandoned.

The '482 Application, entitled "System And Method For Communicating With A Wayside Device," was filed Jun. 24, 2011, and is now abandoned.

The '651 Application, entitled "Communication System And Method For A Rail Vehicle," was filed on Jul. 20, 2011, and is now abandoned.

The '738 Application, entitled "Communication System And Method For A Rail Vehicle Consist," was filed on Apr. 8, 2011, and is now U.S. Pat. No. 8,825,239 issued Sep. 2, 2014. The '738 Application claims priority to U.S. Provisional Application No. 61/346,448, filed on May 19, 2010, and to U.S. Provisional Application No. 61/361,702, filed on Jul. 6, 2010. The '738 Application also is a continuation-in-part of U.S. application Ser. No. 12/891,938, filed on Sep. 28, 2010, now U.S. Pat. No. 8,457,815 issued Jun. 4, 2013, and of U.S. application Ser. No. 12/891,936, filed on Sep. 28, 2010 and now U.S. Pat. No. 8,702,043 issued Apr. 22, 2014, and of U.S. application Ser. No. 12/891,925, filed on Sep. 28, 2010, now U.S. Pat. No. 8,423,208 issued Apr. 16, 2013.

The '864 Application, entitled "Communication System And Method For A Rail Vehicle Consist," was filed on Apr. 8, 2011, and is now U.S. Pat. No. 8,655,517 issued Feb. 18, 2014. The '864 Application claims priority to U.S. Provisional Application No. 61/346,448 filed on May 19, 2010 and to U.S. Provisional Application No. 61/361,702, filed on Jul. 6, 2010. The '864 Application also is a continuation-in-part of U.S. application Ser. No. 12/891,938, filed on Sep. 28, 2010, now U.S. Pat. No. 8,457,815 issued Jun. 4, 2013, and of U.S. application Ser. No. 12/891,936, filed on Sep. 28, 2010 and now U.S. Pat. No. 8,702,043 issued Apr. 22, 2014, and of U.S. application Ser. No. 12/891,925, filed on Sep. 28, 2010, now U.S. Pat. No. 8,423,208 issued Apr. 16, 2013.

This application also is a continuation-in-part of U.S. application Ser. No. 12/212,079 filed Sep. 17, 2008 ("the '079 Application") and issued as U.S. Pat. No. 9,419,816 on Aug. 16, 2016, which claims priority to U.S. Provisional Application No. 61/086,144 filed Aug. 4, 2008.

This application also is continuation in part of U.S. application Ser. No. 13/493,315, filed Jun. 11, 2012 ("the '315 Application") and now abandoned, which claims priority to U.S. provisional application Ser. No. 61/495,878, filed Jun. 10, 2011.

The entire disclosures of the above applications (e.g., the '373 Application, '944 Application, the '967 Application, the '053 Application, the '482 Application, the '874 Application, the '930 Application, the '765 Application, the '152 Application, the '651 Application, the '738 Application, the '864 Application, the '079 Application, the '315 Application, etc.) are incorporated by reference herein in their entireties.

TECHNICAL FIELD

Embodiments of the invention relate to data communications. Other embodiments relate to data communications in a vehicle or vehicle consist.

DISCUSSION OF ART

A vehicle consist is a group of two or more vehicles that are mechanically coupled or otherwise linked via communication to travel together along a route. Trains may have one or more vehicle consists. Vehicles in a consist include a lead vehicle and one or more trail or remote vehicles. Examples of vehicles that may be used in a consist include locomotives, passenger vehicles, marine vessels, or mining equipment. The vehicles of a passenger train, for example, may be fitted with electrical power for lighting, and optional electric or pneumatic door systems, passenger information systems (public address or signage), alarm systems, and equipment for performing other specialized functions. A train may have at least one lead consist, and may also have one or more remote consists positioned further back in the train.

In a locomotive consist, each locomotive may include a connection at each end of each locomotive to couple the power and brake systems of one locomotive to one or more adjacent locomotives such that they function together as a single unit. Each locomotive may be connected to subsequent locomotives via a cable. Likewise, passenger vehicles in a passenger vehicle consist may be connected via a cable.

The cable that connects these consists may be referred to in the industry as a multiple unit cable or "MU" cable. The MU cable may be a port and jumper cable that may include about twenty-seven pins on each end. The MU cable may include an electrical power transmission line, such that electrical power may be distributed from a locomotive, control cab, or other passenger vehicle in consist to the other vehicles in consist. The MU cable may provide electrical power to run electronics or other systems on-board the vehicles, such as the lighting, automatic door systems, passenger information systems, alarm systems, and/or the like.

Two or more of the vehicles in consist may each include an on-board controller or other electronics. In some cases, it may be desirable to link the on-board electronics together as a computer network, such that electronics of the lead vehicle (e.g., locomotive, control cab, or passenger vehicle) in consist can communicate with electronics of the other vehicles in consist.

Heretofore, communications in a locomotive consist were realized using various methods. A first method involves wireless communications between the vehicles in consist using radio equipment. Wireless communications, however, are costly to implement, and are particularly prone to cross talk between connected vehicles and vehicles not physically connected on adjacent tracks. A second method involves running dedicated network cables between the linked vehicles in consist. However, in most cases this requires retrofitting existing vehicles with additional cables, which is oftentimes cost prohibitive. Installation of additional connectors and wiring is expensive, increases downtime, and lowers reliability of consists in the train. Additionally, since the cabling is exposed in the separation space between adjacent linked vehicles, the cabling may be prone to failure if the vehicle consist is operated in harsh environmental conditions, e.g., bad weather. There is also additional labor required to connect vehicles with dedicated network cables, requiring additional training. Finally, installing additional functions or upgrading functions such as positive train control (PTC) or passenger information systems require additional connectivity which may necessitate that even more cabling may be run between the vehicles in consist, especially for older trains that are not equipped with high level function connectivity.

A consist of vehicles under multiple-unit (MU) control may be controlled from a single location, in order to coordinate the vehicles to provide power to propel the consist. The vehicles may be spread throughout the consist to provide increased efficiency and greater operational flexibility. In one example configuration, control data generated at a lead control vehicle is sent through a dedicated, narrowband radio link to other, remote vehicles, to control operation of the consist from a single location.

Under some conditions, radio transmissions between the lead vehicle and the remote vehicles may be lost or degraded. For example, on some terrain, long consist configurations lose direct line-of-sight between remote vehicles, and radio transmission signals do not properly reflect off of the surrounding terrain to reach the remote vehicles, resulting in a loss of data communication. Such periods of lost data communication may reduce performance capability, increase fuel consumption, and reduce reliability of consist operation.

Certain vehicle routes (e.g., railroad tracks) may be outfitted with wayside signal devices. Such devices may be controllable to provide information to vehicles and vehicle operators traveling along the route. For example, a traffic control signal device might be controllable to switch between an illuminated green light, an illuminated yellow light, and an illuminated red light, which might be understood in the traffic system to mean "ok to proceed," "prepare to stop," and "stop," respectively, for example.

In a first category of wayside signal device, each device is a mechanical, non-electrical signal device, which does not electrically communicate with other devices. For example, it may be the case that the mechanical signal device is mechanically interfaced with a proximate rail switching device, so that if the switching device is in a first position, the signal device is automatically mechanically controlled to be in a first state (such as a signal arm being moved to a raised position), and if the switching device is in a second, different position, the signal device is automatically mechanically controlled to be in a second, different state (such as the signal arm being moved to a lowered position).

In another category of wayside signal device, each device is provided with electrical power, but is otherwise "self-contained" and does not communicate with a centralized traffic control center or other remote location. For example, it may be the case that the wayside signal device is responsive to the current position of a local rail switching device, so that if the switching device is in a first position, a first signal light portion of the wayside signal device is automatically illuminated, and if the switching device is in a second, different position, a second light portion of the wayside signal device is illuminated.

In another category of wayside signal device, each device is provided with electrical power, and is able to communicate with a centralized traffic control center or other remote location, for control and other purposes. For example, it may be the case that an entity at the remote location is able to transmit control signals to the wayside signal device for switching between different signal aspects, and/or the wayside signal device may provide information to the remote location about its current or present signal aspect (meaning the signal aspect presented by the wayside signal device at the time the information is generated and communicated). A copper cable may be provided to transmit such control signals and information, but this is expensive due to the long distances involved and the work required for installation and maintenance.

As modern traffic systems increase in complexity, it may be desirable to increase the degree and extent to which it is possible to communicate with wayside signal devices. However, for mechanical signal devices and "self-contained"/local electrical wayside signal devices, it is not possible to communicate with the device at all, and for other signal devices, existing communication pathways (e.g., copper cables) may be insufficient.

Vehicles in a vehicle consist can report measurements of various onboard systems so that the lead vehicle can monitor states of the onboard systems. These measurements can be periodically updated so that the lead vehicle is repeatedly made aware of the state of onboard systems. During a fault or other problem, however, a component onboard the lead vehicle that is monitoring the states of other systems of the vehicle consist may lose these measurements. As one example, after an onboard computer of a lead rail vehicle re-sets or re-boots, the computer may lose the measurements of the systems onboard the trail or remote vehicles. Safety restrictions on the lead vehicle may automatically stop movement of the vehicle consist in response to such a fault, and/or prevent the lead vehicle from moving the vehicle consist until more measurements or replacement measurements are obtained, which can take a significant period of time. As a result, significant travel time may be lost.

BRIEF DESCRIPTION

In one embodiment, a method (e.g., for communicating data) includes obtaining operational data associated with one or more control systems of a vehicle consist formed by at least a first vehicle and one or more second vehicles traveling together along a route. The operational data can be obtained at the first vehicle of the vehicle consist, and can be configured to be used to determine an operational capability of the vehicle consist. The method also can include communicating the operational data from the first vehicle to at least one of the one or more second vehicles in the vehicle consist and, responsive to a loss of the operational data at the first vehicle, communicating at least the operational data that was lost at the first vehicle from at least one of the one or more second vehicles to the first vehicle. The method also can include determining, onboard the first vehicle, the operational capability of the vehicle consist to perform a movement event using the at least the operational data that was lost at the first vehicle and communicated from the at least one of the one or more second vehicles to the first vehicle.

In another embodiment, a system (e.g., a communication system) includes a transceiver unit and a memory. The transceiver unit can be configured to be disposed onboard a first vehicle of a vehicle consist formed by the first vehicle and one or more second vehicles traveling together along a route. The transceiver unit also can be configured to obtain operational data associated with one or more control systems of the vehicle consist. The operational data can be configured to be used to determine an operational capability of the vehicle consist. The memory can be configured to be disposed onboard the first vehicle and to store the operational data obtained from the one or more second vehicles in the vehicle consist. The transceiver unit also can be configured to communicate the operational data from the first vehicle to at least one of the one or more second vehicles in the vehicle consist and, responsive to a loss of the operational data from the memory onboard the first vehicle, the transceiver unit can be configured to receive at least the operational data that was lost at the first vehicle from at least one of the one or more second vehicles. A controller can be configured to be disposed onboard the first vehicle and to determine the operational capability of the vehicle consist to perform a movement event using the at least the operational data that was lost at the first vehicle and communicated from the at least one of the one or more second vehicles to the first vehicle.

In another embodiment, a system (e.g., a communication system) includes a controller and a brake sensing device. The controller can be configured to be disposed onboard a lead vehicle in a vehicle consist that includes the lead vehicle and one or more remote vehicles. The controller also can be configured to remotely control operation of the one or more remote vehicles to control movement of the vehicle consist. The brake sensing device can be configured to be disposed onboard the vehicle consist and to measure characteristic of an air brake system of the vehicle consist. The controller can be configured to store the characteristic of the air brake system that is measured by the brake sensing device and to communicate the characteristic of the air brake system to at least one of the remote vehicles for storage onboard the at least one of the remote vehicles. Responsive to a fault at the controller that causes loss of the characteristic of the air brake system at the controller of the lead vehicle, the controller can be configured to receive, from the at least one of the remote vehicles, the characteristic of the air brake system that was communicated from the controller to the at least one of the remote vehicles.

An embodiment relates to a communication method for a consist comprising a plurality of vehicles. The method includes linking the plurality of vehicles to establish a data network. For example, linking may include communicating over a communications path established between the vehicles, according to established protocols, in a manner that is designated for establishing the data network. The method further includes designating a first vehicle of the plurality of vehicles as a network lead vehicle of the data network. "Network lead vehicle" means a vehicle in the consist that is primarily responsible for controlling operations of the data network in the consist. The method further includes designating a second vehicle of the plurality of vehicles as a network trail vehicle of the data network. "Network trail vehicle" means a vehicle in the consist that is subordinate to the network lead vehicle in regards to one or more aspects of data network operation. The method further includes communicating network data between the plurality of vehicles (e.g., to/from one vehicle to/from another vehicle or vehicles) based at least in part on the first vehicle designated as the network lead vehicle and the second vehicle designated as the network trail vehicle. Thus, for example, the network lead vehicle may be responsible for setting up and maintaining network routing tables for services and/or communications in the network, and the network trail vehicle may communicate according to the network routing tables set up and maintained by the network lead vehicle.

In an embodiment where the vehicles are rail vehicles in a rail vehicle consist, the method includes linking the plurality of rail vehicles to establish a data network. The method further includes designating a first rail vehicle of the plurality of rail vehicles as a network lead rail vehicle of the data network. As with network lead vehicles more generally, "network lead rail vehicle" (e.g., network lead locomotive) refers to a locomotive or other rail vehicle in the consist that is primarily responsible for controlling operations of the data network in the consist. The method further includes designating a second rail vehicle of the plurality of rail vehicles as a network trail rail vehicle of the data network. "Network trail rail vehicle" (e.g., network trail locomotive) means a locomotive or other rail vehicle in the consist that is subordinate to the network lead rail vehicle in regards to one or more aspects of data network operation. The method further includes communicating network data between the plurality of rail vehicles based at least in part on the first vehicle designated as the network lead vehicle and the second vehicle designated as the network trail vehicle. As indicated, the rail vehicles may be locomotives.

Another embodiment relates to a communication system (e.g., for a vehicle consist) comprising a first controller unit configured for operative coupling in a first rail vehicle. The first controller unit is configured, when the first rail vehicle is linked with one or more second rail vehicles in a data network of a consist, to designate one of the first rail vehicle or one of the one or more second rail vehicles as a network lead rail vehicle of the data network and to designate all other rail vehicles in the consist as network trail rail vehicles of the data network. The first controller unit is further configured to control communications of network data between the first rail vehicle and the one or more second rail vehicles based at least in part on the network lead rail vehicle and network trail rail vehicle designations. Again, the rail vehicles may be locomotives.

In another embodiment of a communication system, the communication system includes a first controller unit configured for operative coupling in a first rail vehicle. The first controller unit is configured, when the first rail vehicle is linked with one or more second rail vehicles in a data network of a consist, to enter a first designated mode of operation responsive to communications between the first rail vehicle and the one or more second rail vehicles for selecting the first rail vehicle to operate in the first designated mode of operation and the one or more second rail vehicles to operate in a different, second designated mode of operation. The first controller unit is further configured, when in the first designated mode of operation, to at least one of: coordinate data traffic in the data network of the consist; and/or configure and manage services available to plural entities of the data network of the consist (entity referring to a device or other system or subsystem that utilizes and/or communicates network data). The rail vehicles may be locomotives.

Other embodiments relate to a system and method for managing network services and devices among a plurality of locomotives or other vehicles in a consist. For example, in one embodiment of a communication method, the method includes, in a vehicle consist comprising a plurality of vehicles connected in a data network, storing in a first vehicle of the consist a list of available services that are available across one or more of the vehicles of the consist connected in the data network. For example, the services may comprise functions that can be performed by available devices of the network, which process, communicate, or otherwise use network data. ("Available" service or device refers to a service or device that is operably connected for potentially using network data that is communicated in the data network, not necessarily that the service or device is currently operational for doing so.) The method further includes, at the first vehicle, communicating first information of the list of available services to other vehicles in the consist.

In another embodiment of a communication method in a vehicle consist comprising a plurality of vehicles linked together in a data network, the method includes monitoring plural available devices of the vehicles in the consist to determine respective operational statuses of the plural available devices. The method further includes maintaining information of the operational statuses of the plural available devices in a database, and communicating the information of the operational statuses to the plural vehicles in the consist.

In another embodiment of a communication method in a vehicle consist comprising a plurality of vehicles linked together in a data network, the method includes receiving information of respective operational statuses of plural available devices and/or services of the vehicles in the consist. The method further includes maintaining information of the operational statuses of the plural available devices and/or services in a database, communicating the information of the operational statuses to the plural vehicles in the consist, and routing data in the data network based at least in part on the information of the operational statuses.

Another embodiment relates to a communication system. The system includes a monitoring device configured for deployment on board a vehicle consist having a plurality of vehicles linked together in a data network. The monitoring device is further configured to communicate with plural available devices of the vehicles for determining respective operational statuses of the available devices. The monitoring device is further configured to store information of the operational statuses of the available devices. The system further includes a signal transmitting device configured for deployment on board the vehicle consist, and further configured to communicate the information of the operational statuses of the available devices to the plural vehicles and/or to route network data based on the information of the operational statuses of the available devices.

Another embodiment relates to a system for managing network services among locomotives or other vehicles in a consist. The system includes a first available device positioned in a first locomotive (or other first vehicle) in the consist, and a second available device positioned in a second locomotive (or other second vehicle) in the consist. The first and second available devices are at least substantially equivalent (also referred to as a substantially similar), meaning that in regards to a designated function, the devices are both capable of performing the designated function at the same performance level, or of performing the designated function not at the same performance level but within a designated performance tolerance range (e.g., 5-10%), or of performing a different function that nevertheless meets one or more operational or performance criteria of the designated function. The system further includes a monitoring device configured for deployment on one of the locomotives (or other vehicles) in the consist and to communicate with the first and second available devices. The monitoring device is further configured to determine an operational status of the first and second available devices. The system further includes a signal transmitting device configured to communicate with the first and second available devices and configured to route traffic to the first available device or the second available device when the monitoring unit determines that the other of the first available device or the second available device has entered into a failure state (meaning incapable of performing a designated function at all, or incapable of performing the designated function above designated performance level threshold(s)).

Other embodiments relate to a system and method for managing a high-availability network for a locomotive consist or other vehicle consist. (High availability refers to having a greater degree of availability, by way of communicating over plural networks and/or channels, than communicating over fewer networks and/or channels.) For example, in one embodiment of a method for communications in a vehicle consist, the method includes monitoring respective operational statuses of a plurality of network channels across a plurality of vehicles in the consist, and routing messages through one or more of the network channels in dependence upon the monitored operational statuses of the network channels.

In another embodiment, a method for communications in a vehicle consist includes monitoring respective operational statuses of a first network and a second network of the vehicle consist. The first and second networks are at least logically distinct (meaning physically different and separate, or otherwise separated by using designated communication logic, such that data can be transmitted independently through the networks). The method further includes routing messages through the first network and the second network based at least in part on the monitored operational statuses of the first network and the second network.

In another embodiment, the logically distinct networks share a common physical infrastructure while still maintaining logically and physically independent networks. Thus, if a portion of the infrastructure is nonfunctional with the first network, that portion may be operable with the second network. The two networks may employ similar or different topologies while sharing common elements such as a main-backbone. The two networks may employ different encryption and communications protocols. The two networks may use different frequencies to transmit data through common infrastructure elements. Or they may use different wires of a multi-wire cable system. In other embodiments, alternatively or additionally, the logically distinct networks utilize network data addresses (e.g., IP addresses) with different network or routing prefixes, that is, the most-significant bit-groups in their IP addresses are different from one another. As opposed to having (for example) IP addresses with the same network prefix, such as with subnetworks.

In another embodiment, a method for communications in a vehicle consist includes, at a first vehicle of the vehicle consist, transmitting and/or receiving first signals of a first network established between the first vehicle and one or more second vehicles of the vehicle consist. The method further includes, at the first vehicle, transmitting and/or receiving second signals of a second network established between the first vehicle and one or more second vehicles of the vehicle consist. The first and second networks are at least logically distinct.

Another embodiment relates to a system for communications in a vehicle consist. The system includes a routing unit (i.e., data network router) configured for communication across a first plurality of communication channels associated with a first vehicle of the vehicle consist and a second plurality of communication channels associated with a second vehicle of the vehicle consist. The routing unit is configured for deployment on board one of the first vehicle or the second vehicle. The routing unit is further configured for routing a message through at least one of the first plurality of communication channels and at least one of the second plurality of channels in dependence upon respective operational statuses of the first and second pluralities of communication channels.

Another embodiment relates to a system for managing a high-availability network for a locomotive (or other vehicle) consist. The system includes a first plurality of communication channels associated with a first locomotive and a second plurality of communication channels associated with a second locomotive. A routing unit in communication with the first and second plurality of communication channels is configured for routing a message through at least one of the first plurality of communication channels of the first locomotive and at least one of the second plurality of channels of the second locomotive in dependence upon an operational status of the first and second plurality of communication channels.

Yet other embodiments relate to a system and method for resolving a conflict between IP addresses of locomotives or other vehicles in a consist. In one embodiment of the method, it is determined that a first locomotive or other first vehicle in the consist has an IP address that is the same as an IP address of a second locomotive or other vehicle in the consist. An unused IP address is then identified and assigned to the first vehicle or to the second vehicle.

In one embodiment, a method for communications in a vehicle consist (e.g., a locomotive or other rail vehicle consist) includes determining that a first vehicle in the vehicle consist (e.g., a first locomotive or other first rail vehicle) has a network address (e.g., a first IP address) that is the same as a network address (e.g., a second IP address) of a second vehicle in the vehicle consist (e.g., a second locomotive or other second rail vehicle). The method further includes identifying an unused network address, and communicating signals for assignment of the unused network address to one of the first vehicle or the second vehicle. By referring to a vehicle having a network address, this includes: the vehicle itself having the network address associated with the vehicle; and/or that a component of the vehicle capable of network communications has the network address assigned, determined, or otherwise associated with it.

In another embodiment, a method for communications in a vehicle consist (e.g., a locomotive or other rail vehicle consist) includes determining (e.g., calculating, identifying, allocating, or the like) a first network address (e.g., a first IP address) for a first vehicle in the vehicle consist (e.g., a first locomotive or other first rail vehicle) and a second network address (e.g., a second IP address) for a second vehicle in the vehicle consist (e.g., a second locomotive or other second rail vehicle). The first vehicle and the second vehicle are linked in a data network. The method further includes identifying a conflict between the first network address and the second network address. For example, the conflict might be that the first network address is the same as the second network address. Responsive to identifying the conflict, the method further includes selecting the first vehicle for network address re-assignment (i.e., one of the first vehicle or the second vehicle is selected, and in this example it is the first vehicle that is selected). The method further includes determining a third network address that is not in conflict with the second network address of the second vehicle, and assigning the third network address to the first vehicle in place of the first network address. Data is communicated in the data network based at least in part on the second network address and the third network address.

In another embodiment, a method for communications in a vehicle consist (e.g., a locomotive or other rail vehicle consist) includes determining that a first vehicle in the vehicle consist (e.g., a first locomotive or other first rail vehicle) has a first network address that is the same as a second network address of a second vehicle in the vehicle consist (e.g., a second locomotive or other second rail vehicle). The first vehicle and the second vehicle are linked in a network. The method further includes identifying an unused network address of the network, and communicating signals for assignment of the unused network address to one of the first vehicle or the second vehicle.

Another embodiment relates to a system for communications in a vehicle consist (e.g., a locomotive or other rail vehicle consist). The system includes a conflict determination module configured for communication with a first vehicle (e.g., a first locomotive or other first rail vehicle) having a first network address (e.g., a first IP address) and a second vehicle (e.g., a second locomotive or other second rail vehicle) having a second network address (e.g., a second IP address). The conflict determination module is further configured to determine if the first network address is the same as the second network address. The system further includes a control module configured for deployment on at least one of the first vehicle or the second vehicle and further configured to identify an unused network address. The control module is configured to assign the unused network address to one of the first vehicle or the second vehicle if the conflict determination module determines that the first network address is the same as the second network address.

Any of the aforementioned embodiments are also applicable for communicating data in vehicle consists generally. "Vehicle consist" refers to a group of vehicles that are mechanically coupled or linked together to travel along a route.

In any of the embodiments set forth herein, data transmitted over the MU cable bus or other communication means may be used for locomotive or other vehicle control, such as controlling the locomotive or other vehicle for movement along a route. While this Ethernet over MU communications system may be utilized in connection with the embodiments of the invention discussed below, the embodiments are not limited to use with an Ethernet over MU system. In particular, the embodiments of the present invention discussed below may also be employed and utilized in connection with a wireless communications system such as one using radio equipment to facilitate communication between locomotives in the consist. In addition, the embodiments described below may also be used with a communication system that utilizes dedicated network cables between the linked locomotives in a consist.

DETAILED DESCRIPTION

Figure 1:
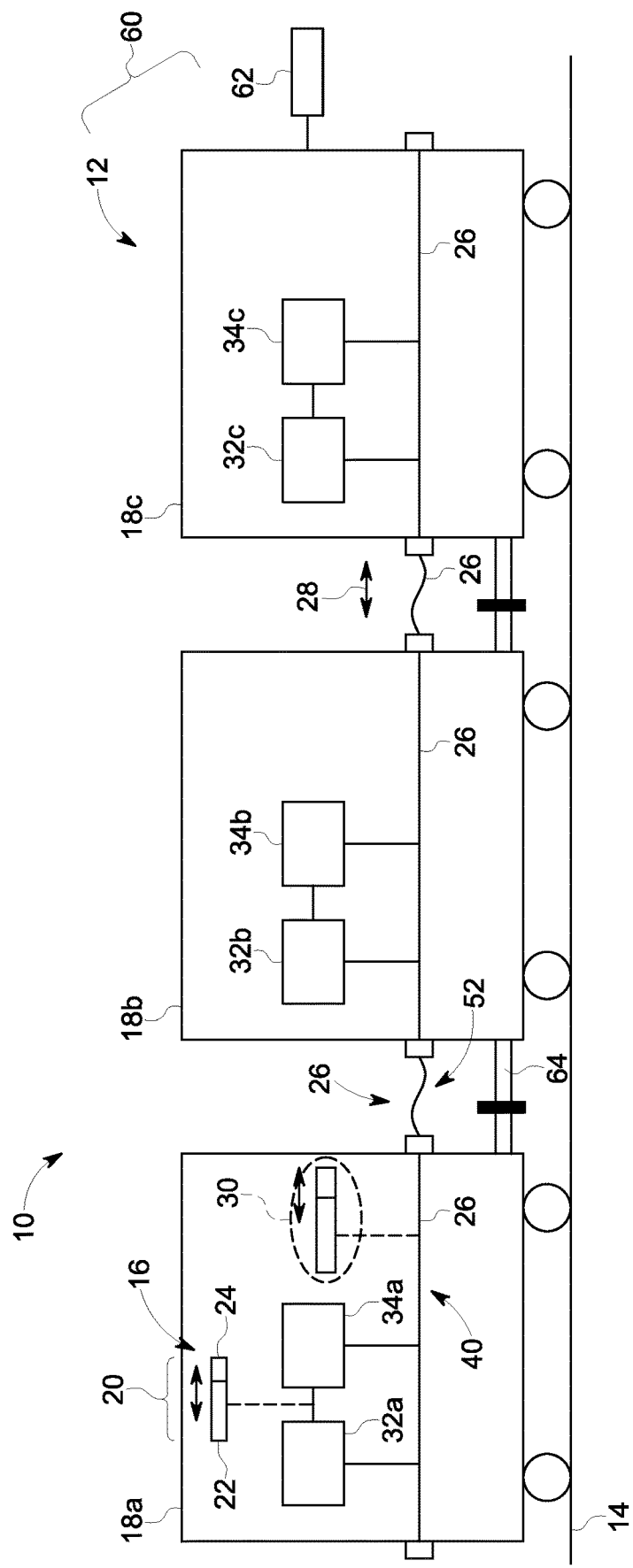
FIG. 1 is a schematic diagram of a communication system for communicating data in a vehicle consist, according to an embodiment of the invention.

Embodiments of the invention relate to data communications. Other embodiments relate to data communications in a locomotive consist or other vehicle consists.

As used herein, "consist" refers to a group of vehicles, such as rail vehicles, that are coupled or linked together (e.g., mechanically or logically coupled) to travel on a track that extends along the route of consist. Likewise, "vehicle consist" refers to a group of vehicles that are coupled or linked together to travel. In embodiments, the vehicles are mechanically linked, and in other embodiments, alternatively, the vehicles are not mechanically linked together but instead communicate with each other so that the vehicles coordinate movements and the group of vehicles moves along a route together in a coordinated manner. "Passenger vehicle" or "passenger train" means rolling stock used in public and private transit railway operations including but not limited to passenger cars, power cars, control cars, dining, sleeping, baggage cars, or mail cars in coupled or individual operation, or combinations thereof. These vehicles may be used in operations described as freight rail, passenger rail, high speed rail, commuter rail, rail transit, metro, light rail, trams, tramways, or train-tram. "Router transceiver pair" means two router transceiver units, each in a different vehicle; the two units may be logically connected, e.g., in the same network group (described below), or not.

"Network data" refers to data that is packaged in packet form, meaning a data packet that comprises a set of associated data bits. "Network data," as used herein, may include high-bandwidth data and refers to data that is packaged in packet form as data packets. Each data packet can include the network address of a recipient of the data packet. "High-bandwidth data" refers to data that is transmitted at average rates of 10 Mbit/sec or greater. High-bandwidth data may include data other than network data, such as non-network data/control information. "Non-network" control information refers to data or other information, used in the vehicle consist for control purposes, which is not packet data. In contrast, "low bandwidth" data is data transmitted at average rages of less than 10 Mbit/sec, and "very low bandwidth" data (a type of low bandwidth data) is data transmitted at average rates of 1200 bits/sec or less.

As used herein, the term "module" may include a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The modules shown in the attached figures may represent the hardware that operates based on software or hardwired instructions, the software that directs hardware to perform the operations, or a combination thereof.

As used herein, "electrical power" is to be distinguished from electrical signals, e.g., data, transmitted over the electrical power transmission line. For example, "electrical power" is non-data electricity, meaning electricity that is not used to convey information. In addition, electrical power may be in the range of multiple amperes and/or multiple thousands of watts. The term "MU cable bus" refers to the entire MU cable bus or any portion(s) thereof, e.g., terminal boards, ports, jumper cable, conduit portions, and the like. The term "cable bus" includes MU cable busses, and other information communication paths. "Wayside device" refers to a mechanically or electrically controllable device that is positioned along a rail vehicle route or other vehicle route. "Operably coupled" or "operatively coupled" can include connecting two or more components with one or more mechanical, wired, and/or wireless connections.

With reference to FIG. 1, embodiments of the invention relate to a communication system 10 and method for communicating data in a vehicle consist 12. In one embodiment, the vehicle consist is a rail vehicle consist that may include a group of locomotives that are mechanically coupled or linked together to travel along a railway 14. In another embodiment, the vehicle consist is a rail vehicle consist that may include a group of passenger vehicles that are mechanically coupled or linked together to travel along the railway.

In the system, network data 16 is transmitted from one vehicle 18a in consist (e.g., a lead vehicle 18a, such as a lead locomotive, first passenger vehicle, or control cab) to another vehicle 18b in consist (e.g., a trail vehicle 18b, such as a trail locomotive or a trail passenger vehicle for accommodating passengers). Each vehicle 18a-18c is adjacent to and mechanically coupled with another vehicle in consist such that all vehicles in consist are connected. Each data packet 20 may include a data field 22 and a network address or other address 24 uniquely associated with a computer unit or other electronic component in consist.

The network data is transmitted over a multiple unit (MU) cable bus 26. The MU cable bus is an existing electrical bus interconnecting the lead vehicle 18a and the trail vehicles 18b, 18c in consist 12. The MU cable bus may include an electrical power transmission line. The MU cable bus is used in the vehicle consist for transferring non-network control information 28 between vehicles in consist. In another aspect, non-network control information is not packet data, and does not include recipient network addresses. The MU cable bus may provide electrical power between vehicles in consist, such as to run electronics or other systems, such as lighting systems.

In another embodiment, as discussed in more detail below, the network data is converted into modulated network data 30 for transmission over the MU cable bus. The modulated network data 30 may be orthogonal to the non-network control information 28 transferred between vehicles over the MU cable bus 26, to avoid interference. At recipient/subsequent vehicles, the modulated network data 30 is received over the MU cable bus and de-modulated for use by a vehicle electronic component/unit 32a, 32b, and/or 32c. For these functions, the communication system 10 may comprise respective router transceiver units 34a, 34b, 34c positioned in the lead vehicle 18a and each of the trail vehicles 18b, 18c in the vehicle consist.

By using an existing inter-vehicle cable bus for transmitting network data, such as high-bandwidth network data, between vehicles in consist, the system and method of the present inventive subject matter avoids interference and other problems associated with wireless transmissions, and obviates the need to specially outfit the vehicles with dedicated network cables. In addition, the system and method of the present inventive subject matter obviate the need to run additional cabling between the vehicles to provide for the installation of additional functions or upgrading functions that require additional connectivity, especially on trains that are not already equipped with some form of high level function connectivity.

In an embodiment, the transmission of data over the existing MU cable bus interconnecting the vehicles 18*a*-18*c* of consist allows for the availability of additional functions or for upgrading functions such as positive train control (PTC), automatic door systems, and passenger/public information systems on the vehicle consist. Examples of higher level functions or features are described hereinafter. For example, one of the electronic components 32*a*-32*c* may be configured to measure a length of the vehicle consist by measuring at least one event between a front vehicle and a rear vehicle in consist. In another embodiment, one or more of the electronic components 32*a*-32*c* may assess consist integrity through continuous or polling communications with a rearward-disposed vehicle in consist, determine a position of one or more vehicles in consist by synchronizing one or more measured events between selected vehicles in consist, and/or determine a distance between selected vehicles, such as a first and second vehicle. In addition, the system may poll individual vehicles that may be equipped with an electronic component 32*a*-32*c* through the transmission of signals/data over the cable bus.

In another embodiment, one or more of the electronic components may transmit video data over the MU cable bus (as a video data stream) and to display or process the video data for clearing doors at an unload/load platform such that passengers may unload from and/or load onto the vehicles while being safely monitored. In another embodiment, one or more of the electronic components may be configured or controlled to access one or more of redundant communications, public information systems and train control equipment over the cable bus. The controlling of public information systems may include controlling PA systems, e.g., linking speakers such that information or commands may be automatically broadcast to all or select locomotives at desired times. In addition, the controlling of public information systems may include the controlling of alarms at one or more of the vehicles from another of the vehicles, such as a lead locomotive or control cab.

Through the linking of the vehicles through the cable bus, and the transmission of data thereover, access to redundant communications may be provided. In an embodiment, an electronic component, e.g., electronic component 32*a*, can determine that another electronic component, such as a PA system on another vehicle, is in a failure state. A failure state is where the electronic component is unable to perform its function. Accordingly, the system, through data transmission over the cable bus, may determine when another electronic component is in a failure state, and can then transmit data in the form of commands, e.g., from a data transmitter module, to another electronic component on a different vehicle that is capable of performing the same function, such that functionality of the failed component is not lost throughout the entire consist. This same redundant communications functionality may also be used for train control equipment. In an embodiment, the system may be able to link, in a communications sense, a front control cab and a rear control cab. Accordingly, as a result of the transmission of data over the existing cable bus, in an embodiment, the system may provide for enhanced feature availability when driving from a rear control cab, without having to retrofit consist with other cabling, wires or the like.

In an embodiment, the transmission of data across the cable bus permits the implementation of higher function systems and control features with minimum effort and expense, e.g., without having to install additional wires, cables, connectors, and the like. Moreover, this higher-level functionality may even be added to older cars that do not have higher-level function connectivity by utilizing only the vehicle-to-vehicle power connections, i.e., the existing cable bus.

Figure 2:
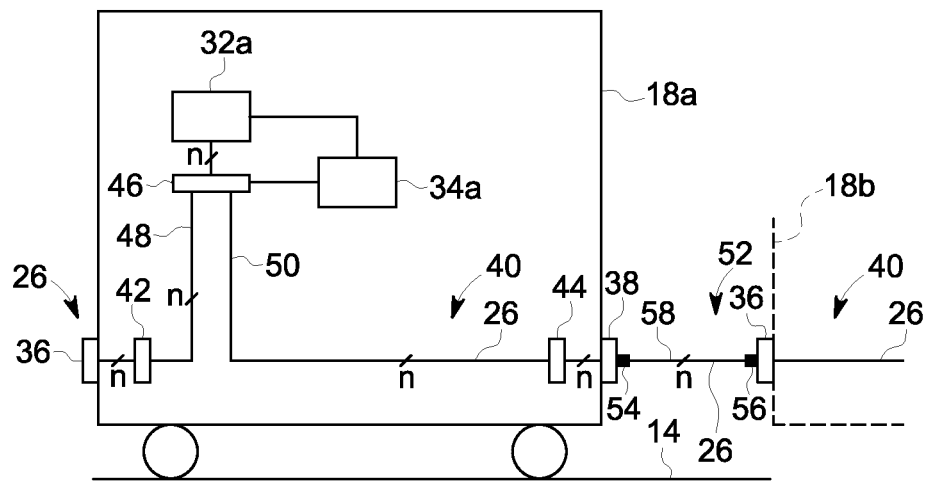
FIG. 2 is a schematic diagram of an MU cable bus in a vehicle, shown in the context of the communication system of FIG. 1.

A schematic diagram illustrating the path of the cable bus is shown in FIG. 2. Other configurations are possible, depending on the type of vehicle involved. As noted above, the cable bus may be an existing electrical bus interconnecting the lead vehicle 18*a* and the trail vehicles in consist. The cable bus may include an electrical power transmission line. In each vehicle, e.g., the lead vehicle 18*a* as shown in FIG. 2, the cable bus may include or be coupled to a front MU port 36, a rear MU port 38, and an internal MU electrical system 40 that connects the front port 36 and the rear port 38 to one or more electronic components 32*a* of the vehicle 18*a*. In the illustrated example, the internal MU electrical system 40 comprises a front terminal board 42 electrically connected to the front MU port 36, a rear terminal board 44 electrically connected to the rear MU port 38, a central terminal board 46, and first and second electrical conduit portions 48, 50 electrically connecting the central terminal board 46 to the front terminal board 42 and the rear terminal board 44, respectively. The one or more electronic components 32*a* of the lead vehicle 18*a* may be electrically connected to the central terminal board 46, and thereby to the MU cable bus 26 generally. Although the front MU port 36 and rear MU port 38 may be located generally at the front and rear of the vehicle 18*a*, this is not always the case, and designations such as "front," "rear," "central," etc. are not meant to be limiting but are instead provided for identification purposes.

Figure 3:
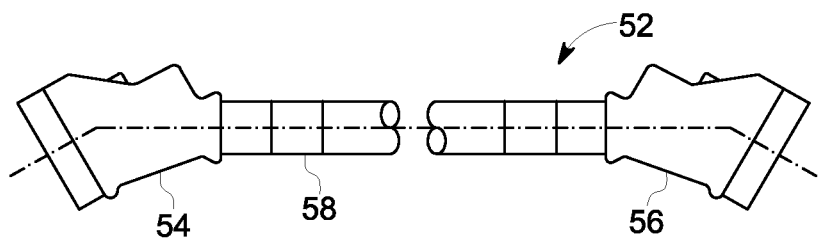
FIGS. 3 and 7 are schematic diagrams of MU cable jumpers.

As shown in FIGS. 2 and 3, the MU cable bus 26 further comprises an MU cable jumper 52. The jumper may include first and second plug ends 54, 56 and a flexible cable portion 58 electrically and mechanically connecting the plug ends together. The plug ends 54, 56 fit into the MU ports 36, 38. The MU cable jumper may be electrically symmetrical, meaning either plug end can be attached to either port. The MU cable jumper may be used to electrically interconnect the internal MU electrical systems 40 of adjacent vehicles 18*a*, 18*b*. As such, for each adjacent pair of vehicles 18*a*, 18*b*, one plug end of an MU cable jumper is attached to the rear MU port 38 of the front vehicle 18*a*, and the other plug end 56 of the MU cable jumper is attached to the front MU port 36 of the rear vehicle 18*b*. The flexible cable portion 58 of the MU cable jumper extends between the two plug ends, providing a flexible but secure electrical connection between the two vehicles.

Depending on the particular type and configuration of vehicle, the electrical conduit portions 48, 50 and MU cable jumpers may be configured in different manners, in terms of the number "n" ("n" is a real whole number equal to or greater than 1) and type of discreet electrical pathways included in the conduit or jumper. In one example, each conduit portion 48, 50 and the jumper cable portion 58 may include a plurality of discreet electrical wires, such as 12-14 gauge copper wires. In another example, the cable portion (of the MU cable jumper) may include a plurality of discreet electrical wires, while the conduit portions 48, 50 each include one or more discreet electrical wires and/or non-wire electrical pathways, such as conductive structural components of the vehicle, pathways through or including electrical or electronic components, circuit board traces, or the like. Although certain elements in FIG. 2 are shown as including "n" discreet electrical pathways, it should be appreciated that the number of discreet pathways in each element may be different, i.e., "n" may be the same or different for each element.

As noted, the plug ends of the MU cable jumper fit into the MU ports 36, 38. For this purpose, the plug ends and MU ports are complementary in shape to one another, both for mechanical and electrical attachment. The plug end may include a plurality of electrical pins, each of which fits into a corresponding electrical socket in an MU port. The number of pins and sockets may depend on the number of discreet electrical pathways extant in the internal electrical conduits, MU cable jumpers, etc. In one example, each plug end is a twenty seven-pin plug.

The central terminal board 46, front terminal board 42, and rear terminal board 44 each comprise an insulating base (attached to the vehicle) on which terminals for wires or cables have been mounted. This provides flexibility in terms of connecting different electronic components to the MU cable bus. In one embodiment the electronic component may include a digital subscriber line access multiplexer (DSLAM) unit.

The cable bus may transfer non-network control information 28 between vehicles 18a, 18b, 18c in consist. In this instance, non-network control information may include to data or other information, used in the vehicle consist for control purposes, which is not packet data. In another example, non-network control information is not packet data, and does not include recipient network addresses. The non-network control information may be transmitted over the cable bus according to a designated voltage carrier signal (e.g., a 74 volt on/off signal, wherein 0V represents a digital "0" value and +74 volts a digital "1" value, or an analog signal of 0V-74V, wherein the 0-74V voltage level may represent a specific level or percentage of functionality). The non-network control information is transmitted and received over the cable bus using one or more electronic components 32a-32c in each vehicle that are configured for this purpose.

If two vehicles are connected via an MU cable jumper, both the MU cable jumper and the internal MU electrical systems of the two vehicles together form the MU cable bus. As subsequent vehicles are attached using additional MU cable jumpers, those cable jumpers and the internal MU electrical systems of the subsequent vehicles also become part of the MU cable bus.

As indicated in FIG. 1, in one embodiment, the vehicle consist 12 may be part of a train 60 that may include the vehicle consist 12, a plurality of other railcars 62 not in consist 12, and possibly additional vehicles or vehicle consists (not shown). Alternatively, the vehicle consist 12 may be a series of vehicles 18 other than rail vehicles. Each vehicle 18a-18c in consist 12 is mechanically coupled to at least one other, adjacent vehicle in consist 12, through a coupler 64. The other railcars 62 are similarly mechanically coupled together and to the vehicle consist to form a series of linked vehicles. The non-network control information may be used for vehicle control purposes or for other control purposes in the train 60.

As discussed above, the communication system 10 may comprise respective router transceiver units 34a, 34b, 34c positioned in the lead vehicle 18a and each of the trail vehicles 18b, 18c in the vehicle consist 12. The router transceiver units 34a, 34b, 34c are each electrically coupled to the MU cable bus 26. The router transceiver units 34a, 34b, 34c are configured to transmit and/or receive network data 16, which may include high-bandwidth network data 16, over the MU cable bus 26. In one embodiment, each router transceiver unit receives network data 16 from a computer unit or other electronic component 32a, 32b, 32c in the vehicle consist 12, and modulates the received network data 16 into modulated network data 30 for transmission over the MU cable bus 26. Similarly, each router transceiver unit 34a, 34b, 34c receives modulated network data 30 over the MU cable bus 26 and de-modulates the received modulated network data 30 into network data 16. "Modulated" means converted from one form to a second, different form suitable for transmission over the MU cable bus 26. "Demodulated" means converted from the second form back into the first form. The modulated network data 30 is orthogonal to the non-network control information 28 transferred between vehicles over the MU cable bus 26. Orthogonal means that the modulated network data does not interfere with the non-network control information, and that the non-network control information does not interfere with the modulated network data (at least not to the extent that would corrupt the data). At recipient/subsequent vehicles, the modulated network data is received over the MU cable bus and de-modulated back into the network data for use by a vehicle electronic component.

The network data is data that is packaged in packet form, meaning a data packet that comprises a set of associated data bits 20. Each data packet 20 may include a data field 22 and a network address or other address 24 uniquely associated with a computer unit or other electronic component 32a-32c in consist 12. The network data 16 may be TCP/IP-formatted or SIP-formatted data, however, the electronic components and/or router transceiver units may use other communications protocols for communicating network data. As should be appreciated, the MU cable bus 26, electronic components 32a-32c, and router transceiver units 34a-34c together form a (high-bandwidth) local area network. In one embodiment, these components are configured to form an Ethernet network.

Figure 4:
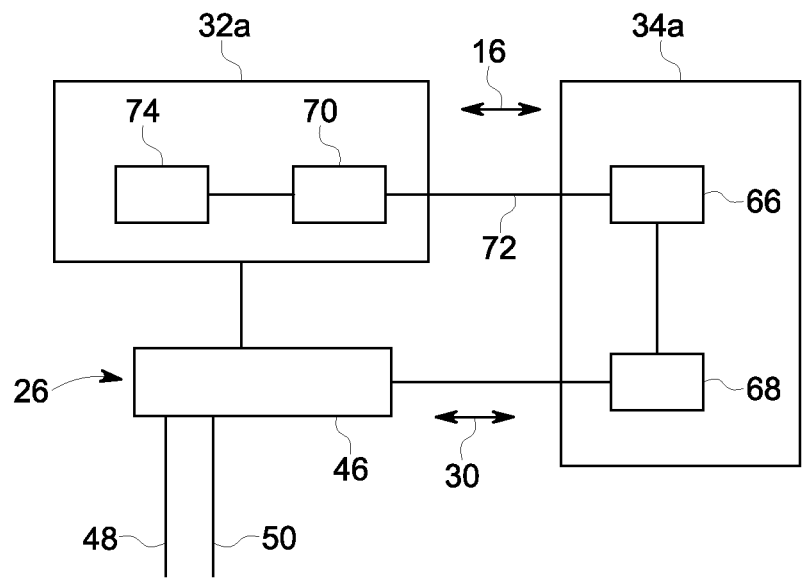
FIG. 4 is a schematic diagram of a router transceiver unit according to an embodiment of the invention.

FIG. 4 is a schematic diagram of one embodiment of a router transceiver unit 34a. The router transceiver unit 34a comprises a network adapter module 66 and a signal modulator module 68.

The signal modulator module 68 is electrically connected to the network adapter module 66 and to the MU cable bus/electrical power transmission line/power supply conductor 1012. In the example shown in FIG. 4, the signal modulator module 68 is electrically connected to the MU cable bus 26 by way of the central terminal board 46, near a vehicle electronic component 32a. The network adapter module 66 is electrically connected to a network interface unit 70 that is part of and/or operably (e.g., communicatively) connected to the electronic component 32a. The electronic component 32a may be, for example, a computer unit for controlling a vehicle, or more specifically a system deployed on a passenger vehicle or a system itself, such as automatic doors, a passenger information system, lighting, and/or the like. The network adapter module 66 and network interface unit 70 are electrically interconnected by a network cable 72. For example, if the network adapter module 66 and network interface unit 70 are configured as an Ethernet local area network, the network cable 72 may be a CAT-5E cable. The network interface unit 70 is functionally connected to one or more software or hardware applications 74 in the electronic component 32a that are configured for network communications. In one embodiment, the network interface unit 70, the network cable 72, and the software or hardware applications 74 include standard Ethernet-ready (or other network) components. For example, if the electronic component 32a is a computer unit, the network interface unit 70 may be an Ethernet adapter connected to computer unit for carrying out network communications.

The network adapter module 66 is configured to receive network data 16 from the network interface unit 70 over the network cable 72. The network adapter module 66 conveys the network data 16 to the signal modulator module 68, which modulates the network data 16 into modulated network data 30 and transmits the modulated network data 30 over the MU cable bus 26. The signal modulator module 68 also receives modulated network data 30 from over the MU cable bus 26 and de-modulates the modulated network data 30 into network data 16, which the signal modulator module 68 then conveys to the network adapter module 66 for transmission to the network interface unit 70. One or both of the network adapter module 66 and the signal modulator module 68 may perform various processing steps on the network data 16 and/or the modulated network data 30 for transmission and reception both over the MU cable bus 26 and/or over the network cable 72 (to the network interface unit 70). Additionally, one or both of the network adapter module 66 and the signal modulator module 68 may perform network data routing functions.

The signal modulator module 68 may include an electrical output (e.g., port, wires) for electrical connection to the MU cable bus 26, and communication circuitry (e.g., internal electrical and isolation components, microcontroller, software/firmware) for receiving network data 16 from the network adapter module 66, modulating the network data 16 into modulated network data 30, transmitting the modulated network data 30 over the MU cable bus 26, receiving modulated network data 30 over the MU cable bus 26, de-modulating the modulated network data 30 into network data 16, and communicating the network data 16 to the network adapter module 66. The internal circuitry may be configured to modulate and de-modulate data using schemes such as those utilized in VDSL or VHDSL (very high bitrate digital subscriber line) applications, or in power line digital subscriber line (PDSL) applications.

One example of a suitable modulation scheme is orthogonal frequency-division multiplexing (OFDM). OFDM is a frequency-division multiplexing scheme wherein a large number of closely-spaced orthogonal sub-carriers are used to carry data. The data is divided into several parallel data streams or channels, one for each sub-carrier. Each sub-carrier is modulated with a conventional modulation scheme (such as quadrature amplitude modulation or phase shift keying) at a low symbol rate, maintaining total data rates similar to conventional single-carrier modulation schemes in the same bandwidth. The modulation or communication scheme may involve applying a carrier wave (at a particular frequency orthogonal to frequencies used for non-network data in the MU cable bus) and modulating the carrier wave using digital signals corresponding to the network data.

Figure 5:
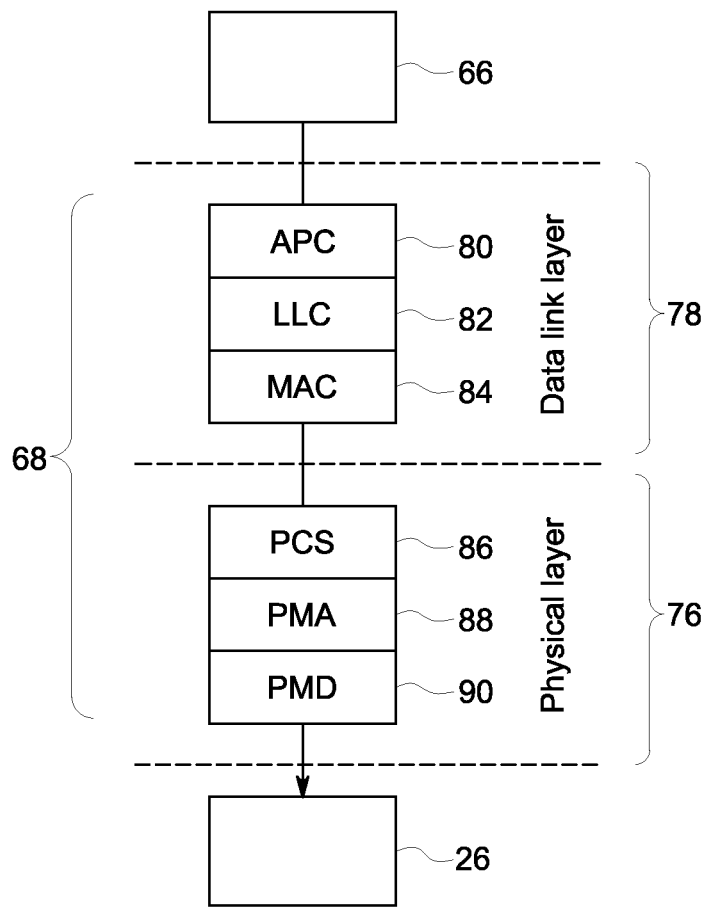
FIG. 5 is a schematic diagram illustrating the functionality of a signal modulator module portion of a router transceiver unit, according to an embodiment of the invention.

FIG. 5 is a schematic diagram of one example of how the signal modulator module 68 could function, cast in terms of the OSI network model, according to one embodiment of the present inventive subject matter. In this example, the signal modulator module 68 may include a physical layer 76 and a data link layer 78. The data link layer 78 is divided into three sub-layers. The first sub-layer is an application protocol convergence (APC) layer 80. The APC layer 80 accepts network data 16 (e.g., Ethernet or other network frames) from an upper application layer (e.g., the network adapter module 66) and encapsulates the network data 16 into MAC (medium access control) service data units, which are transferred to a logical link control (LLC) layer 82. The LLC layer 82 is responsible for potential encryption, aggregation, segmentation, automatic repeat-request, and similar functions. The third sub-layer of the data link layer 78 is a MAC layer 84, which schedules channel access. The physical layer 76 is divided into three sub-layers. The first sub-layer is a physical coding sub-layer (PCS) 86, which is responsible for generating PHY (physical layer) headers. The second sub-layer is a physical medium attachment (PMA) layer 88, which is responsible for scrambling and FEC (forward error correction) coding/decoding. The third sub-layer is a physical medium dependent (PMD) layer 90, which is responsible for bit-loading and OFDM modulation. The PMD layer 90 is configured for interfacing with the MU cable bus 26, according to the particular configuration (electrical or otherwise) of the MU cable bus 26. The other sub-layers are medium independent, i.e., do not depend on the configuration of the MU cable bus 26.

Figure 6:
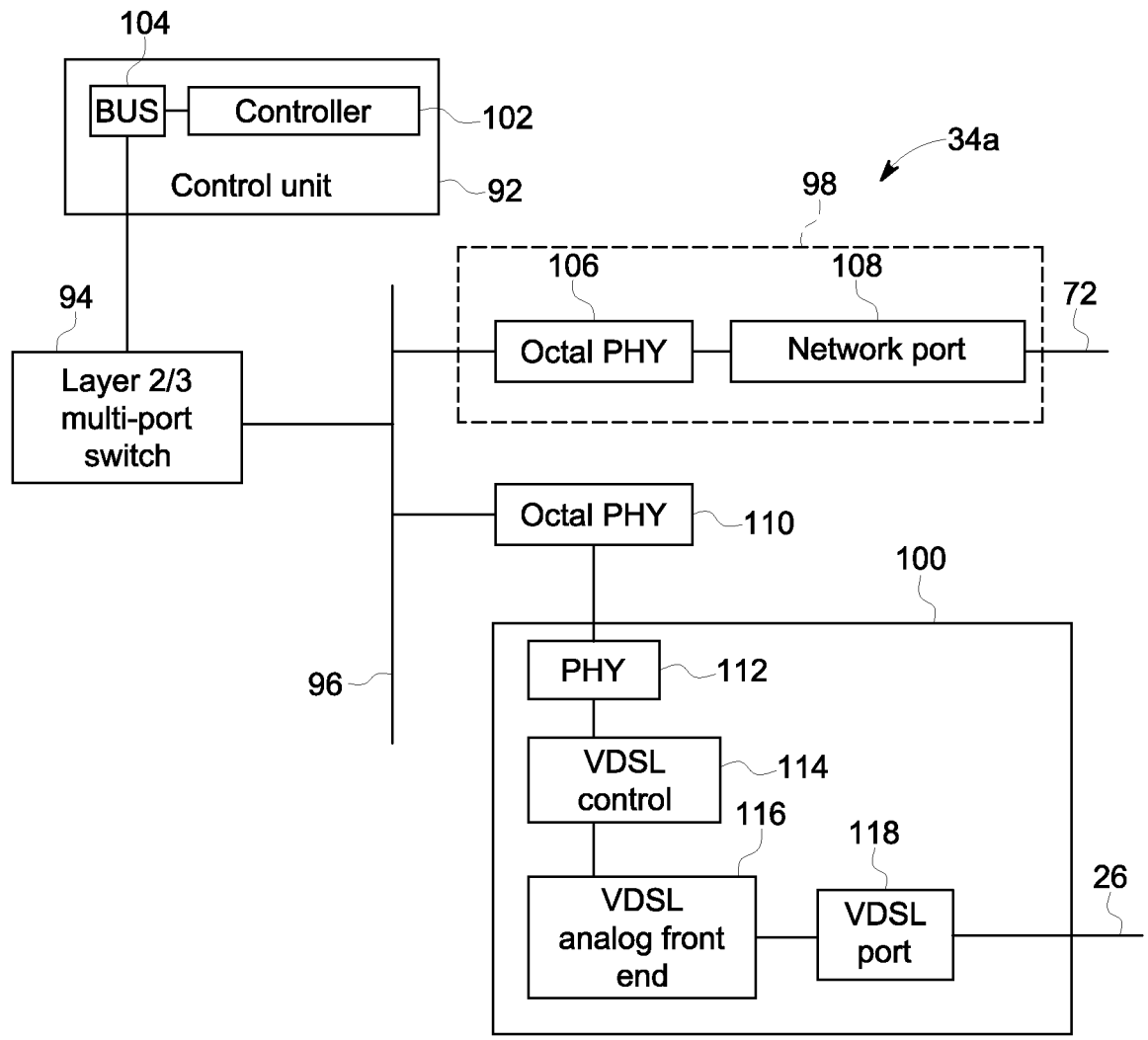
FIG. 6 is a circuit diagram of another embodiment of a router transceiver unit.

FIG. 6 is a circuit diagram of another embodiment of a router transceiver unit 34a. In this embodiment, the router transceiver unit 34a comprises a control unit 92, a switch 94, a main bus 96, a network interface portion 98, and a very high bitrate digital subscriber line (VDSL) module 100. The control unit 92 comprises a controller 102 and a control unit bus 104. The controller 102 is electrically connected to the control unit bus 104 for communicating data over the bus 104. The controller 102 may be a microcontroller or other processor-based unit, including support circuitry for the microcontroller. The switch 94 is a network switching/router module configured to process and route packet data and other data. The switch 94 interfaces the control unit 92 with the main bus 96. The switch 94 may be, for example, a layer 2/3 multi-port switch. The network interface portion 98 is electrically connected to the main bus 96, and comprises an octal PHY (physical layer) portion 106 and a network port portion 108. The network port portion 108 is electrically connected to the octal PHY portion 106. The octal PHY portion 106 may comprise a 10/100/1000 Base T 8-port Ethernet (or other network) transceiver circuit. The network port portion 108 may comprise an Ethernet (or other network) transformer and associated CAT-5E receptacle (or other cable type receptacle or other electrical connection) for receiving a network cable 72, such as the network cable 72 (shown in FIG. 4).

The VDSL module 100 is also connected to the main bus 96 by way of an octal PHY unit 110, which may be the same unit as the octal PHY portion 106 or a different octal PHY unit. The VDSL module 100 comprises a physical interface portion (PHY) 112 electrically connected to the octal PHY unit 110, a VDSL controller 114 electrically connected to the physical interface portion 112, a VDSL analog front end unit 116 electrically connected to the VDSL controller 114, and a VDSL port unit 118 electrically connected to the VDSL analog front end unit 116. The physical interface portion 112 acts as a physical and electrical interface with the octal PHY unit 110, e.g., the physical interface portion 112 may comprise a port and related support circuitry. The VDSL analog front end unit 116 is configured for transceiving modulated network data 30 (e.g., sending and receiving modulated data) over the MU cable bus 26, and may include one or more of the following: analog filters, line drivers, analog-to-digital and digital-to-analog converters, and related support circuitry (e.g., capacitors). The VDSL controller 114 is configured for converting and/or processing network data 16 for modulation and de-modulation, and may include a microprocessor unit, ATM (asynchronous transfer mode) and IP (Internet Protocol) interfaces, and digital signal processing circuitry/functionality. The VDSL port unit 118 provides a physical and electrical connection to the MU cable bus 26, and may include transformer circuitry, circuit protection functionality, and a port or other attachment or connection mechanism for connecting the VDSL module 100 to the MU cable bus 26. Overall operation of the router transceiver unit 34a shown in FIG. 6 is similar to what is described in relation to FIGS. 1, 2, and 4.

With reference to the above-described communication system 10, electronic components of the router-transceiver units 34a-34c may be adjusted based on the electrical characteristics of the MU cable bus 26, and/or additional electronic components (e.g., noise filters/processors) may be added to the system to compensate for specific aspects/characteristics of the MU cable bus 26.

Another embodiment of the invention relates to a method for communicating data in a vehicle consist 12, such as a passenger vehicle consist that may include one or more passenger vehicles). The method comprises transmitting network data 16, 30 between vehicles 18a-18c within a vehicle consist 12. Each vehicle 18a-18c may be adjacent to and mechanically coupled with one or more other vehicles in consist. The network data 16, 30 may include high-bandwidth network data that is transmitted between the vehicles 18a-18c. The network data 16, 30, such as high-bandwidth network data 16, 30, is transmitted over the MU cable bus 26 interconnecting at least adjacent vehicles 18a, 18b in consist 12. The MU cable bus 26 is an existing cable bus used in the vehicle consist 12 for transferring non-network control information 28 between vehicles 18a-18c in consist 12. Alternatively, or in addition, the MU cable bus 26 may be an electrical power transmission line that provides electrical power to run electronics or other systems, such as lighting, on-board the vehicles 18a-18c.

In another embodiment, the method further comprises, at each of one or more of the vehicles 18a-18c in the vehicle consist 12, converting the network data 16 into modulated network data 30 for transmission over the MU cable bus 26. The modulated network data 30 is orthogonal to the non-network control information 28 transferred over the MU cable bus. The method further comprises de-modulating the modulated network data 30 received over the MU cable bus 26 for use by on-board electronic components 32a-32c of the vehicles, such as lighting, automatic door systems, passenger information systems, alarm systems, etc.

As should be appreciated, it may be the case that certain vehicles in consist are network equipped according to the system and method of the present invention, e.g., outfitted with a router transceiver unit, and that other vehicles in consist are not. For example, there may be first and third network-equipped vehicles physically separated by a second vehicle that is not network equipped. In this case, the first and third vehicles are still able to communicate and exchange data even though there is a non-network equipped vehicle between them. This is possible because all the vehicles are electrically connected via the MU cable bus. In one case, for example, a vehicle consist comprises first, second, and third vehicles, with the second vehicle being disposed between the first and third vehicles. A first router transceiver unit is positioned in the first vehicle, and a second router transceiver unit is positioned in the third vehicle. The second vehicle, however, does not have a router transceiver unit or other functionality for transmitting and/or receiving network data over the MU cable bus. Nevertheless, network data, such as high-bandwidth data, is transmitted between the first and third vehicles through the second vehicle, with the network data passing through a portion of the MU cable bus in the second vehicle but not being transmitted or received by the second vehicle.

In another embodiment, the method further comprises controlling an electronic system or component on at least one of the vehicles 18a-18c in consist 12 based at least in part on the network data 16.

The vehicle consist 12 may be part of a train 60 that comprises the vehicle consist 12 and a plurality of other railcars 62. Here, the non-network control information 28 may be train control information that is transmitted over the MU cable bus 26 according to a designated voltage carrier signal (e.g., +74V).

Figure 7:
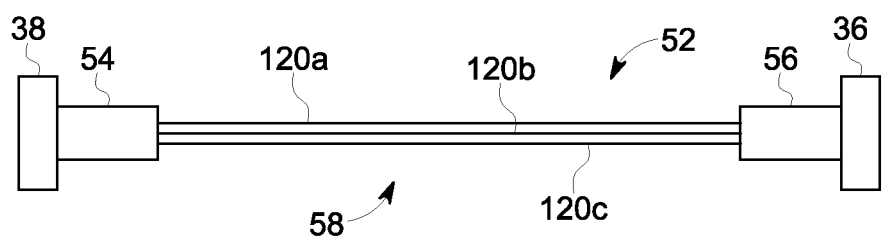

With reference to FIG. 7, if the MU cable jumper 52 and/or internal electrical system 40 may include plural discreet electrical wires or other electrical or conductive pathways 120a-120c, e.g., three discreet electrical wires 120a-120c as shown in FIG. 7, it may be the case that network data 30 is transmitted over only one of the plural discreet electrical wires or other electrical pathways. This may depend on what each pathway is used for in the vehicle consist and what type of information it carries. For example, it may be undesirable to transmit network data over a wire 120a that carries analog non-network data, whereas a wire 120b that carries a digital signal (on +V, off 0 V) is more desirable for transmitting network data. While the illustrated embodiment only shows three conductive pathways 120, the MU cable bus 26 may include a different number of conductive pathways 120, such as 27 conductive wires.

Another embodiment of the present invention relates to a communication system 10 for communicating data in a vehicle consist 12. The system 10 comprises a respective router transceiver unit 34a-34c positioned in each vehicle 18a-18c of a vehicle consist 12. Each router transceiver unit 34a-34c is coupled to the MU cable bus 26 in the vehicle consist 12 that interconnects adjacent vehicles 18a, 18b. The MU cable bus 26 is an existing cable bus used in the vehicle consist for transferring non-network control information 28 between vehicles within the vehicle consist. Each router transceiver unit 34a-34c is configured to transmit and/or receive network data 16, 30, such as high-bandwidth network data 16, 30, over the MU cable bus 26. The MU cable bus 26 may include an electrical power transmission line that interconnects and provides power to adjacent vehicles 18a, 18b.

In another embodiment of the system 10, each router transceiver unit 34a-34c is configured to convert the network data 16 into modulated network data 30 for transmission over the MU cable bus 26. The modulated network data being orthogonal to the non-network control information transferred between vehicles over the MU cable bus. Each router transceiver unit is further configured to de-modulate the modulated network data received over the MU cable bus for use by electronic components in the vehicles of the consist.

Another embodiment relates to a communication system for communicating data in a vehicle consist 12. In this embodiment, the system comprise a respective router transceiver unit 34a-34c positioned in each of a plurality of vehicles 18a-18c in consist 12. The system further comprises, in each of the plurality of vehicles, a respective electronic component 32a-32c (e.g., computer unit) positioned in the vehicle and operably coupled to the router transceiver unit in the vehicle. The router transceiver units 34a-34c are electrically coupled to a vehicle multiple unit (MU) cable bus 26, which is an existing cable bus used in consist for transferring non-network control information 28 between the plurality of vehicles. The router transceiver units 34a-34c are configured to transmit and/or receive network data 16, 30 over the MU cable bus 26, the network data originating at one of electronic components 32a-32c and being addressed to another of the electronic components 32a-32c. Each router transceiver unit may be configured to convert the network data into modulated network data for transmission over the MU cable bus (the modulated network data being orthogonal to the non-network control information transferred between vehicles over the MU cable bus), and to de-modulate the modulated network data received over the MU cable bus for use in one of the electronic components.

Another embodiment relates to a communication system for communicating data in a vehicle consist 12. The system comprises a computer network in consist. The computer network comprises a respective electronic component 32a-32c positioned in each of a plurality of vehicles 18a-18c in consist 12 and a vehicle multiple unit (MU) cable bus 26. The MU cable bus 26 interconnects the electronics components and is an existing cable bus used in consist for transferring non-network control information 28 between the vehicles. The electronic components are configured to communicate by transmitting network data 16, 30 over the MU cable bus 26, the network data 16 originating at one of the electronic components and being addressed to another of the electronic components. As should be appreciated, in this embodiment the electronic components are configured to carry out the functionality of the router transceiver units 34a-34c as described above, and/or the router transceiver units 34a-34c are part of (or comprise) the electronic components. The computer network may be an Ethernet network.

Another embodiment relates to a method for retrofitting a vehicle for network data communications. The method comprises outfitting a vehicle with a router transceiver unit, interfacing the router transceiver unit with an electronic component of the vehicle, and interfacing the router transceiver unit with a multiple unit (MU) cable bus of the vehicle. The MU cable bus is an existing cable bus used for transferring non-network control information between vehicles in consist. The router transceiver unit is configured to transmit and/or receive network data over the MU cable bus.

Another embodiment relates to a method for retrofitting a vehicle consist for network data communications. The method comprises, at each of a plurality of vehicles 18a-18c in consist 12, outfitting the vehicle with a respective router transceiver unit 34a-34c, interfacing the router transceiver unit 34a-34c with an electronic component 32a-32c of the vehicle, and interfacing the router transceiver unit 34a-34c with a multiple unit (MU) cable bus 26 of the vehicle. The MU cable bus is an existing cable bus used for transferring non-network control information between vehicles in consist. Each router transceiver unit is configured to transmit and/or receive network data 16, 30 over the MU cable bus 26.

Any of the embodiments described herein are also applicable for communicating data in vehicle consists generally. "Vehicle consist" refers to a group of vehicles that are mechanically coupled or linked together to travel along a route.

For example, one embodiment of the present invention relates to a system and method for communicating data in a vehicle consist 12. In this embodiment, network data 16, 30 is transmitted from a first vehicle 18a in the vehicle consist 12 to a second vehicle 18b in the vehicle consist. The network data 16, 30 is transmitted over an existing electrical cable bus 26 that interconnects the first vehicle 18a and the second vehicle 18b. The existing electrical cable bus 26 is used in the vehicle consist 12 for transferring non-network control information 28 between the first vehicle and the second vehicle. As should be appreciated, this method and system is applicable to communicating data between any of the linked vehicles 18a-18c, and thereby the terms "first" and "second" vehicle are used to identify respective vehicles in the vehicle consist and are not meant to characterize an order or position of the vehicles unless otherwise specified. That being said, it may be the case that the first and second vehicles are adjacent to and mechanically coupled with one another.

In any of the embodiments set forth herein, the network data may be TCP/IP-formatted or SIP-formatted data. Additionally, each vehicle may include a computer unit, with the computer units 32a-32c communicating with one another by transmitting the network data, formatted as TCP/IP data or SIP data or otherwise, over the existing electrical cable bus 26, and the computer units thereby forming a computer network, e.g., an Ethernet-type network.

In one embodiment, the existing electrical cable bus may be an ECP (electronically controlled pneumatic brake) train line. ECP brakes on a train are defined by the Association of American Railroads' 4200 series specifications. This standard describes a 230V DC power line that runs the length of the train (for providing DC power to remote units), a transceiver at 132 kHz that operates on top of the 230V power line, and a communication link (realized over the power line using the transceiver) that adheres to the ANSI/EIA 709.1 and 709.2 protocols. According to the 4200 series specifications, the communication link is used to communicate brake data between railcars for braking control purposes.

Figure 8:
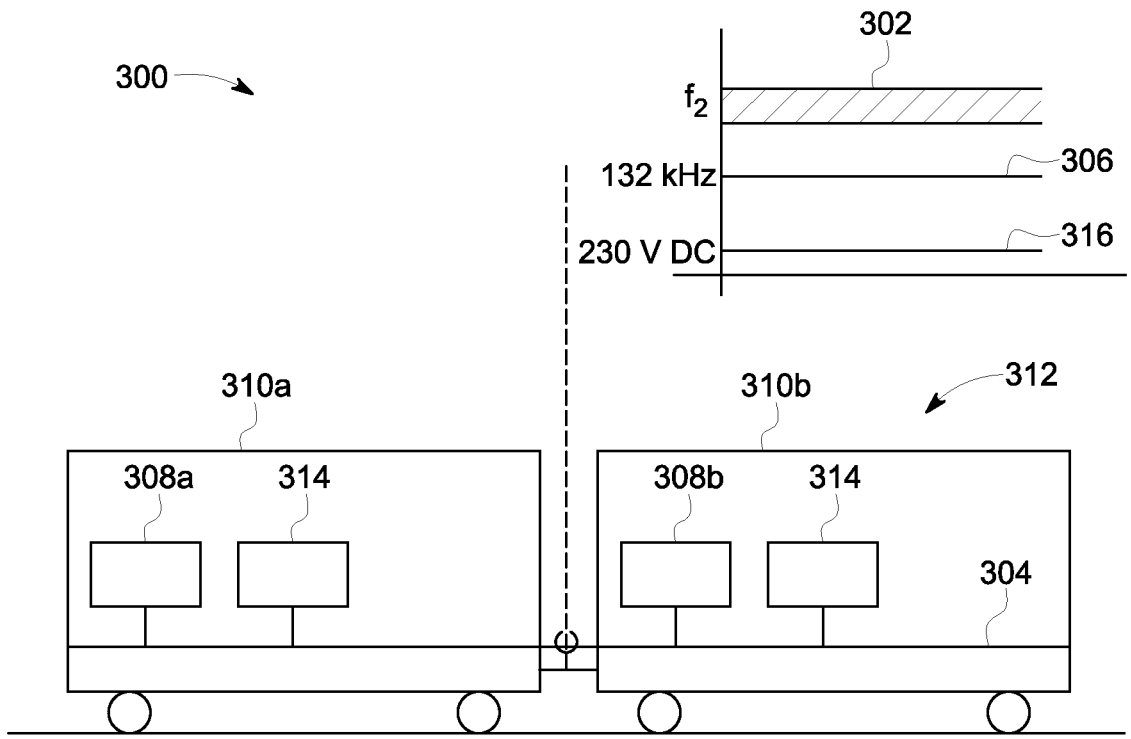
FIG. 8 is a schematic diagram of an embodiment of the communication system implemented in conjunction with an ECP train line.

In an embodiment, with reference to FIG. 8, a communication system 300 for communicating data in a vehicle consist or other vehicle consist is configured to transmit network and/or high bandwidth data 302 over an ECP train line 304, in a manner orthogonal to ECP brake data 306 transmitted over the ECP train line 304. The system 300 comprises a router transceiver unit 308a, 308b on each of a plurality of vehicles 310a, 310b in a vehicle consist or vehicle system 312. (The plurality of so-equipped vehicles may be fewer than all the vehicles in consist.) On each vehicle, the router transceiver unit 308a, 308b is in addition to an ECP transceiver 314 on the vehicle. Alternatively, an ECP transceiver may be reconfigured to include the functionality of the router transceivers 308a, 308b. Each router transceiver unit 308a, 308b is electrically connected to the ECP train line 304, and is configured to transmit network and/or high bandwidth data 302 over the ECP train line 304 at one or more frequencies f2 (i) that are different than the 132 kHz frequency of the ECP brake data 306, (ii) that do not interfere with (or receive significant interference from) the ECP brake data 306, and (iii) that do not interfere with (or receive significant interference from) the 230V DC signal 316 present on the ECP train line 304. (That is, the data 302 is orthogonal to the data 306 and DC signal 316.) For example, the network and/or high bandwidth data may be modulated into a carrier wave/RF signal transmitted over the ECP train line at a frequency in the megahertz (MHz) range. The router transceiver units 308a, 308b may be similar to the router transceiver units 34 described above. The embodiment of FIG. 8 may be implemented in conjunction with any of the other embodiments described herein. Also, in the case where certain vehicles in consist are not equipped with router transceivers 308a, 308b, the data 302 will nevertheless be transmitted over the ECP train line extending through such vehicles, for eventual reception by vehicles that are equipped with the router transceivers 308a, 308b.

The system 300 establishes a high bandwidth data network that operates superimposed on, and separate from, the 132 kHz communication link that is specified in the 4200 series specifications for ECP brake traffic between the vehicle and other vehicles, such as rail cars. In one aspect, the data network is used to communicate non-brake data (e.g., in the form of network and/or high bandwidth data) between vehicles in consist. Examples of the data that may be transferred include vehicle sensor data indicative of vehicle health, commodity condition data, temperature data, weight data, security data, data as otherwise specified herein, and/or other data. In another aspect, the data network is used to communicate brake data in addition, or instead of, the 132 kHz communication link. The brake data may be in addition to other data transmitted over the data network.

In another embodiment, the network data may be converted at one of the vehicles into modulated network data for transmission over the MU cable bus. The modulated network data is orthogonal to the non-network control information transferred between the lead and trail vehicles over the MU cable bus. "Orthogonal" means that the modulated network data does not interfere with the non-network control information, and that the non-network control information does not interfere with the modulated network data. At another vehicle in consist (e.g., a recipient vehicle), the modulated network data is received over the MU cable bus and de-modulated for use by a computer unit or other electronic component in the vehicle.

Another embodiment relates to a communication system for communicating data in a vehicle consist. The system comprises respective router transceiver units positioned in the lead vehicle and each of the trail vehicles in the vehicle consist. The router transceiver units are each electrically coupled to an MU cable bus in the vehicle consist that interconnects the lead vehicle and the trail vehicles. The MU cable bus is an existing cable bus that is used in the vehicle consist for transferring non-network control information between the lead and trail vehicles. The router transceiver units are configured to transmit and/or receive network data over the MU cable bus.

In another embodiment of the communication system, each router transceiver unit is configured to convert the network data into modulated network data for transmission over the cable bus, and to de-modulate modulated network data received over the cable bus back into network data, for use in communicating data between electronic components in the vehicle consist or otherwise. The modulated network data is orthogonal to the non-network control information transferred between the lead and trail vehicles over the cable bus.

In another embodiment, with reference to FIGS. 9-12, in a vehicle 18a equipped with the communication system, the communication system further comprises at least one cable run 400 connecting the router transceiver unit 34a to the MU cable bus. Cable run means a length of electrical cabling or other electrical conductor 402, 404, which may include one discreet electrical pathway or a plurality of discreet electrical pathways (e.g., a bundled cable). The cable run may bypass a portion of the cable bus within the vehicle (i.e., it bypasses part or all of the internal electrical system), so that network data travels over less of the cable bus than it would without the cable run in place. Thus, in one aspect of the invention, the cable run is installed in a vehicle, around and bypassing at least part of the cable bus, to provide a cleaner and less interference prone signal pathway for the network data, relative to levels of interference that are present if the bypassed portion of the cable bus was not bypassed. This may be useful for older vehicles where the internal electrical system is prone to interference, and/or for improving data throughput levels between consist of three, four, or more vehicles.

Figure 9:
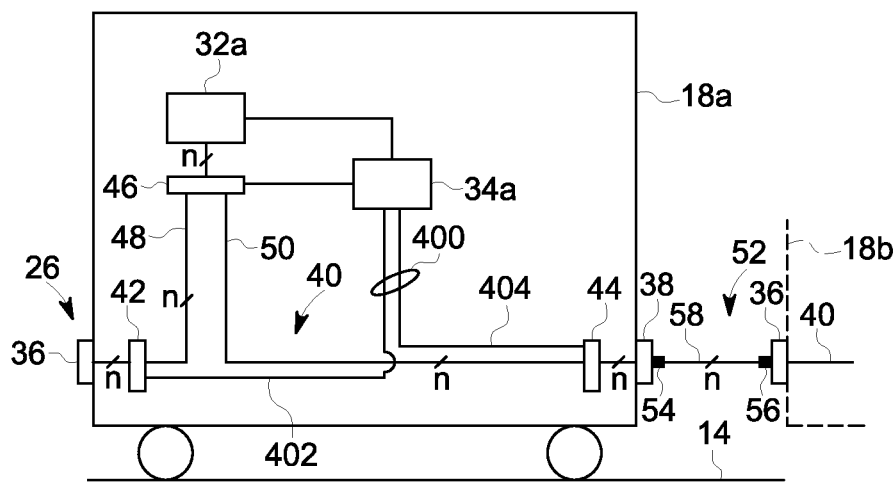
FIGS. 9-12 are schematic diagrams of various embodiments of the communication system using a cable run to bypass part of the MU cable bus in a vehicle.
Figure 10:
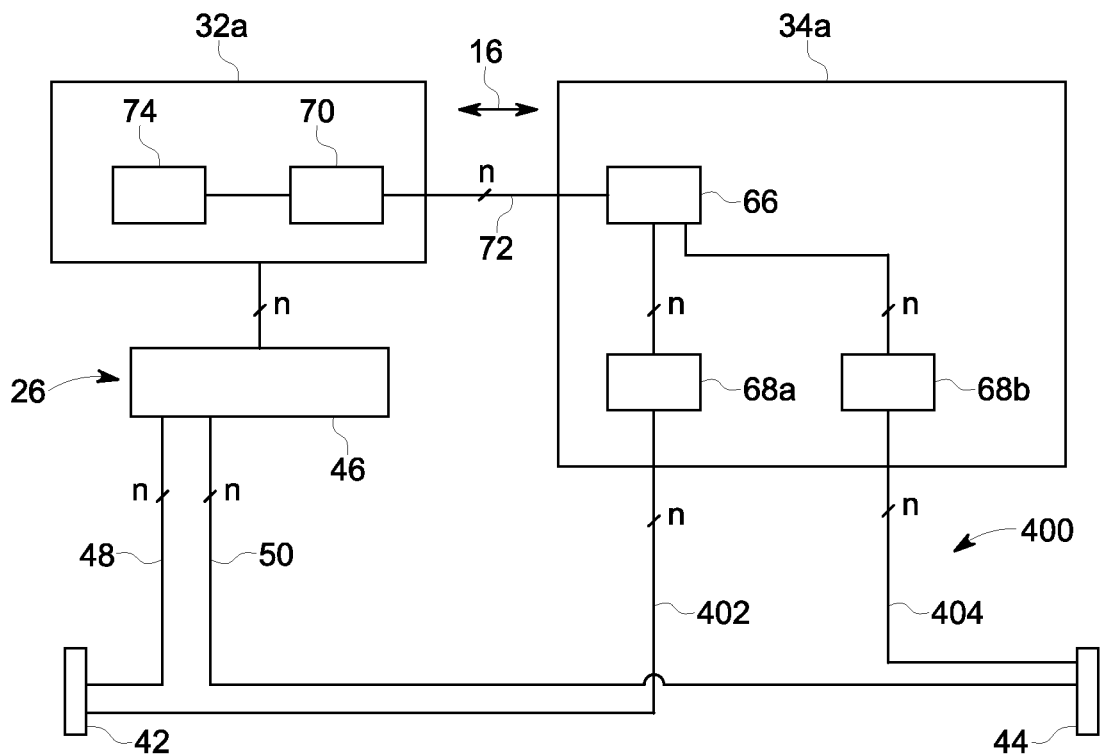

FIGS. 9 and 10 show embodiments of the communication system where the cable run may include a first length of electrical conductor 402 and a second, separate length of electrical conductor. The first length of electrical conductor electrically connects the router transceiver unit 34a to the front terminal board 42 of the vehicle 18a, which is electrically connected to the front MU port 36 of the vehicle. The second length of electrical conductor connects the router transceiver unit 34a to the rear terminal board 44, which is electrically connected to the rear port 38 of the vehicle. Here, the portion of the MU cable bus that is bypassed by the cable run includes the entirety of the cable bus in the vehicle that extends between the front terminal board 42 and the rear terminal board 44 (e.g., first and second electrical conduit portions 48, 50 and central terminal board 46). As can be seen, the router transceiver unit 34a may be locally connected to an electronic component 32a in the vehicle for the exchange of network data there between, e.g., the router transceiver unit 34a acts as an Ethernet port for the electronic component 32a. However, instead of the router transceiver unit 34a being connected to the central terminal board 46 for modulating and de-modulating network data onto and off of the cable bus, the router transceiver unit may instead connect to the front terminal board 42 and the rear terminal board for this purpose, by way of the first and second lengths of electrical conductor of the cable run. It is contemplated that the cable run 400 will provide a cleaner and less interference prone signal pathway for network data, versus the network data traveling over the bypassed portion of the MU cable bus.

With reference to FIG. 10, in another embodiment, the router transceiver unit 34a comprises a network adapter module 66 and first and second signal modulator modules 68a, 68b connected to the network adapter module 66. The first signal modulator module 68a is also connected to the first length of electrical conductor 402, and the second signal modulator module 68b is also connected to the second length of electrical conductor 404. Each signal modulator module 68a, 68b is configured to receive the network data from the network adapter module 66 and to modulate the network data into modulated network data for transmission over the cable run 400 (e.g., over the length of electrical conductor 402 or 404 to which it is connected) and the non-bypassed portion of the MU cable bus 26. Each signal modulator module 68a, 68b is also configured to receive modulated network data over the cable run 400 (e.g., over the length of electrical conductor 402 or 404 to which it is connected) and to de-modulate the modulated network data into network data for providing to the network adapter module 66. The network adaptor module 66 transceives (transmits and receives) network data between the signal modulator modules and one or more electronic components 32a in the vehicle.

As should be appreciated, the signal modulator modules 68a, 68b are separately disposed in the "front" and "rear" portions, respectively, of the network data communication pathway in the communication system. Thus, the second signal modulator module 68b will receive modulated network data arriving over the second length of electrical conductor 404 from the rear of consist, and the first signal modulator module 68*a* will receive modulated network data arriving over the first length of electrical conductor 402 from the front of consist (assuming in this example that the terminal boards 42, 44 are oriented at the front and rear of consist, respectively). Additionally, the network adapter module 66 is interfaced with the signal modulator modules 68*a*, 68*b* so that network data intended for locations towards the front of consist is communicated to the first signal modulator module 68*a*, and so that network data intended for locations towards the rear of consist is communicated to the second signal modulator module 68*b*. Alternatively or additionally, depending on network configuration, the network adapter module 66 may simply present all network data to both signal modulator modules 68*a*, 68*b*, with the network data in effect being transmitted both to the front and rear of consist. It is contemplated that the use of two signal modulator modules, one on each leg 402, 404 of the network data communication pathway, will substantially increase signal to noise ratio, allowing for greater data throughput across multiple vehicles in consist.

Figure 11:
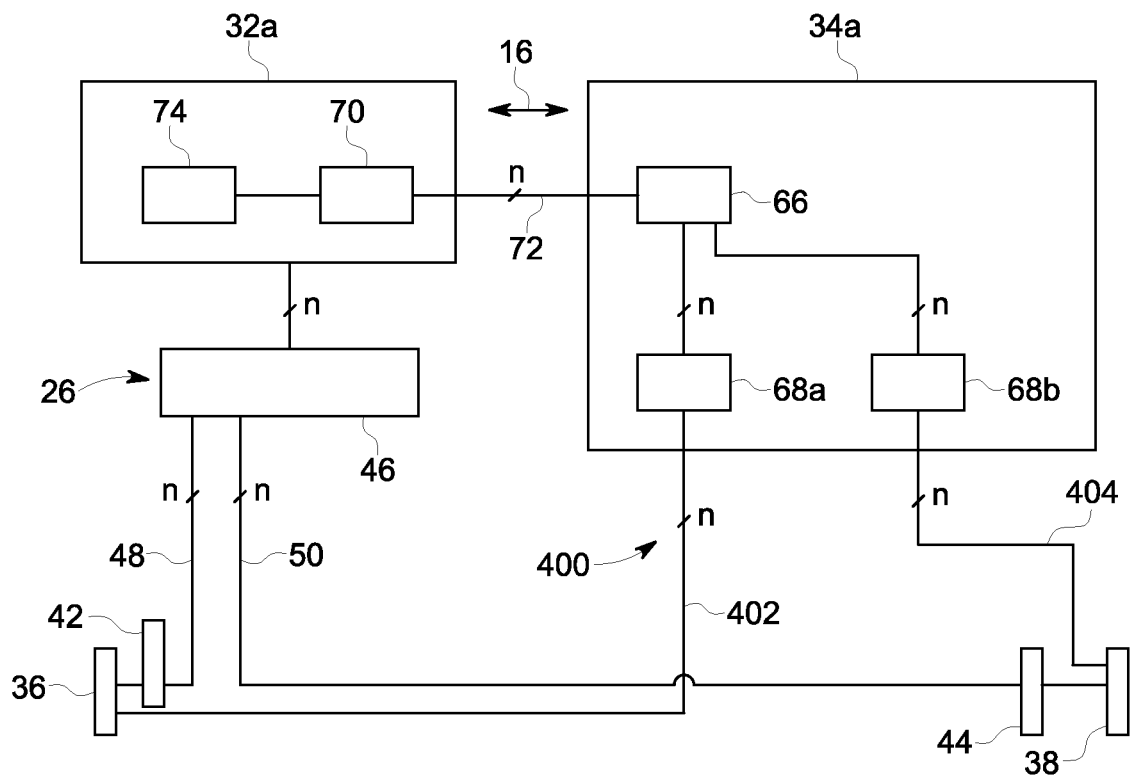

With reference to FIG. 11, instead of connecting the cable run 400 to the terminal boards 42, 44, the cable run connects the router transceiver unit 34*a* to the front MU port 36 of the vehicle and to the rear MU port 38 of the vehicle 18*a*. Here, the portion of the cable bus that is bypassed comprises the entirety of the cable bus in the vehicle that extends between the front MU port and the rear MU port, in other words, the entirety of the internal MU electrical system is bypassed. The cable run may include first and second separate lengths of electrical conductor 402, 404, and the router transceiver unit 34*a* may comprise first and second signal modulator modules 68*a*, 68*b*, similar to as described above in regards to FIG. 10.

Figure 12:
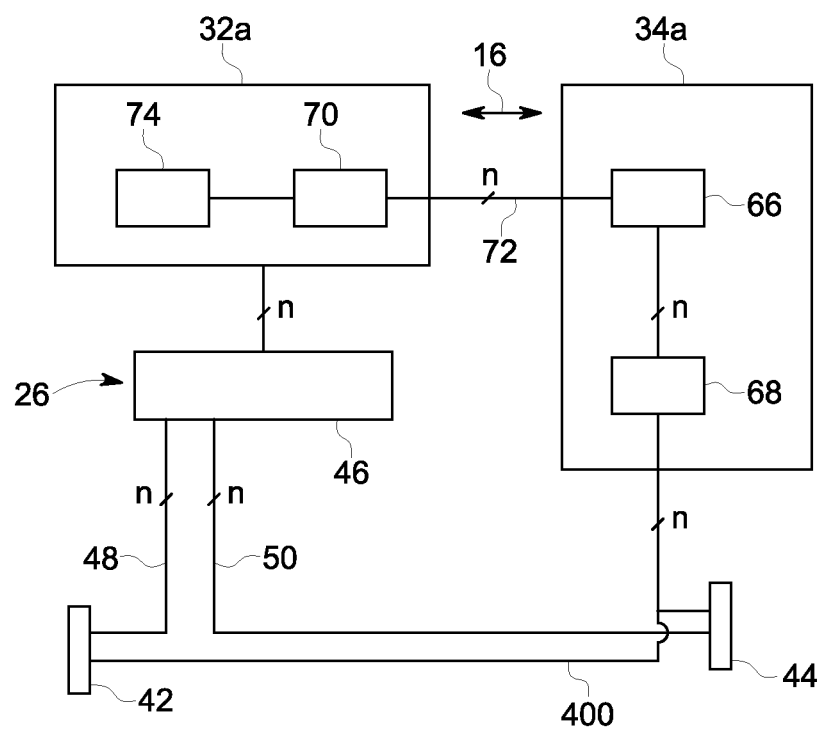

With reference to FIG. 12, instead of two separate lengths of electrical conductor the cable run may include a single length of electrical conductor (which may include one or more discreet electrical pathways) that connects the router transceiver unit 34*a* to the terminal boards 42, 44. Alternatively, the single length of electrical conductor may connect the router transceiver unit 34*a* to the front and rear MU ports 36, 38. In such an embodiment, the router transceiver unit 34*a* may have only one signal modulator module.

Figure 13:
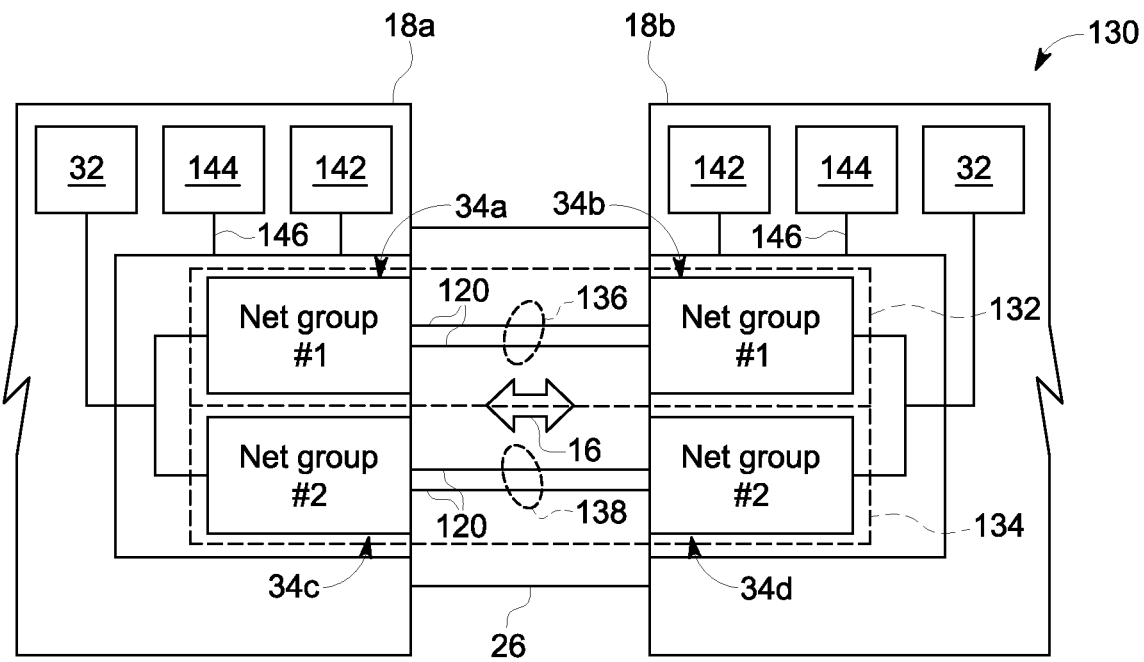
FIGS. 13-16 are schematic diagrams of various embodiments of the communication system, having a redundant router transceiver pair, according to an embodiment of the invention.
Figure 14:
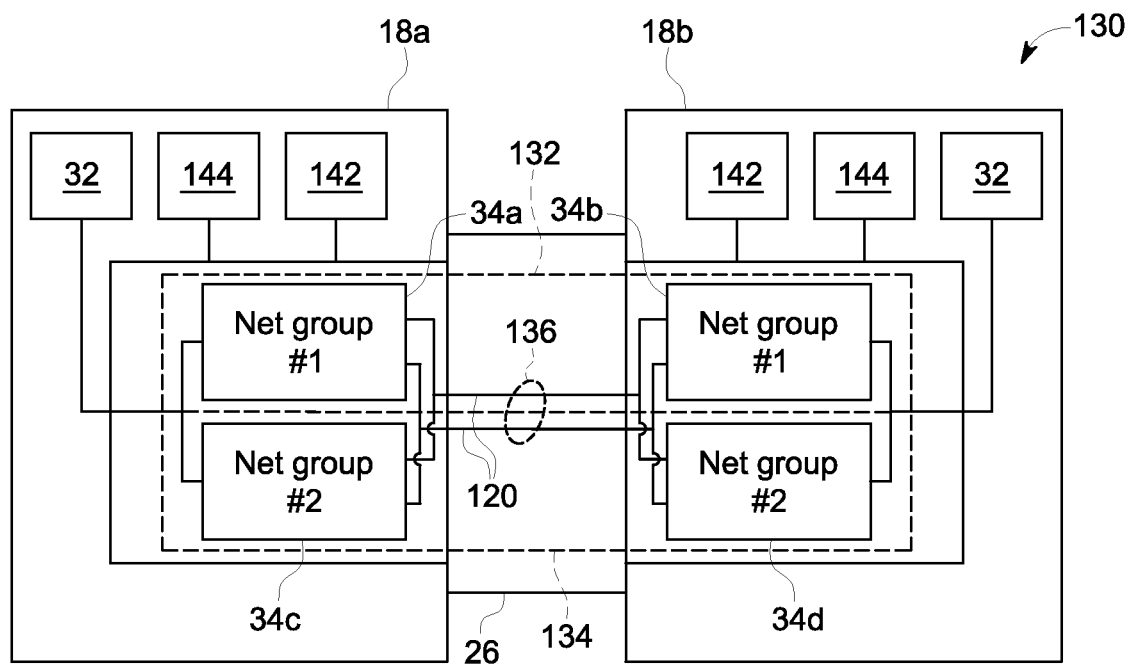
Figure 15:
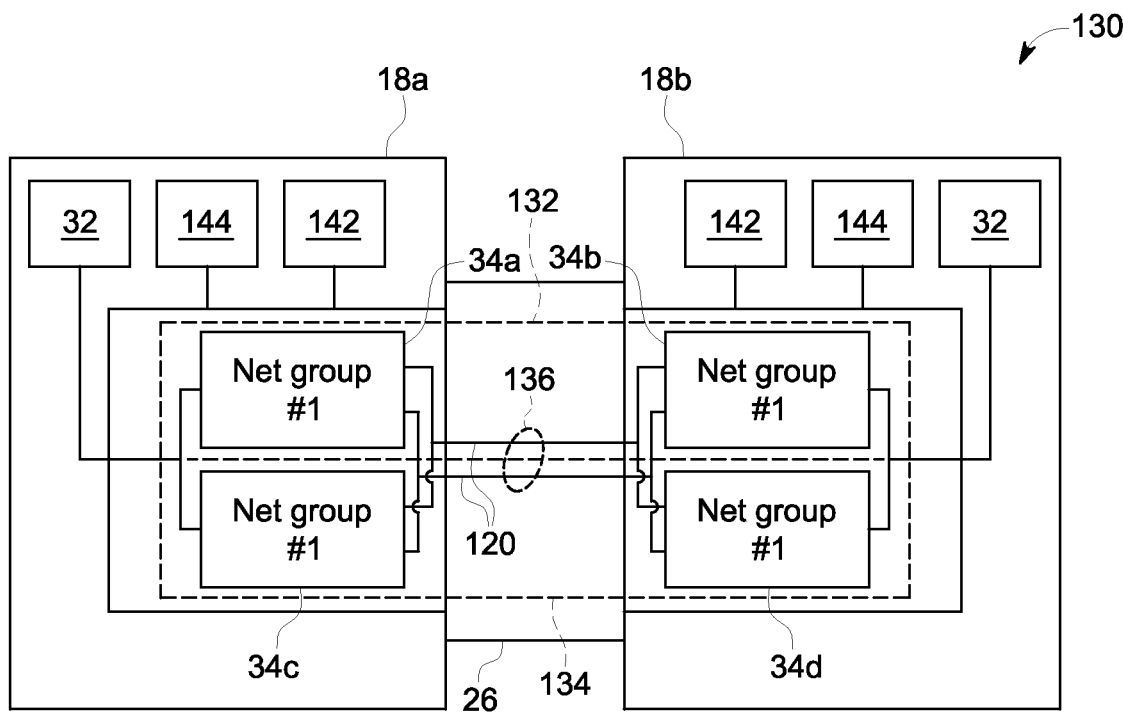

Turning now to FIGS. 13-15, in another embodiment, a communication system 130 for communicating data in a vehicle consist comprises a first router transceiver pair 132 and a redundant (second) router transceiver pair 134. The first router transceiver pair 132 comprises a first router transceiver unit 34*a* positioned in a first vehicle 18*a* of the vehicle consist and a second router transceiver unit 34*b* positioned in a second vehicle 18*b* of the vehicle consist. The redundant router transceiver pair 134 comprises a third router transceiver unit 34*c* positioned in the first vehicle 18*a* and a fourth router transceiver unit 34*d* positioned in the second vehicle 18*b*. Each of the first, second, third, and fourth router transceiver units 34*a*, 34*b*, 34*c*, 34*d* is coupled to a vehicle MU cable bus 26 in the vehicle consist that interconnects the first and second vehicles 18*a*, 18*b*. Also, each of the first, second, third, and fourth router transceiver units 34*a*, 34*b*, 34*c*, 34*d* is configured to transmit and/or receive network data 16 over the MU cable bus 26.

The system 130 may include one or more control modules 174 and switch modules 172 communicatively coupled with the router transceiver pairs 132, 134. As used herein, the term "module" may include a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The module may represent the hardware that operates based on software or hardwired instructions, the software that directs hardware to perform the operations, or a combination thereof. For example, one or more of the modules 172, 174 may be embodied in a computer processor that operates based on one or more sets of instructions (e.g., hard-wired logic and/or software), instructions that direct a processor to perform operations, and/or a combination of a processor and the instructions. Alternatively, the control module 174 may include the switch module 172. For example, the switch module 172 may be a component of the control module 174.

In the illustrated embodiment, each of the vehicles 18*a*, 18*b* may include the control module 174 and the switch module 172. Alternatively, only one of the vehicles 18*a*, 18*b* may include the control module 174 and the switch module 172. The control module 174 and the switch module 172 may be communicatively coupled with the router transceiver pairs 132, 134 by one or more wired and/or wireless connections.

The switch module 172 controls which of the router transceiver pairs 132, 134 communicates the network data 16 over the cable bus 26. For example, the switch module 172 may operate as an electric switch alternates between a first position and a second position. In the first position, the first router transceiver pair 132 is permitted to communicate network data 16 over the cable bus 26 and the second router transceiver pair 134 is prohibited from communicating network data 16 over the cable bus 26. In the second position, the second router transceiver pair 134 is permitted to communicate network data 16 over the cable bus 26 and the first router transceiver pair 132 is prohibited from communicating network data 16 over the cable bus 26.

The control module 174 interfaces with the router transceiver pairs 132, 134 via the switch module 172 to control which of the router transceiver pairs 132, 134 communicates (e.g., transmits or receives) network data through the MU cable bus 26. For example, the control module 174 may form instructions that are sent to the switch module 172 to control the state of switch module 172. In one embodiment where each of multiple vehicles 18*a*, 18*b* include a control module 174 and/or a switch module 172, a priority scheme may be used to determine which control module 174 decides the router transceiver pairs 132, 134 that are permitted to communicate network data 16 and/or which switch module 172 implements the instructions of the control module 174 (e.g., permits one router transceiver pair 132 or 134 to communicate network data 16 but prevents the other router transceiver pair 134 or 132 to communicate network data 16).

In the illustrated embodiment, the first and third router transceiver units 34*a*, 34*c* define a first router transceiver set that is disposed on-board the first vehicle 18*a* while the second and fourth router transceiver units 34*b*, 34*d* define a second router transceiver set disposed on-board the second vehicle 18*b*. The router transceiver units 34*a*, 34*b*, 34*c*, 34*d* of each set may be disposed within a common housing, such as a single enclosure. Alternatively, the router transceiver units 34*a*, 34*b*, 34*c*, 34*d* of each set may be disposed within different housings. A shared power source 144 disposed on-board one or more of the vehicles 18*a*, 18*b* may provide electrical energy to power the router transceiver units 34*a*, 34*b*, 34*c*, 34*d*. Examples of power sources 144 may include generators or alternators connected to a diesel engine (with one or more transformers, rectifiers, and the like, disposed between the generator or alternator and the router transceiver units 34a, 34b, 34c, 34d), rechargeable batteries, and the like. A single power source 144 may power each of the router transceiver sets. Alternatively, multiple, redundant power sources 144 may power each router transceiver set. In the illustrated embodiment, a single conductive pathway 146 (e.g., one or more wires, cables, buses, or the like conductively coupled with each other) supplies electrical energy from the power source 144 to the router transceiver set. Alternatively, multiple conductive pathways 146 may supply the electrical energy. For example, two or more separate sets of wires, cables, buses, or the like, may extend from the power source 144 to the router transceiver units 34a, 34b, 34c, 34d in each set. The additional conductive pathways 146 can provide redundancy in the power supply to the router transceiver sets.

As described above, the MU cable bus 26 may include several elongated conductive pathways 120 that extend along the length of the MU cable bus 26 from the first vehicle 18a to the second vehicle 18b. While only four conductive pathways 120 are shown in FIG. 13, the MU cable bus 26 may include more or fewer conductive pathways 120. A subset, or less than all, of the conductive pathways 120 in the MU cable bus 26 may be used for communication of network data 16, while other conductive pathways 120 are used for communication of non-network data.

The conductive pathways 120 define physical portions of the MU cable bus 26 over which network data and/or non-network data can be communicated between the first vehicle 18a and the second vehicle 18b. In one embodiment, the conductive pathways 120 are conductive wires that are not conductively coupled with each other within the MU cable bus 26. For example, the conductive pathways 120 may not transmit electric signals such as network data or non-network data between the conductive pathways 120 within the MU cable bus 26. The conductive pathways 120 may be individually surrounded by dielectric jackets to prevent signals transmitted along a first conductive pathway 120 from being conducted to a different second conductive pathway 120 within the MU cable bus 26.

Different or distinct physical portions of the MU cable bus 26 may include different conductive pathways 120 or different, non-overlapping sets of conductive pathways 120. For example, a first wire or set of wires may be a first physical portion of the MU cable bus 26 and a second, different wire that is not conductively coupled with the first wire or a second set of wires that does not share any wires with the first set of wires may be a second, distinct physical portion of the MU cable bus 26.

In operation, if either of the router transceiver pairs 132, 134 enters a failure condition for being unable to transmit and/or receive network data 16 over the MU cable bus 26, and/or if any one of the first, second, third, and fourth router transceiver units 34a, 34b, 34c, 34d enters the failure condition and is unable to communicate network data 16 over the MU cable bus 26, then the other router transceiver pair 132, 134 and/or remaining router transceiver units 34a, 34b, 34c, 34d that are not in the failure condition can continue to transmit the network data 16 over the MU cable bus 26. ("Failure condition," as indicated, means being unable to transmit and/or receive network data 16 over the MU cable bus 26.)

To explain further, according to one aspect, in a configuration such as shown in FIG. 1 (for example), if either of the router transceiver units 34a, 34b enters a failure condition, then network communications may no longer be possible between the two vehicles 18a, 18b through or over the MU cable bus 26 using the router transceiver units 34a, 34b. However, in the system 130 as illustrated in FIGS. 13-15, the redundant router transceiver pair 134 can act as a functional backup to the first router transceiver pair 132, if either or both of the router transceiver units 34a, 34b in the first router transceiver pair 132 fails or is otherwise unable to successfully communicate the network data 16 through the MU cable bus 26 between the first and second vehicles 18a, 18b. (Conversely, the first router transceiver pair 132 may act as a functional backup to the redundant router transceiver pair 134 should the redundant transceiver pair 134 fail.) In particular, from a system level view, (i) if either of the router transceiver pairs 132 or 134 enters a failure condition, then the other router transceiver pair 132 or 134 carries on for network data transmission through the MU cable bus 26 and between the vehicles 18a, 18b, and/or (ii) if any one of the router transceiver units 34a, 34b, 34c, or 34d enters a failure condition, then at least two of the other, functional router transceiver units 34a, 34b, 34c, 34d may continue to transmit network data 16 across the MU cable bus 26 between the first and second vehicles 18a, 18b.

As described below, the first transceiver pair 132 and the redundant transceiver pair 134 may be arranged in different network groups. For example, the first and second router transceiver units 34a, 34b may be members of a first network group and the third and fourth router transceiver units 34c, 34d may be members of a different, second network group. A network group can include members that are able to communicate with each other through a network or common medium, such as the MU cable bus 26. In one embodiment, the network groups do not communicate between each other. For example, a member of a first network group does not communicate with a member of a different, second network group. Alternatively, members of different network groups may be able to communicate with each other.

The members of a network group may be defined based on unique addresses associated with the members. For example, router transceiver units 34 of a first network may have unique addresses that are associated with the first network while router transceiver units 34 of a different, second network have unique addresses that are associated with the second network. Alternatively, the router transceiver units 34 of each network may have addresses that are common to members of the network group, but differ from the addresses of members in other network groups.

The addresses may be used to enable communication between members of the same network group while avoiding communication between members of different groups when the MU cable bus 26 is used by multiple network groups for communication. For example, one or more packets of the network data 16 sent from a first member to a second member of the same network group may include a header field having the address of the second member. The network data 16 may be ignored or disregarded by members other than the second member but received by the second member due to the address associated with the network data 16.

In one embodiment, multiple, different network groups can use the same physical portions of the MU cable bus 26 to communicate. For example, the members of a first network group may communicate with each other over a set of conductive pathways 120 in the MU cable bus 26 and members of a different, second network group may communicate with each other over the same set of conductive pathways 120, without communications among the first network group being received by the second network group, and vice-versa. Alternatively, different network groups may use different physical portions of the MU cable bus 26 to communicate. For example, the members of the first network group may communicate with each other over a first set of conductive pathways 120 in the MU cable bus 26 while members of the second network group communicate with each other over a different, distinct, and non-overlapping set of conductive pathways 120.

FIG. 13 shows a first configuration of the system 130. Here, the first router transceiver pair 132 and the second, redundant router transceiver pair 134 are configured in different network groups, i.e., they are part of different networks or sub-networks. As shown in FIG. 13, the first and second router transceiver units 34*a*, 34*b* belong to a first network group and are provided with a label of "NET GROUP #1." The third and fourth router transceiver units 34*c*, 34*d* belong to a different, second network group and are provided with a label of "NET GROUP #2." These labels represent the network groups by identifying the members of each network group.

In addition to being in different network groups, the first and second router transceiver units 34*a*, 34*b* of the first router transceiver pair 132 communicate over a first physical portion 136 of the MU cable bus 26, and the third and fourth router transceiver units 34*c*, 34*d* of the second router transceiver pair 134 communicate over a second, distinct physical portion 138 of the MU cable bus 26. The distinct physical portions 136, 138 can include different, non-overlapping sets of conductive pathways 120 of the MU cable bus 26. For example, none of the conductive pathways 120 in the first physical portion 136 may be included in the second physical portion 138, and vice-versa. Thus, the router transceiver units 34*a*, 34*b* of the first router transceiver pair 132 and the first network may communicate over a first wire (or set of wires) of the MU cable bus 26, and the router transceiver units 34*c*, 34*d* of the second router transceiver pair 134 and the second network may communicate over a second, different wire (or set of wires) of the MU cable bus 26. In one embodiment, "distinct" means the router transceiver units 34*a*, 34*b* of the first router transceiver pair 132 does not transmit over any of the conductive pathways 120 of the second router transceiver pair 134, and vice-versa. The router transceiver units 34*a*, 34*b*, 34*c*, 34*d* are connected to electronic components 32 of the vehicles 18*a*, 18*b*, as described above.

The system 130 may be configured for operation in different ways. In a first way, the first router transceiver pair 132 is used for network data 16 communications until and unless one or both of the router transceiver units 34*a*, 34*b* enters a failure condition, in which case the router transceiver units 34*c*, 34*d* of the other router transceiver pair 134 are used for network data 16 communication. One or more of the first and second vehicles 18*a*, 18*b* can include a monitor module 142 that is communicatively coupled with one or more of the router transceiver units 34*a*, 34*b*, 34*c*, 34*d* in the corresponding vehicle 18*a*, 18*b*. The monitor module 142 may include fault detection circuitry, such as one or more computer processors, microprocessors, controllers, microcontrollers, or other logic-based devices, that monitor the health of the router transceiver units 34*a*, 34*b*, 34*c*, 34*d*. The monitor module 142 can monitor the health of the router transceiver units 34*a*, 34*b*, 34*c*, 34*d* using standard computer networking equipment and/or methods. The monitor module 142 may be included in the control module 174 in one embodiment.

For example, the monitor module 142 may monitor the transmission and/or receipt of network data 16 from and/or to the various router transceiver units 34*a*, 34*b*, 34*c*, 34*d*. If one or more of the router transceiver units 34*a*, 34*b*, 34*c*, 34*d* stops or transmitting network data 16 (such as by transmitting incorrect signals without network data 16, transmitting network data 16 during an incorrect time slot, or transmitting network data 16 using an incorrect frequency, for example) or significantly decreases the rate at which network data 16 is transmitted, then the monitor module 142 may identify the one or more router transceiver units 34*a*, 34*b*, 34*c*, 34*d* as being in a failure condition. The monitor module 142 may notify the control module 174 which of the router transceiver pairs 132, 134 may include the router transceiver unit 34*a*, 34*b*, 34*c*, 34*d* in the failure condition and/or notify the control module 174 which router transceiver unit 34*a*, 34*b*, 34*c*, 34*d* is in the failure condition. The control module 174 can then cause the router transceiver units 34*a*, 34*b*, 34*c*, 34*d* of the other router transceiver pair 132 or 134 to take over or control communication of network data 16 through the MU cable bus 26. For example, the control module 174 may direct the switch module 172 to allow the router transceiver pair 132, 134 that does not include the router transceiver unit 34*a*, 34*b*, 34*c*, 34*d* in the failure condition to take over or control communication of the network data 16.

In one embodiment, if the first transceiver pair 132 is communicating network data 16 over the MU cable bus 26 and the second transceiver pair 134 is not transmitting network data 16, and the monitor module 142 determines that the router transceiver unit 34*a* or 34*b* of the first router transceiver pair 132 enters the failure condition, then the control module 174 may direct the switch module 172 to allow the third and fourth router transceiver units 34*c*, 34*d* of the second router transceiver pair 134 to take over communication of the network data 16. For example, the control module 174 may direct the switch module 172 to change states to allow the second router transceiver pair 134 to communicate the network data 16 and to prevent the first router transceiver pair 132 from communicating or attempting to communicate the network data 16. The second router transceiver pair 134 may take over in place of the first router transceiver pair 132.

In a second way, both router transceiver pairs 132, 134 may be concurrently used as redundant networks, with both router transceiver pairs 132, 134 communicating network data 16 over the MU cable bus 26 at the same time or during overlapping time periods. In such a case, if the control module 174 determines that either of the router transceiver pairs 132, 134 enters a failure condition based on feedback from the monitor module 142, then the control module 174 may direct the switch module 172 to cause the other of the router transceiver pairs 132, 134 may take over communication of the network data 16 on behalf of the router transceiver pair 132, 134 in the failure condition. For example, instead of both router transceiver pairs 132, 134 communicating the network data 16, the router transceiver pair 132, 134 that is not in the failure condition may communicate all of the network data 16.

By communicating over distinct physical portions 136, 138 of the MU cable bus 26, if one of the physical portions 136, 138 should fail, then communication of the network data 16 may continue over the other physical portion 136, 138. For example, if the physical portion 136 or 138 is mechanically damaged, such as by being cut or electrically shorted to another conductive pathway 120, then the other physical portion 136 or 138 may be used for continued communication of the network data 16. The monitor module 142 may identify a failure condition when the physical portion 136 or 138 is damaged due to the inability of the router transceiver units 34a, 34b, 34c, 34d that are coupled to the damaged physical portion 136 or 138 to communicate the network data 16. The use of different physical portions 136, 138 (e.g., two wires for each portion 136, 138) and different network groups (e.g., separate network addresses for the router transceiver units 34a, 34b, 34c, 34d), the amount of available bandwidth to communicate the network data 16 via the MU cable bus 26 is increased.

FIG. 14 shows a second configuration of the system 130. In the illustrated embodiment, the first router transceiver pair 132 and the second, redundant router transceiver pair 134 are configured in different network groups, similar to the embodiment shown in FIG. 13. However, instead of communicating over distinct physical portions 136, 138 (shown in FIG. 13) of the MU cable bus 26, the router transceiver pairs 132, 134 communicate over the same physical portion 136, or a common physical portion 136 of the MU cable bus 26. For example, both the router transceiver pairs 132, 134 may communicate between the vehicles 18a, 18b and over the MU cable bus 26 using one or more of the same conductive pathways 120.

In one embodiment, only one of the router transceiver pairs 132, 134 communicates the network data 16 at a time. For example, the first router transceiver pair 132 may communicate the network data 16 until the first router transceiver pair 132 enters a failure condition, at which point the redundant router transceiver pair 134 communicates the network data 16. Alternatively, the router transceiver pairs 132, 134 may concurrently communicate network data 16 between the vehicles 18a, 18b.

If the router transceiver pairs 132, 134 concurrently communicate network data 16 over the common physical portion 136 of the MU cable bus 26 (e.g., by transmitting the network data 16 at the same time or during at least partially overlapping time periods), different communication channels may be used by the first and second router transceiver pairs 132, 134. For example, the router transceiver pairs 132, 134 may coordinate the communication of network data 16 over the common portion 136 by using different communication channels. The control module 174 may direct the router transceiver pairs 132, 134 to use different channels. A communication channel can mean different frequencies, different bandwidths, different time slots in a Time Division Multiple Access (TDMA) method, different codes in a Code Division Multiple Access (CDMA) method, and the like. For example, the router transceiver pairs 132, 134 may be assigned different portions of the bandwidth available on the MU cable bus 26. Each router transceiver pair 132, 134 may only use the bandwidth that is assigned to that router transceiver pair 132, 134. As another example, the control module 174 may assign different frequency bands available on the MU cable bus 26 to the router transceiver pairs 132, 134. The MU cable bus 26 may have a limited frequency spectrum that is usable for transmitting the network data 16 (e.g., up to 30 MHz). Different frequency bands (e.g., different frequencies or different ranges of frequency in the available frequency spectrum) may be assigned to different router transceiver pairs 132, 134. In one embodiment, the first router transceiver pair 132 may be assigned the frequencies up to 15 MHz while the second router transceiver pair 134 may be assigned the frequencies from 15 MHz to 30 MHz.

Using the different channels can allow the router transceiver pairs 132, 134 to communicate the network data 16 on the same portion 136 of the MU cable bus 26 while reducing or avoiding interference between the network data 16 communicated by the different router transceiver pairs 132, 134. Each of the router transceiver pairs 132, 134 may be provided with information about the communication channel used by the other router transceiver pair 132, 134 in order to avoid communications conflicts. If the router transceiver pairs 132, 134 are not used concurrently (e.g., if one router transceiver pair 132 is used unless and until the router transceiver pair 132 enters a failure condition), then the router transceiver pairs 132, 134 may use the same communication channel.

In one embodiment, if the monitor module 174 determines that the router transceiver unit 34 in one of the sets of router transceiver units 34 disposed on a common vehicle 18a or 18b enters a failure condition, then the control module 174 may direct the other router transceiver unit 34 in the same set to take over communication of the network data 16. For example, if the router transceiver units 34a and 34b are communicating network data 16 in a first network group and the router transceiver unit 34a enters a failure condition, then the control module 174 can direct the switch module 172 to allow the router transceiver unit 34c in the same set of router transceiver units 34 on the first vehicle 18a to communicate the network data 16 with the router transceiver unit 34b on the second vehicle 18b. The control module 174 can direct the third router transceiver unit 34c in the second network group to communicate the network data 16 with the second router transceiver unit 34b in the first network group. Similarly, the control module 174 can direct the second router transceiver unit 34b in the first network group to communicate the network data 16 with the third router transceiver unit 34c in the second network group.

In another embodiment, if router transceiver units 34 on different vehicles 18a, 18b and in each router transceiver pair 132, 134 enter a failure condition, then the remaining router transceiver units 34 may communicate the network data 16 with each other. For example, the first router transceiver unit 34a on the first vehicle 18a may communicate network data 16 with the second router transceiver unit 34b on the second vehicle 18b using a first channel (e.g., a first frequency band or range of frequencies). The third router transceiver unit 34c on the first vehicle 18a may communicate network data 16 with the fourth router transceiver unit 34d on the second vehicle 18b using a different, second channel (e.g., a second frequency band or range of frequencies that differs and/or does not overlap with the first frequency band or range). If the second router transceiver unit 34b in the first router transceiver pair 132 and on the first vehicle 18a enters a failure condition and the third router transceiver unit 34c on the second vehicle 18b and in the second router transceiver pair 134 enters a failure condition, then the first router transceiver unit 34a and the fourth router transceiver units 34d may take over communication of the network data 16. For example, the first and fourth router transceiver units 34a, 34d may communicate the network data 16 using the first channel, the second channel, or a combination of the first and second channels (e.g., a frequency band or range than encompasses both the first and second frequency bands or ranges).

FIG. 15 shows a third configuration of the system 130. In the illustrated embodiment, the first router transceiver pair 132 and the second router transceiver pair 134 are configured in the same network group (e.g., "Net Group #1"). For example, the router transceiver units 34a, 34b, 34c, 34d may all be assigned or associated with addresses that belong to the same network group. Additionally, the first and second router transceiver units 34a, 34b of the first router transceiver pair 132 and the third and fourth router transceiver units 34c, 34d of the second router transceiver pair 134 communicate network data 16 over the same physical portion 136 of the MU cable bus 26. For example, the first router transceiver pair 132 may communicate network data 16 between the vehicles 18a, 18b through the conductive pathways 120 of the physical portion 136 and the second router transceiver pair 134 may communicate network data 16 between the vehicles 18a, 18b through one or more of the same conductive pathways 120 of the physical portion 136.

In a first possible mode of operation, the first router transceiver pair 132 is used to communicate network data 16 over the MU cable bus 26 until and unless one of the router transceiver units 34a, 34b of the enters a failure condition. If one of the router transceiver units 34a, 34b enters a failure condition, then another, redundant router transceiver unit 34c, 34d of the redundant router transceiver pair 134 may be used to continue communicating the network data 16. For example, if the first router transceiver unit 34a in the first vehicle 18a is communicating network data 16 with the second router transceiver unit 34b in the second vehicle 18b and the first router transceiver unit 34a fails, then the third router transceiver unit 34c in the same router transceiver set disposed on the same vehicle 18a as the failed first router transceiver unit 34a can take over for the first router transceiver unit 34a. For example, the third router transceiver unit 34c can continue to communicate network data 16 with the second router transceiver unit 34b on the second vehicle 18b. In another example, if the router transceiver unit 34b on the second vehicle 18b fails, then the other router transceiver unit 34d in the same router transceiver set on the second vehicle 18b as the second router transceiver unit 34b can take over and communicate the network data 16 with the first or third router transceiver unit 34a, 34c on the first vehicle 18a.

In another possible mode of operation, the router transceiver units 34a, 34b, 34c, 34d operate concurrently. For example, network data 16 is presented at the router transceiver units 34a, 34c on the first vehicle 18a and each of the router transceiver units 34a, 34c transmits the network data 16 over one or more of the same conductive pathways 120 in the same physical portion 136 of the MU cable bus 26 to the router transceiver units 34b, 34d on the second vehicle 18b. The network data 16 may then be communicated to downstream electronic components 32 of the second vehicle 18b. The term "concurrently" does not mean that data is necessarily communicated at exactly the same time, but rather that the router transceiver units are operating concurrently for data transmission consistent with network architecture and logic. For example, the router transceiver units 34a, 34c or the router transceiver units 34b, 34d that are disposed on the same vehicle 18a or 18b may communicate packets of the network data 16 over time periods that at least partially overlap. As described above, interference between concurrently transmitted network data 16 can be avoided or significantly reduced by allocating different channels (e.g., different bandwidths, different frequencies, different time slots, and the like) to the different router transceiver units 34a, 34b, 34c, 34d.

In one embodiment, if the router transceiver unit 34 in one of the sets of router transceiver units 34 disposed on a common vehicle 18a or 18b enters a failure condition, then the control module 174 may direct the other router transceiver unit 34 in the same set to take over communication of the network data 16. For example, if the router transceiver units 34a and 34b are communicating network data 16 and the router transceiver unit 34a enters a failure condition, then the control module 174 can direct the router transceiver unit 34c in the same set of router transceiver units 34 on the first vehicle 18a to communicate the network data 16 with the router transceiver unit 34b on the second vehicle 18b. The control module 174 can direct the third router transceiver unit 34c to communicate the network data 16 with the second router transceiver unit 34b. Similarly, the control module 174 can direct the second router transceiver unit 34b to communicate the network data 16 with the third router transceiver unit 34c.

Figure 16:
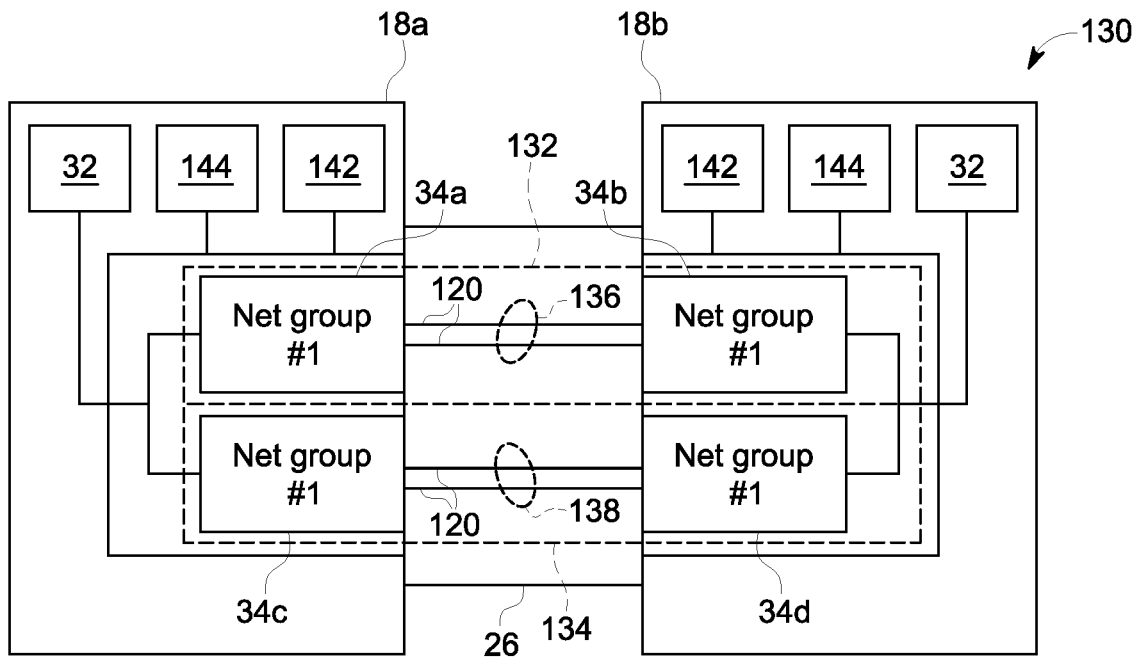

FIG. 16 shows another configuration of the system 130. In the illustrated embodiment, the first router transceiver pair 132 and the second router transceiver pair 134 are configured in the same network group (e.g., "Net Group #1"), but communicate over different physical portions 136, 138 of the MU cable bus 26. For example, the first and third router transceiver units 34a, 34c communicate network data 16 between each other over the conductive pathways 120 of the first physical portion 136 of the MU cable bus 26 while the second and fourth router transceiver units 34b, 34d communicate network data 16 between each other over the conductive pathways 120 of the distinct, second physical portion 136 of the MU cable bus 26. The network data 16 can be communicated concurrently by the router transceiver pairs 132, 134, or one of the router transceiver pairs 132 may serve as a primary communicator of the network data 16 until entering a failure condition, at which point the other router transceiver pair 134 can take over communication of the network data 16.

In the illustrated embodiment, the first router transceiver pair 132 and the second router transceiver pair 134 are configured in the same network group (e.g., "Net Group #1"). For example, the router transceiver units 34a, 34b, 34c, 34d may all be assigned or associated with addresses that belong to the same network group. Additionally, the first and second router transceiver units 34a, 34b of the first router transceiver pair 132 and the third and fourth router transceiver units 34c, 34d of the second router transceiver pair 134 communicate network data 16 over the same physical portion 136 of the MU cable bus 26. For example, the first router transceiver pair 132 may communicate network data 16 between the vehicles 18a, 18b through the conductive pathways 120 of the physical portion 136 and the second router transceiver pair 134 may communicate network data 16 between the vehicles 18a, 18b through one or more of the same conductive pathways 120 of the physical portion 136.

In any configurations of the system 130, the router transceiver units and/or electronic components may be provided with standard network switching and routing functionality, and/or additional switches and/or routers may be provided, to effectuate the orderly transmission of data in manner described. In the embodiments of FIGS. 13 and 14, each electronic component may be provided with two network addresses for communications across the different network groups.

Figure 17:
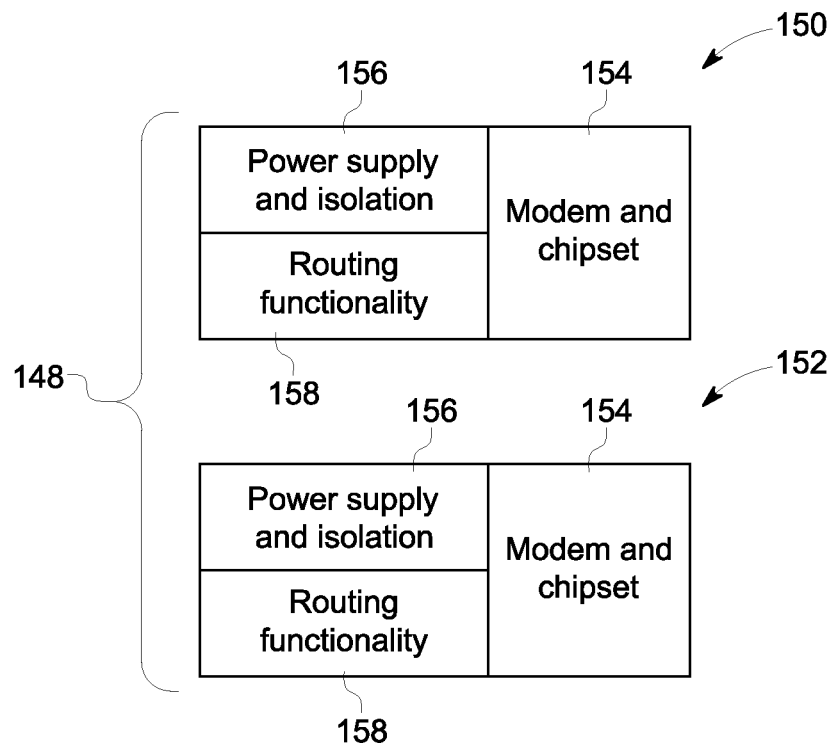
FIGS. 17-19 are schematic diagrams of different sets of router transceiver units disposed on-board a vehicle in accordance with various embodiment.

FIG. 17 is a schematic diagram of a set 148 of router transceiver units 150, 152 disposed on-board the same vehicle 18 in accordance with one embodiment. The router transceiver units 150, 152 may represent the router transceiver units disposed on the same vehicle 18a or 18b, such as the router transceiver units 34a, 34c on the first vehicle 18a or the router transceiver units 34b, 34d on the second vehicle 18b.

In the illustrated embodiment, the router transceiver units 150, 152 are redundant units. For example, each of the router transceiver units 150, 152 may include a modem and chipset component 154, a power supply and isolation component 156, and routing circuitry 158 ("routing functionality"). The modem and chipset component 154 may include circuitry that is conductively coupled with the MU cable bus 26. The modem and chipset component 154 modulates data to be transmitted as the network data 16 on the MU cable bus 26 and demodulates network data 16 that is received from the MU cable bus 26. The power supply and isolation component 156 may include circuitry that receives electric energy from the power source 144 and conveys the electric energy to the other components of the router transceiver units 150, 152 to power the components. The routing circuitry 158 receives the data that is demodulated from the network data 16 by the modem and chipset component 154 and communicates the demodulated data to one or more of the electronic components 32 disposed on-board the same vehicle 18 as the set 148 of the router transceiver units 150, 152.

Figure 18:
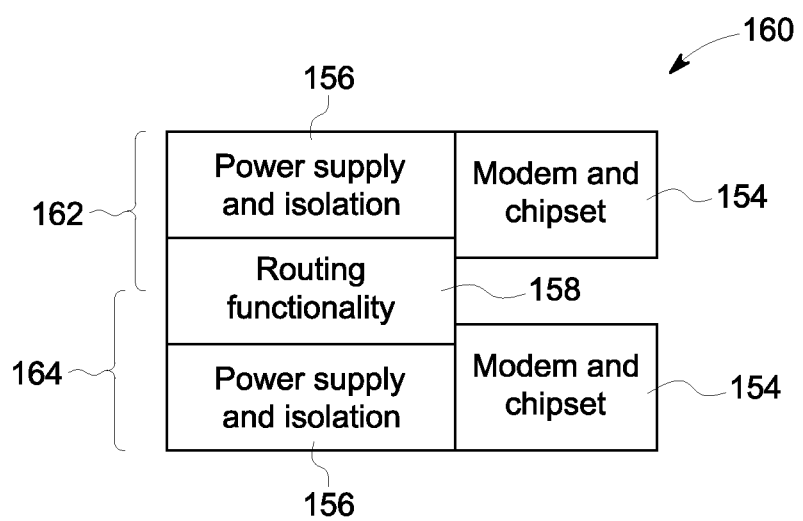

FIG. 18 is a schematic diagram of a set 160 of router transceiver units 162, 164 disposed on-board the same vehicle 18 in accordance with another embodiment. The router transceiver units 162, 164 may represent the router transceiver units disposed on the same vehicle 18a or 18b, such as the router transceiver units 34a, 34c on the first vehicle 18a or the router transceiver units 34b, 34d on the second vehicle 18b.

In the illustrated embodiment, the router transceiver units 162, 164 are partially redundant units. For example, each of the router transceiver units 162, 164 may include a separate modem and chipset component 154 and a separate power supply and isolation component 156. The routing circuitry 158 is shared by the router transceiver units 162, 164. For example, the router transceiver units 162, 164 may use the same circuitry and conductive pathways of the routing circuitry 158 to direct demodulated data from the network data 16 to one or more components 32 on the same vehicle 18 as the set 160.

Figure 19:
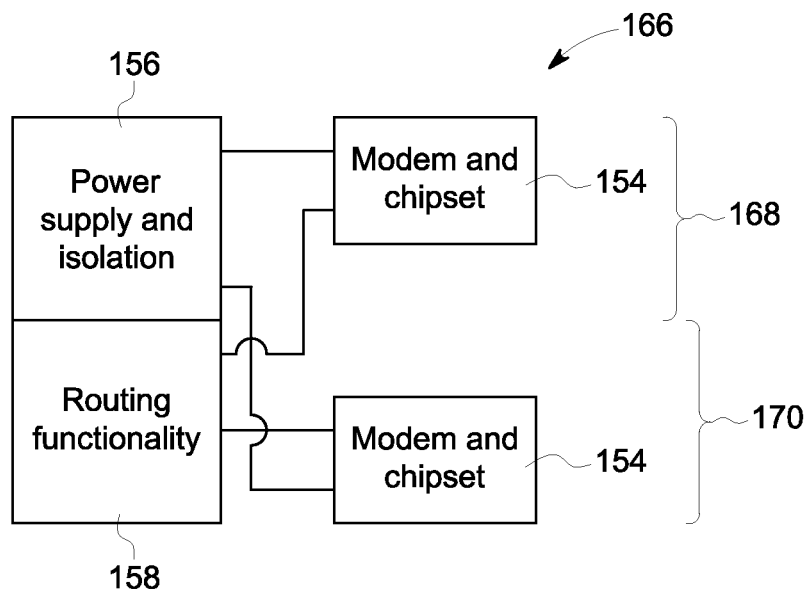

FIG. 19 is a schematic diagram of a set 166 of router transceiver units 168, 170 disposed on-board the same vehicle 18 in accordance with another embodiment. The router transceiver units 168, 170 may represent the router transceiver units disposed on the same vehicle 18a or 18b, such as the router transceiver units 34a, 34c on the first vehicle 18a or the router transceiver units 34b, 34d on the second vehicle 18b.

In the illustrated embodiment, the router transceiver units 168, 170 are partially redundant units. For example, each of the router transceiver units 168, 170 may include a separate modem and chipset component 154. The power supply and isolation component 156 and the routing circuitry 158 are shared by the router transceiver units 168, 170. For example, the router transceiver units 168, 170 may use the same circuitry and conductive pathways of the routing circuitry 158 to direct demodulated data from the network data 16 to one or more components 32 on the same vehicle 18 as the set 160. The router transceiver units 168, 170 may use the same circuitry and conductive pathways of the power supply and isolation component 156 to receive power from the power supply 144. For example, the power supply and isolation component 156 may direct the electric current from the power supply 144 to both modem and chipset components 154.

Figure 20:
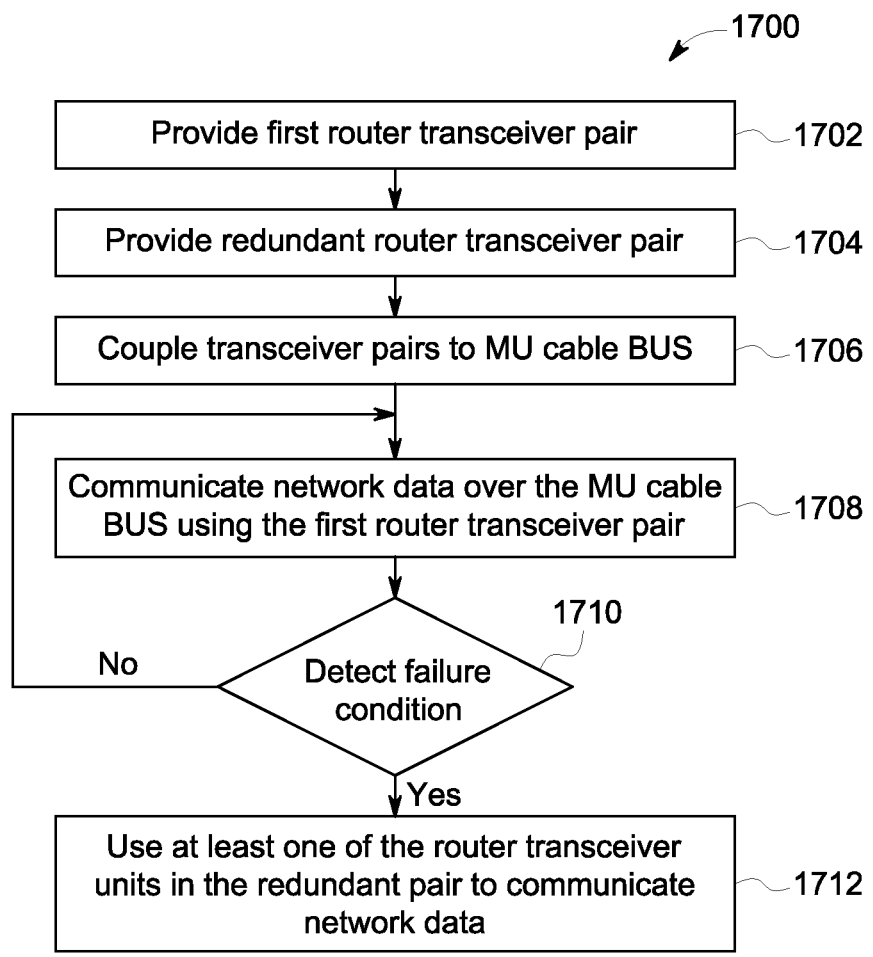
FIG. 20 is a flowchart of a method for communicating data in a vehicle consist in accordance with one embodiment.

FIG. 20 is a flowchart of a method 1700 for communicating data in a vehicle consist in accordance with one embodiment. The method 1700 may be used in conjunction with one or more of the embodiments shown and described in connection with FIGS. 13 through 16.

At 1702, a first router transceiver pair is provided in a vehicle consist. For example, the first router transceiver pair 132 may be provided by placing the first router transceiver unit 34a on the first vehicle 18a and the second router transceiver unit 34b on the second vehicle 18b. The router transceiver units 34a, 34b can be coupled with one or more electronic components 32 on the first and/or second vehicles 18a 18b.

At 1704, a redundant router transceiver pair is provided in the vehicle consist. For example, the redundant router transceiver pair 134 may be provided by placing the third router transceiver unit 34c on the first vehicle 18a and the fourth router transceiver unit 34d on the second vehicle 18b. The router transceiver units 34c, 34d can be coupled with one or more of the electronic components 32 on the first and/or second vehicles 18a, 18b.

At 1706, the router transceiver pairs are conductively coupled with an MU cable bus that extends between and interconnects the first and second vehicles of consist. For example, the first router transceiver unit 34a of the first router transceiver pair 132 and the third router transceiver unit 34c of the redundant router transceiver pair 134 in the first vehicle 18a can be coupled to the MU cable bus 26. The second router transceiver unit 34b of the first router transceiver pair 132 and the fourth router transceiver unit 34d of the redundant router transceiver pair 134 in the second vehicle 18b can be coupled to the MU cable bus 26. In one embodiment, the router transceiver pairs 132, 134 are coupled with different physical portions 136, 138 of the MU cable bus 26, as described above. Alternatively, the router transceiver pairs 132, 134 can be coupled with the same or a common physical portion 136 or 138 of the MU cable bus 26, also as described above.

At 1708, network data is communicated between the first and second vehicles of consist using the first router transceiver pair through the MU cable bus. For example, the first router transceiver unit 34a on the first vehicle 18a can communicate network data 16 to the second router transceiver unit 34b on the second vehicle 18b. Alternatively, a different combination of router transceiver units may be used to communicate network data between the vehicles. For example, at least one of the router transceiver units 34a, 34c on the first vehicle 18a can communicate network data 16 with at least one of the router transceiver units 34b, 34d on the second vehicle 18b.

At 1710, a determination is made as to whether one or more of the router transceiver units is in a failure condition. For example, the monitor module 142 on one or more of the vehicles 18a, 18b may determine if one or more of the router transceiver units 34a, 34b, 34c, 34d is unable to communicate the network data 16. If one or more of the router transceiver units 34a, 34b that is communicating the network data 16 enters the failure condition, then the first transceiver unit 132 may be unable to continue communicating the network data 16. As a result, flow of the method 1700 proceeds to 1712. On the other hand, if the first transceiver pair 132 is not in the failure condition and is able to continue communicating the network data 16, then flow of the method 1700 may return to 1708, where the first transceiver router pair 132 continues to communicate the network data 16.

At 1712, at least one of the router transceiver units of the redundant router transceiver pair that is not in the failure condition is used to communicate the network data. For example, if the first router transceiver unit 34a is in the failure condition, then the third router transceiver unit 34c on the same vehicle 18a may take over communication of the network data 16 to and from the vehicle 18a. As another example, if the second router transceiver unit 34b is in the failure condition, then the fourth router transceiver unit 34d on the same vehicle 18b may take over communication of the network data 16 to and from the vehicle 18b.

In any of the embodiments set forth herein, the network data may be TCP/IP-formatted or SIP-formatted data. Additionally, each vehicle may include a computer unit, with the computer units 32a-32c communicating with one another by transmitting the network data, formatted as TCP/IP data or SIP data or otherwise, over the existing MU cable bus 26, and the computer units thereby forming a computer network, e.g., an Ethernet-type network.

Embodiments in this disclosure may be directed to systems and methods for data communications between remote rail vehicles of a multiple-unit (MU) rail vehicle configuration. In one embodiment, systems and methods are provided for data communications through different data paths based on operating conditions. For example, in a MU rail vehicle configuration where a lead control rail vehicle remotely controls operation of the other rail vehicles, data communications are sent from the lead control rail vehicle directly to the other rail vehicles through a dedicated, narrow-band radio link, or the data communications are sent relayed through a wireless network provided by a wayside device to the remote rail vehicles based on operating conditions. In one example, data communications are relayed through the wireless network provided by the wayside device in response to not receiving a confirmation from a remote rail vehicle of receiving a data communication sent through the radio link.

In another example, when the rail vehicle is in range to recognize the wireless network provided by the wayside device, data communications are relayed through the wireless network, and when the rail vehicle does not recognize the wireless network, the same data communications are sent through a different data communication path (e.g., data radio). By directing data communications through different data communication paths based on operating conditions, the same data can be sent through different communication paths and the remote rail vehicles in a MU rail vehicle configuration can remain in communication even as operating conditions vary. Accordingly, data communication between remote rail vehicles is made more reliable.

Figure 21:
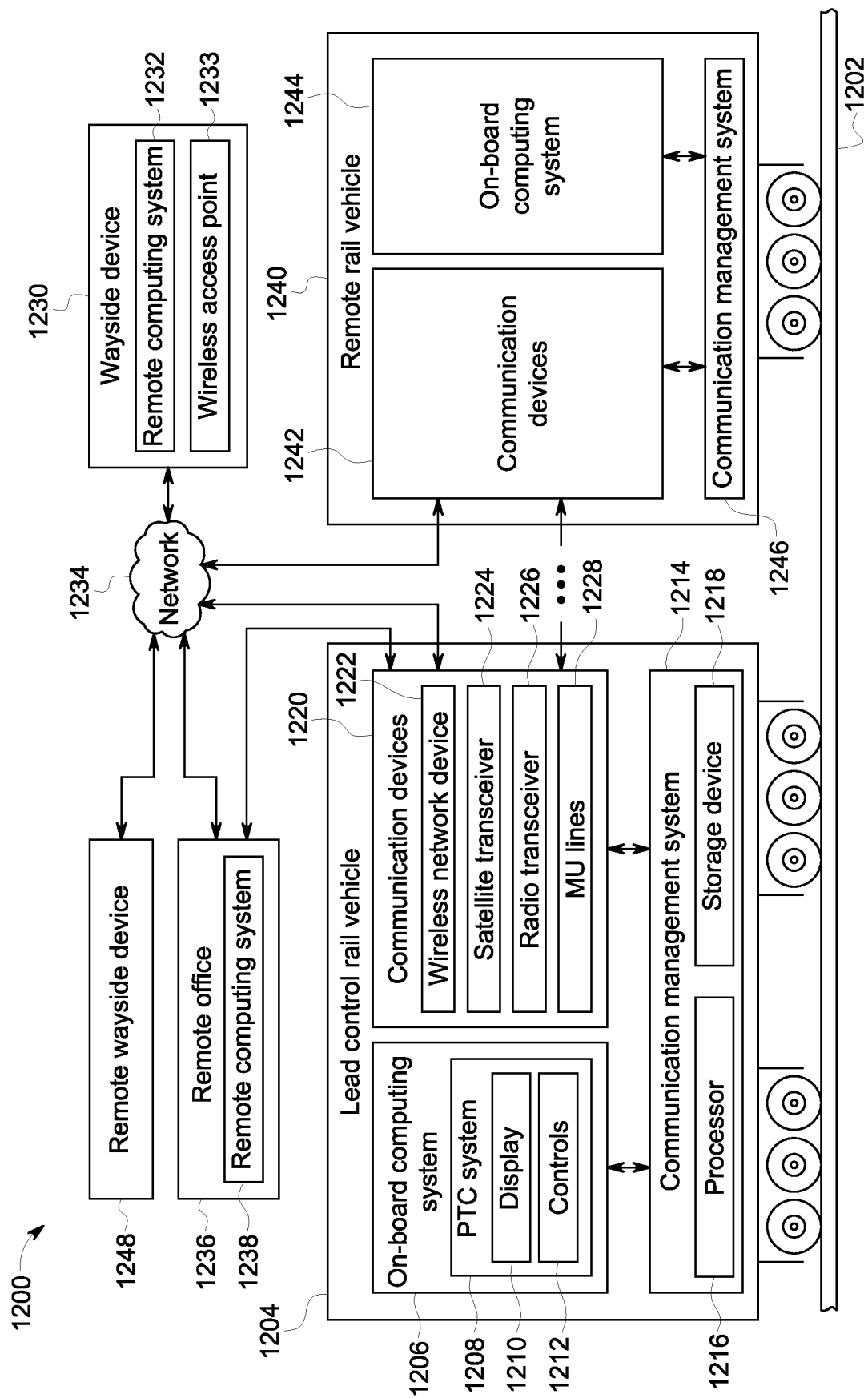
FIG. 21 is a schematic diagram of an example embodiment of a rail vehicle system of the present disclosure.

FIG. 21 is a schematic diagram of an example embodiment of a vehicle system, herein depicted as a vehicle system 1200, configured to travel on a route 1202. The vehicle system 1200 is a multiple-unit (MU) rail vehicle system including a plurality of rail vehicles, herein depicted as a lead control vehicle 1204 and a remote vehicle 1240. The lead control vehicle 1204 and the remote vehicle 1240 can represent rail vehicles that provide tractive effort to propel the vehicle system 1200. In one example, the plurality of rail vehicles are diesel-electric vehicles that each include a diesel engine (not shown) that generates a torque output that is converted to electricity by an alternator (not shown) for subsequent propagation to a variety of downstream electrical components, such as a plurality of traction motors (not shown) to provide tractive power to propel the vehicle system 1200.

Although only two rail vehicles are depicted, it will be appreciated that the rail vehicle system may include more than two rail vehicles. Furthermore, the vehicle system 1200 may include rolling stock that does not provide power to propel the vehicle system 1200. For example, the lead control rail vehicle 1204 and the remote rail vehicle 1240 may be separated by a plurality of units (e.g., passenger or freight cars) that do not provide propulsion. On the other hand, every unit in the MU rail vehicle system may include propulsive system components that are controllable from a single location. The rail vehicles 1204, 1240 are physically linked to travel together along the route 1202, such as a track, rail, set of rails, etc. Alternatively, the vehicles may be another type of vehicle, such as automobiles, mining vehicles, marine vessels, etc. The vehicles may not be mechanically coupled with each other, but may communicate with each other to coordinate movements such that the vehicles travel together along the route 1202 as a group.

In the illustrated embodiment, the lead control rail vehicle 1204 may include an on-board computing system 1206 to control operation of the vehicle system 1200. In particular, the on-board computing system 1206 controls operation of a propulsion system (not shown) on-board the lead control rail vehicle 1204 as well as provides control commands for other rail vehicles in the rail vehicle system, such as the remote rail vehicle 1240. The on-board computing system 1206 is operatively coupled with a communication management system 1214 that, in turn, is operatively coupled with a plurality of communication devices 1220. When the on-board computing system 1206 generates data communications (e.g., control commands), the communication management system 1214 determines which communication path (or device) to use for sending the data communications to the remote rail vehicle 1240.

In an embodiment, the on-board computing system 1206 may include a positive train control (PTC) system 1208 that may include a display 1210, and operational controls 1212. The PTC system 1208 may be positioned in a cabin of the lead control rail vehicle 1204 to monitor the location and movement of the vehicle system 1200. For example, the PTC system 1208 may enforce travel restrictions including movement authorities that prevent unwarranted movement of the vehicle system 1200. Based on travel information generated by the vehicle system 1200 and/or received through the plurality of communication devices 1220, the PTC system 1208 determines the location of the vehicle system 1200 and whether and how fast it can travel based on the travel restrictions, and determines if movement enforcement is performed to adjust the speed of the rail vehicle (including ordering a full stop).

The travel information may include features of the railroad track (e.g., route 1202), such as geometry, grade, etc. Also, the travel information may include travel restriction information, such as movement authorities and speed limits, which can be travel zone or track dependent. The travel restriction information can take into account rail vehicle system state information such as length, weight, height, etc. In this way, rail vehicle collisions, over speed derailments, incursions into work zones, and/or travel through an improperly positioned switch can be reduced or prevented. As an example, the PTC system 1208 may command the propulsion systems of the lead control rail vehicle 1204 as well as to the other rail vehicles, such as the remote rail vehicle 1240, to slow or stop the vehicle system 1200 to comply with a speed restriction or a movement authority.

In one example, the PTC system 1208 determines location and movement authority of the vehicle system 1200 based on travel information that is organized into a database (not shown) that is stored in a storage device of the PTC system 1208. In one example, the database houses travel information that is updated by the remote office 1236 and/or the wayside device 1230 and is received by the communication management system 1214 through one or more of the plurality of communication devices 1220. In a particular example, travel information is received over a wireless network 1234 provided by a wireless access point 1233 of the wayside device 1230 through a wireless network device 1222.

The vehicle location information may be determined from GPS information received through a satellite transceiver 1224. Another suitable source of location information is travel information received through a radio transceiver 1226. In one example, the vehicle location information may be determined from sensors, such as beginning of vehicle location and end of vehicle location sensors that are received through the radio transceiver 1226 and/or multiple unit (MU) lines 1228 from other remote vehicles, such as the remote vehicle 1240 of the vehicle system 1200.

The display 1210 presents rail vehicle state information and travel information to an operator in the cabin of the lead control rail vehicle 1204. In one example, the display 1210 presents a rolling map that provides an indication of the location of the vehicle system 1200 to the operator. For example the rolling map may include a beginning of rail vehicle location, an end of rail vehicle location, rail vehicle length, rail road track zone, mile post markers, wayside device location, GPS location, etc. The rolling map may be annotated with movement authority regulations and speed restrictions.

The operational controls 1212 enable the operator to provide control commands to control operation of the vehicle system 1200. In one example, the operational controls 1212 include buttons, switches, and the like that are physically actuated to provide input. In one example, the operational controls 1212 include a touch sensitive display that senses touch input by the operator. For example, the operational controls 1212 include a speed control that initiates the sending of control commands to propulsion systems of the different rail vehicles of the vehicle system 1200. The speed control may include a throttle input, a brake input, and a reverse input. The operational controls 1212 may include an automated control feature that automatically determines control commands based on travel information received by the PTC system 1208 to automatically control operation of the vehicle system 1200.

The communication management system 1214 determines which data communication path to use for sending and receiving data communications between remote rail vehicles of the vehicle system 1200 based on operating conditions. For example, operating conditions may include availability of a data communications path. If a plurality of data communications paths is available, operating conditions may include prioritization criteria for selecting a data communications path. Prioritization criteria may include a lowest cost data communications path that is available, a highest reliability data communications path that is available, or a highest bandwidth data communications path that is available. The plurality of communications paths may provide redundancy that enables the same data to be sent through different data paths to enable data communication between vehicles even as operating conditions vary.

Furthermore, the communication management system 1214 may manage operation of resources distributed throughout the vehicle system and/or resources off-board the vehicle system to meet an operational load of the vehicle system. In one example, the operational load may include processing tasks that are assigned to different computing systems of the vehicle system 1200, the wayside device 1230, and/or the remote office 1236. In particular, the communication management system 1214 determines which processors are available and assigns processing tasks to available processors to meet the operational load of the vehicle system 1200. Processing tasks may include determining location, determining braking distance, determining optimum speed, etc. In cases where processing tasks are performed off-board the vehicle system 1200, such as at a remote computing system 1232 of the wayside device 1230, data communications are sent from the lead control rail vehicle 1204 (or another rail vehicle) to the wireless network 1234 through the wireless network device 1222. The remote computing system 1232 performs the processing task and the results are sent back to the lead control rail vehicle 1204 on the wireless network 1234.

In another example, operational load may include a propulsive load that is to be generated by the vehicle system to meet a desired speed. In particular, the communication management system 1214 determines the propulsive capability of available rail vehicles and relays propulsion system control commands to on-board computers on selected rail vehicles through the wireless network 1234 provided by the wayside device 1230 to the selected rail vehicles so as to collectively generate enough tractive power to meet the desired speed. If the speed is lower than the collective capability of the plurality of rail vehicles of the vehicle system 1200, then control commands are relayed to some selected rail vehicle while others remain dormant. As operation load varies, the control commands can be sent to the dormant rail vehicles to provide additional capability.

Furthermore, the communication management system 1214 switches operational control of the vehicle system between on-board computers of different rail vehicles of the vehicle system based on operating conditions. In one example, in response to degradation of the on-board computing system 1206 on the lead control vehicle 1204 (the on-board computing system thereby being a degraded computing system), the communication management system commands initialization of an on-board computing system on a different rail vehicle, such as remote rail vehicle 1240, to take control of operation of the vehicle system.

The communication management system may include one or more processors 1216 and a non-transitive storage device 1218 that holds instructions that when executed perform operations to control the communication management system. For example, the storage device may include instructions that when executed by processor 1216 perform methods described in further detail below with reference to FIGS. 24-28.

As discussed above, the vehicle system is equipped with a plurality of different communication devices 1220 that form different data communication paths between rail vehicles of the vehicle system as well as data communication paths off-board the vehicle system such as with the wayside device 1230 and/or the remote office 1236. The communication management system may determine which communication device to use for data communications based on operating conditions. The plurality of communications devices 1220 may include a wireless network device 1222, a satellite transceiver 1224, a radio transceiver 1226, and multiple-unit (MU) lines 1228.

The wireless network device 1222 may dynamically establish a wireless communication session with a wireless network, such as the wireless network 1234 provided by the wireless access point 1233 of the wayside device 1230, to send and receive data communications between different rail vehicles of the vehicle system 1200. As the vehicle system travels through different travel zones, the wireless network device 1222 detects different wireless network access points provided by wayside devices or other communication devices along the railroad track (e.g., route 1202). A single wireless network may cover a travel territory, and different wayside devices provide access points to the wireless network.

Non-limiting examples of protocols that the wireless network device 1222 follows to connect to the wireless network 1234 include IEEE 802:11, Wi-Max, Wi-Fi, etc. The wireless network device 1222 may generate a unique identifier that points to a particular vehicle system. The unique identifier is employed in data communication messages of rail vehicles in the vehicle system so that wireless network devices on rail vehicles of the same rail vehicle system appropriately identify and receive message intended for them. By relaying intra-vehicle data communications through the wireless network 1234, data communication is made more reliable, especially in conditions where direct radio communication can be lost.

The satellite transceiver 1224 sends and receives data communications that are relayed through a satellite. In one example, the satellite transceiver 1224 communicates with the remote office 1236 to send and receive data communications including travel information and the like. In one example, the satellite transceiver 1224 receives rail vehicle system location information from a third-party global position system to determine the location of the rail vehicle system. In one example, the communication management system assigns processing tasks to a remote computing system 1238 at the remote office 1236 and the data communications are sent and received through the satellite transceiver 1224.

The radio transceiver 1226 provides a direct radio frequency (RF) data communications link between rail vehicles of the vehicle system 1200. For example, the radio transceiver 1226 of the lead control rail vehicle 1204 sends a data communication that is received by a radio transceiver on the remote vehicle 1240. In one example, the vehicle system may include repeaters to retransmit direct RF data communications between radio transceivers. In one example, the radio transceiver 1226 may include a cellular radio transceiver to enable data communications, through a third-party, to remote sources, such as the remote office 1236.

In some embodiments, the radio transceiver 1226 may include a cellular radio transceiver (e.g., cellular telephone module) that enables a cellular communication path. In one example, the cellular radio transceiver communicates with cellular telephony towers located proximate to the track. For example, the cellular transceiver enables data communications between the vehicle system and the remote office 1236 through a third-party cellular provider. In one embodiment, each of two or more rail vehicles in the system (e.g., consist) has a respective cellular radio transceiver for communications with other rail vehicles in the system through the third-party cellular provider.

The multiple-unit (MU) lines 1228 may provide wired power connections between rail vehicles of the vehicle system 1200. In one example, the MU lines 1228 include 27 pin cables that connect between each of the rail vehicles. The MU lines 1228 supply 74 Volt direct current (DC), 1 Amp power to the rail vehicles. As another example, the MU lines supply 110 Volt DC power to the rail vehicles. The power signal sent through the MU lines 1228 is modulated to provide additional data communications capability. In one example, the power signal is modulated to generate a 10 M/second information pipeline. Non-limiting examples of data communications passed through the MU lines 1228 may include travel information, rail vehicle state information and rail vehicle control commands, such as reverse, forward, wheel slip indication, engine run, dynamic brake control, etc.

The wayside device 1230 may embody different devices located along a railroad track (e.g., route 1202). Non-limiting examples of wayside devices include signaling devices, switching devices, communication devices, etc. The wayside device 1230 may include the remote computing system 1232. In one example, the remote computing system 1232 provides travel information to the vehicle system 1200. In one example, the remote computing system 1232 is assigned a processing task by the communication management system in the event that available on-board processing capabilities of the rail vehicle system do not meet the operational load of the vehicle system 1200. The wayside device 1230 may include the wireless access point 1233 which allows the wireless network device 1222 as well as wireless network devices on other rail vehicles in range to connect to the wireless network 1234. The communication management system on-board rail vehicles of the vehicle system dynamically establish network sessions with the wireless network 1234 through the wireless network device 1222 to relay data communication between rail vehicles of the vehicle system 1200.

In some embodiments, under some conditions, information and/or operations are transferred between wayside devices by relaying communication over the network and through the rail vehicle system. For example, data communications are sent from the wayside device 1230, through the network 1234, to the wireless network device 1222, and the data communications are relayed by the wireless network device 1222 to a remote wayside device 1248 that is in data communication range. In some cases, the rail vehicle system extends the data communication range of the wayside devices due to the length of consist. In some cases, the wayside device 1230 sends data communications through the network 1234 to the remote wayside device 1248 without relaying the data communications through the wireless network device 1222. In one example, two wayside devices are configured to perform similar or equivalent operations, and in response to degradation of one of the wayside devices, the functionality of the degraded wayside device is transferred to the other wayside device, by sending data communications over the wireless network and relayed through the wireless network device of the rail vehicle system.

For example, two signaling light processing units are positioned within communication range of the rail vehicle system, upon degradation of one of the signaling light processing units, processing operations for the degraded signal light processing unit are transferred over the wireless network to the functioning signaling light processing unit to carry out the processing operations to maintain operation of the signaling light having the degraded processing unit.

Furthermore, in some cases, functionality or processing operations may be transferred from a wayside device to the rail vehicle system. For example, the remote computing system 1232 of the wayside device 1230 may calculate a braking curve for a section of track. Upon degradation of the remote computing system 1232, the wayside device 1230 transfers, through the wireless network 1234, the brake curve calculation to the on-board computing system 1206. Accordingly, the on-board computing system 1206 calculates the brake curve in order to maintain functionality that would otherwise be lost due to degradation of the remote computing system 1232. As another example, a switch is configured to calculate a setting or block occupancy. Upon degradation of the switch, the setting or block occupancy calculation is transferred, through the wireless network 1234, to the on-board computing system 1206. By relaying data communications between remote wayside devices through a rail vehicle, processing operation can be transferred between different wayside devices. Moreover, by establishing a wireless network session between a wayside device and a rail vehicle system, wayside device processing operations can be transferred from a wayside device to processing resources of a rail vehicle system. Accordingly, data communications and processing operations is made more robust since functionality is maintained even upon degradation of a rail vehicle or wayside device component.

The remote office 1236 may include the remote computing system 1238. In one example, the remote computing system 1238 provides travel information to the vehicle system 1200, such as a travel database that is downloaded to the on-board computing system 1206. In one example, the remote office 1236 communicates directly with the vehicle system (e.g., through satellite transceiver 1224). In one example, the remote office 1236 relays data communications through the wireless network 1234 of the wayside device 1230 to the vehicle system 1200. In one example, the remote computing system 1238 is assigned a processing task by the communication management system in the event that available on-board processing capabilities of the rail vehicle system do not meet the operational load of the vehicle system 1200.

In some embodiments, the components in the lead control vehicle 1204 are replicated in each rail vehicle in the vehicle system 1200. For example, the remote rail vehicle 1240 may include an on-board computing system 1244 that is operatively coupled with a communication management system 1246 that, in turn, is operatively coupled with a plurality of communication devices 1242. For example, the plurality of communication devices may include a wireless network device, a satellite transceiver, a radio transceiver and MU lines. These components provide equivalent functionality and capability as the instances on the lead control rail vehicle 1204. By replicating the components on each rail vehicle, each rail vehicle is capable of communicating and/or controlling the other rail vehicles in the vehicle system 1200. Accordingly, operation of the vehicle system may be more flexible and reliable. Note in some embodiments, one or more of the communication devices may be omitted from a rail vehicle.

Figure 22:
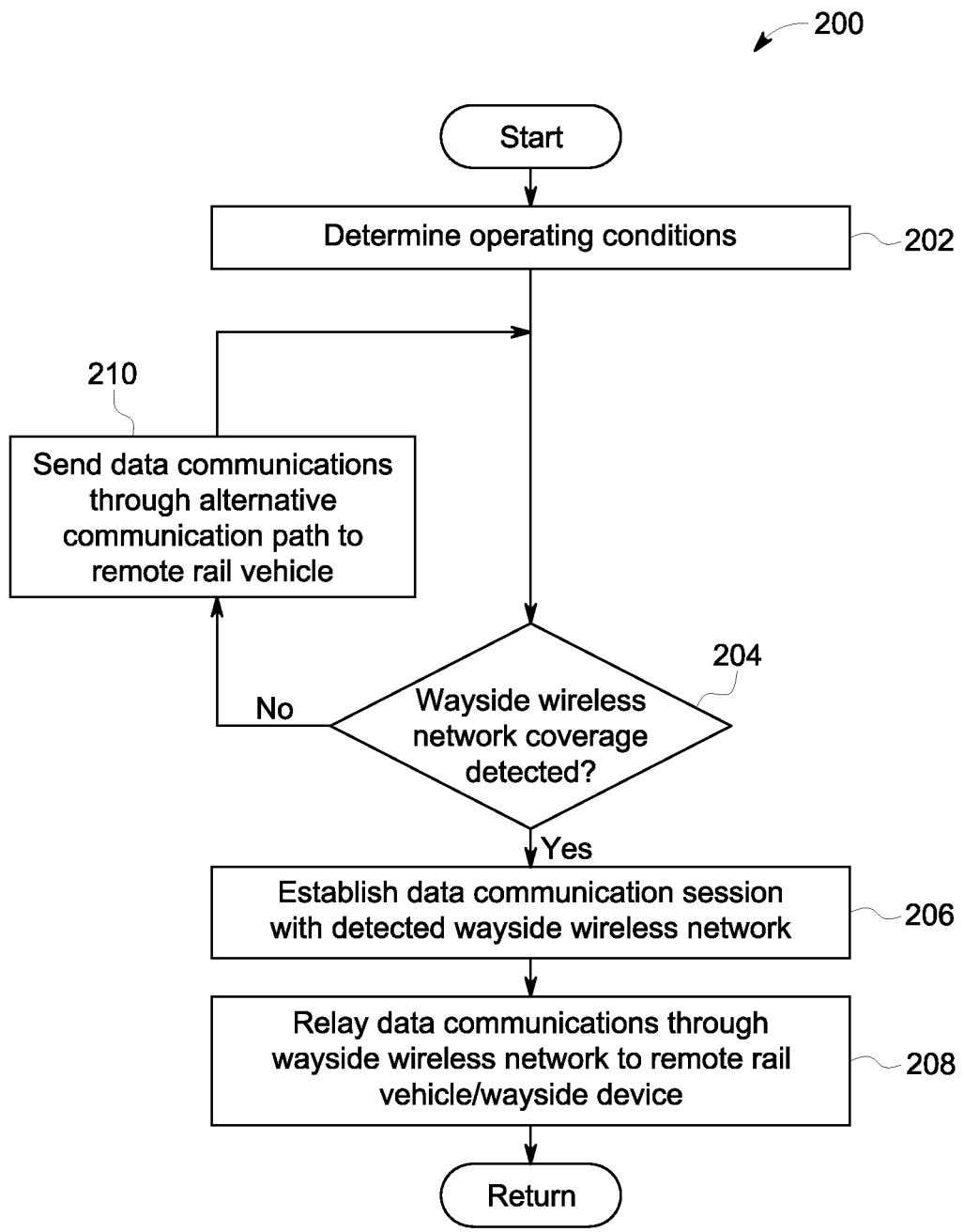
FIG. 22 is a flow diagram of an example embodiment of a method for relaying data communications through a wayside wireless network between remote rail vehicles of a multiple-unit rail vehicle system.

FIG. 22 is a flow diagram of an example embodiment of a method 200 for relaying data communications through a wayside wireless network between remote rail vehicles of a MU rail vehicle system. In one example, the method 200 is performed by the communication management system of the vehicle system depicted in FIG. 21.

At 202, the method 200 may include determining operating conditions. Determining operating conditions may include determining whether or not an on-board computing system is functioning properly and whether or not the on-board computing system is controlling operation of remote rail vehicles of the rail vehicle system. Determining operating conditions may include determining an availability of data communication paths for the rail vehicle system. Determining operating conditions may include receiving rail vehicle state and location information.

At 204, the method 200 may include determining if the rail vehicle system is in a coverage range of a wireless network provided by a wayside device. In one example, the wireless network device 1222 detects wireless network coverage by receiving wireless network signals from a wayside device. If it is determined that wireless network coverage is detected, the method moves to 206. Otherwise, the method moves to 210.

At 206, the method 200 may include dynamically establishing a data communication session with the detected wayside wireless network. In one example, establishing the data communication session may include assigning a unique address to the rail vehicle system, so that rail vehicles in the rail vehicle system can identify messages intended for the rail vehicles as opposed to message intended for another rail vehicle system. The unique address may include a symbol for the rail vehicle system or unique attribute of rail vehicle system.

At 208, the method 200 may include relaying data communications through the wayside wireless network to a remote rail vehicle of the rail vehicle system and/or a remote wayside device. In one example, the communication management system sends data communications through the wireless network device 1222 to the wireless access point 1233. Subsequently, the data communications are relayed over the wireless network 1234 to a wireless network device of a remote rail vehicle. For example, the wireless access point 1233 sends the data communications to the wireless network device of the remote rail vehicle. In one example, the data communications include control commands to remotely control operation of the remote rail vehicle. In one example, data communications are sent from the wayside device 1230, over the wireless network 1234 and relayed through the wireless network device 1222, to the remote wayside device 1248.

At 210, the method 200 may include sending data communication through an alternative communication path to the remote rail vehicle. Since there is insufficient wireless network coverage, the communication management system selects a different communication device to send the data communications to the remote rail vehicle. Insufficient network coverage may include little or no network coverage that would make data communication through the wireless network less reliable. In one example, the communication management system sends data communication through the radio transceiver 1226 to the remote rail vehicle. In one example, the communication management system sends data communications through the MU lines 1228 to the remote rail vehicle. Note the same data is sent through the different communication paths to enable data communication between rail vehicles of the vehicle system 1200.

The described method enables intra-train data communications to be sent from one rail vehicle in a MU rail vehicle system (e.g., consist), relayed through a wayside wireless network, and received by a remote rail vehicle of the MU rail vehicle system. By relaying intra-train data communications through the wayside wireless network when network coverage is available, the reliability of data communications can be improved by the established data communications session. Moreover, the above-described method enables flexible operation by sending data communications through another communication path when wireless network coverage is not available.

Figure 23:
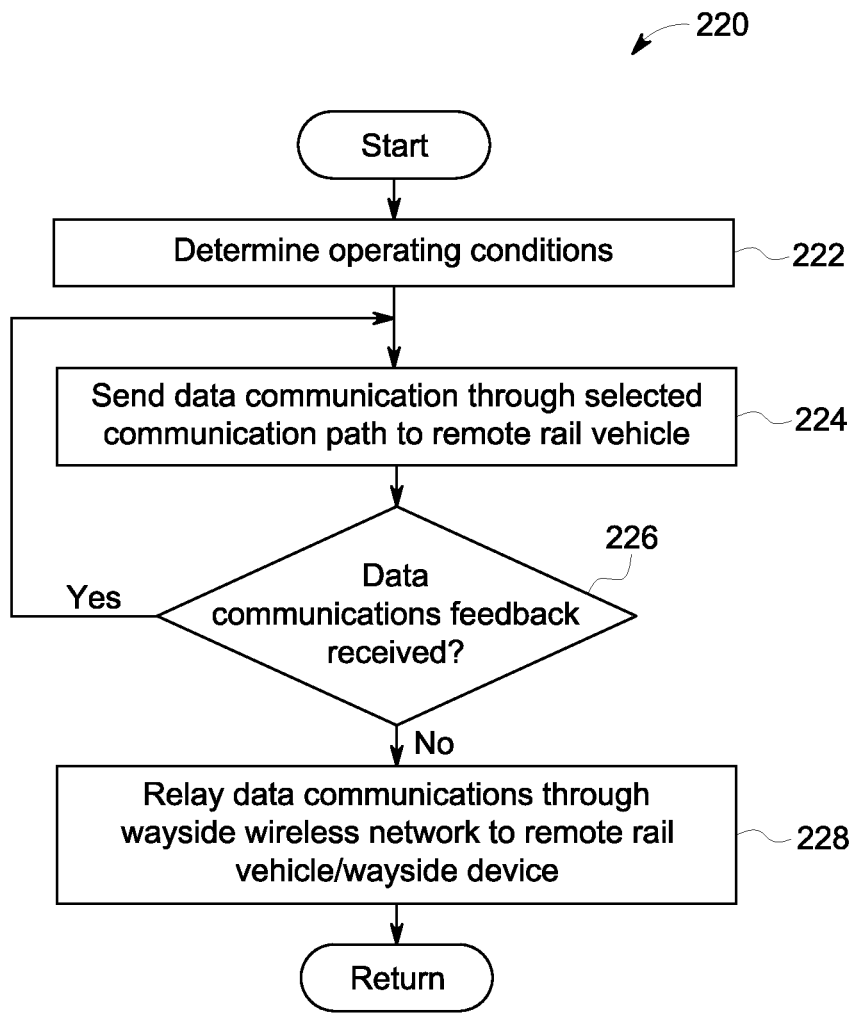
FIG. 23 is a flow diagram of an example embodiment of a method for relaying data communications through a wayside wireless network between remote rail vehicles of a multiple-unit rail vehicle system in response to a loss of data communications.

FIG. 23 is a flow diagram of an example embodiment of a method 220 for relaying data communications through a wayside wireless network between remote rail vehicles of a MU rail vehicle system in response to a loss in data communications through an alternative data path. In one example, the method is performed by the communication management system of the vehicle system depicted in FIG. 21.

At 222, the method 220 may include determining operating conditions. Determining operating conditions may include determining whether or not an on-board computing system is functioning properly and whether or not the on-board computing system is controlling operation of remote rail vehicles of the rail vehicle system. Determining operating conditions may include determining an availability of data communication paths for the rail vehicle system. Determining operating conditions may include receiving rail vehicle state and location information.

At 224, the method 220 may include sending data communications through a selected communication path to a remote rail vehicle in the MU rail vehicle system. In one example, the selected data communication path may include a direct RF link to the remote rail vehicle, where data communications are sent through the radio transceiver 1226.

At 226, the method 220 may include determining if data communications feedback is received. In one example, data communications feedback may include a confirmation received from the remote rail vehicle indicating that the remote rail vehicle received the data communications. In one example, where the data communications include control commands, the data communications feedback may include an adjustment in operation of the remote rail vehicle. If it is determined that data communication feedback is received, the method 220 moves returns to 224. Otherwise, the method 220 moves to 228.

In one example, data communications are sent through a direct RF link between remote rail vehicles. However, various conditions may cause a loss of data communications. For example, a rail vehicle system configuration, such as a very long consist where there is a large distance between rail vehicles, may cause a loss of data communications through the direct RF link. As another example, geography, such as terrain that does not reflect a radio signal to a remote vehicle, may cause a loss of data communications through the direct RF link.

At 228, the method 220 may include relaying data communications through the wayside wireless network to a remote rail vehicle of the rail vehicle system and/or a remote wayside device. The same data is relayed through the wayside wireless network in response to a loss of data communications by an alternative data communications path. In one example, the communication management system sends data communications to the wireless network 1234 through the wireless network device 1222. Subsequently, the wireless network 1234 relays the data communications to a wireless network device of a remote rail vehicle. In one example, the data communications include control commands to remotely control operation of the remote rail vehicle. In one example, data communications are sent from the wayside device 1230, over the wireless network 1234 and relayed through the wireless network device 1222, to the remote wayside device 1248.

By relaying data communications through a wayside wireless network in response to a loss of data communications by an alternative data communications path (e.g., a direct RF link), intra-train data communication can be achieved between remote rail vehicles even when operating conditions prevent communication by the alternate communications path. Accordingly, intra-train data communications and remote control of rail vehicles in a multi-unit rail vehicle system is made more robust and reliable as operating conditions vary.

Figure 24:
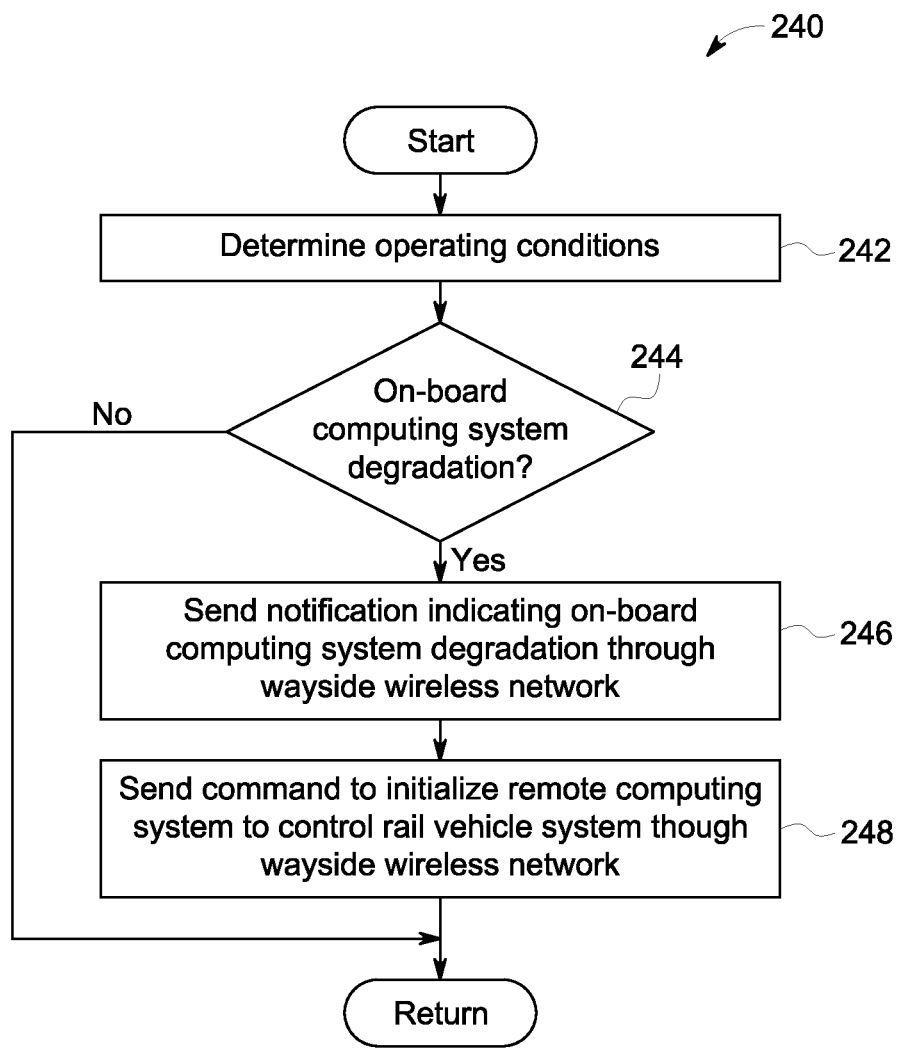
FIG. 24 is a flow diagram of an example embodiment of a method for transferring control to a rail vehicle of a multiple-unit rail vehicle system through a wayside wireless network.

FIG. 24 is a flow diagram of an example embodiment of a method 240 for transferring control to a rail vehicle of a MU rail vehicle system through a wayside wireless network. In one example, the method 240 is performed by the communication management system of the vehicle system depicted in FIG. 21.

At 242, the method 240 may include determining operating conditions. Determining operating conditions may include determining whether or not an on-board computing system is functioning properly and whether or not the on-board computing system is controlling operation of remote rail vehicles of the rail vehicle system. Determining operating conditions may include determining an availability of data communication paths for the rail vehicle system. Determining operating conditions may include receiving rail vehicle state and location information.

At 244, the method 240 may include determining if the on-board computing system is degraded. In one example, the degradation determination is made responsive to setting of a localized flag indicating a component of the on-board computing system is not functioning properly. In one example, the degradation determination is made based on unresponsiveness to control adjustment made manually or automatically. If it is determined that the on-board computing system is degraded, the method 240 moves to 246. Otherwise, the method 240 returns to other operations.

At 246, the method 240 may include sending a notification, through the wayside wireless network, indicating degradation of the on-board computing system. In some cases, the notification is relayed to other remote rail vehicles of the rail vehicle system. In some cases, the notification is relayed to a remote office. In one example, the notification may include a signal commanding an alarm to sound to notify an operator locally or remotely.

At 248, the method 240 may include sending a command, through the wayside wireless network, to initialize a remote computing system to control the rail vehicle system. In one example, the initialization command is sent to a remote computing system located off-board the rail vehicle system, such as at a remote office to control the rail vehicle system remotely. In one example, the initialization command is sent to another on-board computing device located in a different rail vehicle of the rail vehicle system. Since each rail vehicle is equipped with the same or a similar set of components, control of the rail vehicle system can be transferred from an on-board computing system on one rail vehicle to an on-board computing system on another rail vehicle.

By transferring operational control from an on-board computing system to a remote computing system through the wayside wireless network based on degradation of the on-board computing system, operation control of the rail vehicle system can be maintained even when a controlling on-board computing system becomes degraded. In this way, the rail vehicle is made more robust.

Figure 25:
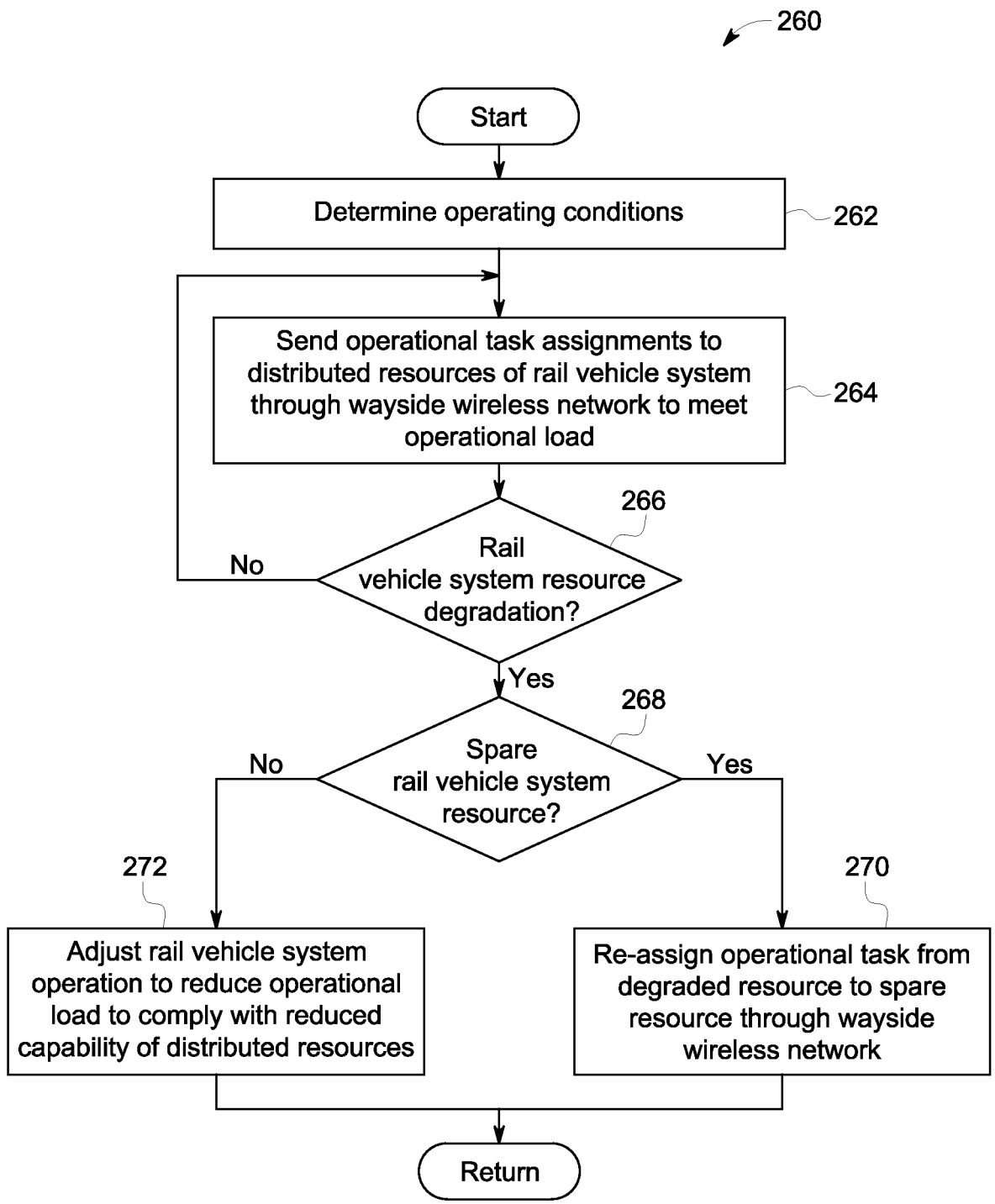
FIG. 25 is a flow diagram of an example embodiment of a method for distributing operating tasks to different remote resources of a multiple-unit rail vehicle system through a wayside wireless network responsive to resource degradation.

FIG. 25 is a flow diagram of an embodiment of a method 260 for distributing operational tasks to different resources of a MU rail vehicle system through a wayside wireless network responsive to resource degradation. In one example, the method 260 is performed by the communication management system of the vehicle system depicted in FIG. 21. In another example, the method 260 is performed by the remote computing system 1232 of the wayside device 1230 depicted in FIG. 21.

At 262, the method 260 may include determining operating conditions. Determining operating conditions may include determining whether or not an on-board computing system or a remote computing system of the rail vehicle system is functioning properly. Determining operating conditions may include determining an availability of data communication paths for the rail vehicle system. Determining operating conditions may include receiving rail vehicle state and location information. Determining operating conditions may include determining the collective capabilities of resources of the rail vehicle system. In one example, the collective capabilities include processing capabilities of available computing systems on-board or off-board the rail vehicle system. In one example, the collective capabilities include available propulsive/braking capabilities of the rail vehicles in the rail vehicle system. For example, the propulsive capabilities include the torque output capability of each traction motor of the rail vehicle system based on operating conditions.

At 264, the method 260 may include sending, through the wayside wireless network, operational task assignments to distributed resources of the rail vehicle system to meet an operational load. In cases where the operational load is a processing load, processing tasks are assigned to available processing resources of different remote computing systems. In some cases, the remote computing systems are on-board computing system located on remote rail vehicles of the rail vehicle system. In some cases, the remote computing systems are off-board computing systems located at the remote office or in the wayside device. In cases where the operational load is a propulsive/braking load, such as a torque output or brake demand to meet a desired travel speed, the operational tasks include a desired propulsive/brake output to be produced by each remote rail vehicle in order for the rail vehicle system to meet the desired travel speed.

At 266, the method 260 may include determining if a rail vehicle system or wayside device resource is degraded. In one example, the rail vehicle or wayside device resource may include a processing resource of a computing system the can become degraded or unavailable. In one example, the rail vehicle resource may include a propulsive/brake resource, such as a traction motor or an air brake. If it is determined that the rail vehicle system resource is degraded, the method 260 moves to 268. Otherwise, the method 260 returns to 264.

At 268, the method 260 may include determining if a spare rail vehicle system resource is available. Under some conditions, the entirety of the capabilities of the rail vehicle system resources are not used to meet the operational load, thus additional resources are available for use. If it is determined that a spare rail vehicle system resource is available for use, the method 260 moves to 270. Otherwise, the method 260 moves to 272.

At 270, the method 260 may include re-assigning, through the wayside wireless network, the operational task from the degraded rail vehicle system resource to the spare rail vehicle system resource. In one example where the operational task is a processing task, re-assigning may include sending a command for a remote computing system on-board or off-board of the rail vehicle system to perform the processing task. In one example where the operational task is a propulsive/braking output, re-assigning may include sending a command for a spare propulsive/braking resource to adjust operation to meet the propulsive/braking output.

At 272, the method 260 may include adjusting rail vehicle system operation to reduce the operational load to comply with the reduced capability of the distributed rail vehicle system resources. In one example where the operational load is a processing load, adjusting rail vehicle operation may include cancelling a processing task or delaying a processing task from being carried out until a processing resource becomes available. In one example where the operational load is a propulsive/brake load, adjusting rail vehicle operation may include reducing travel speed or operating a different brake component. Furthermore, in cases where the operational load is less than the collective capability of the remaining distributed resources, the operational task can be re-assigned to a remaining available resource.

By re-assigning operational tasks to distributed resources of the rail vehicle system and/or a wayside device in response to resource degradation or unavailability, the operational load is still met by the remaining resources. In this way, the rail vehicle system is made more robust since operation is maintained even when a rail vehicle system resource degrades. Moreover, by sending data communications through the wayside wireless network, which has a high data rate transport capability, the data communication path has the capacity to handle the intra-train data communications.

Figure 26:
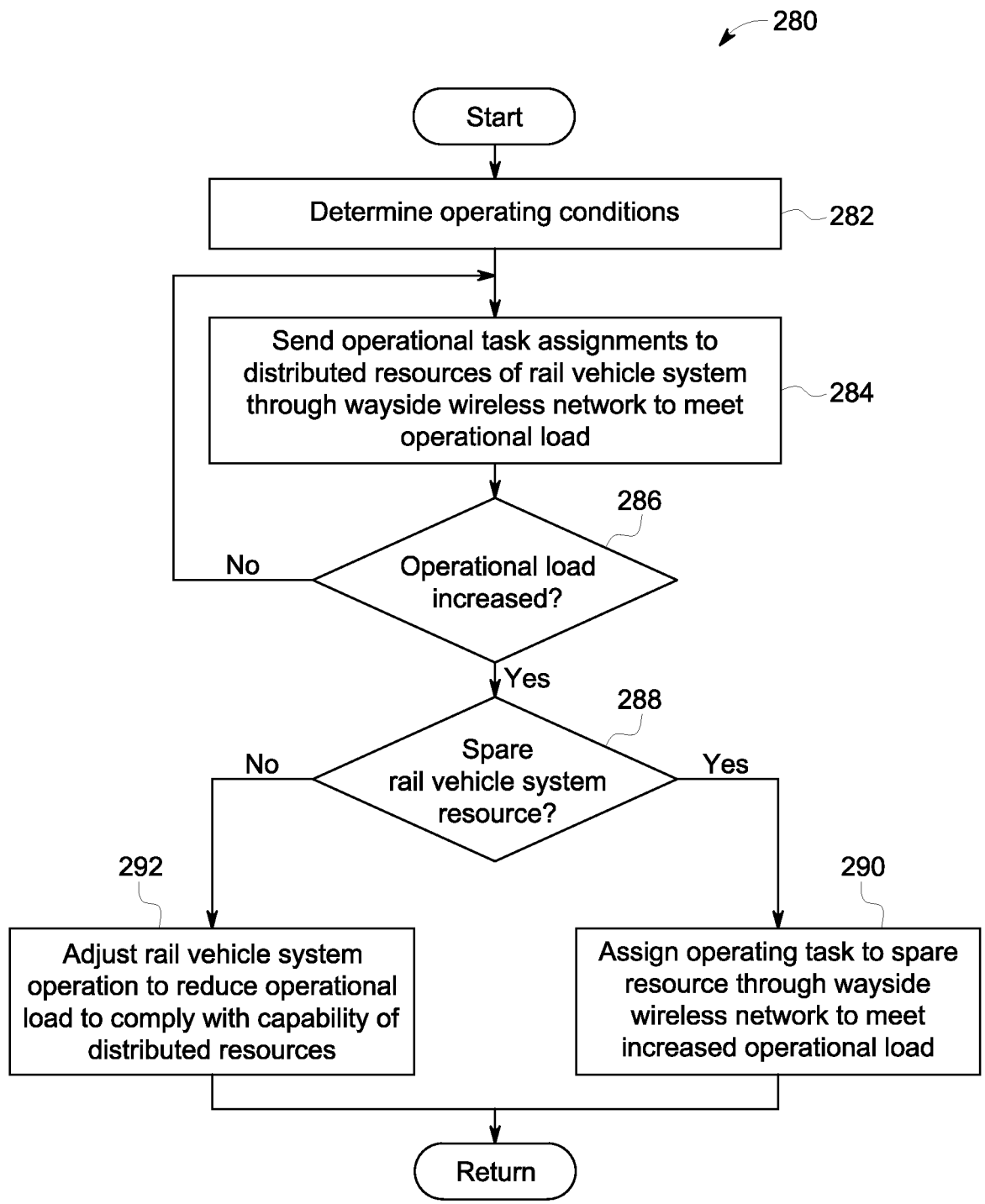
FIG. 26 is a flow diagram of an example embodiment of a method for distributing operating tasks to different remote resources of a multiple-unit rail vehicle system through a wayside wireless network responsive to a change in operating load.

FIG. 26 is a flow diagram of an example embodiment of a method 280 for distributing operational tasks to different remote resources of a MU rail vehicle configuration through a wayside wireless network responsive to a change in operational load. In one example, the method 280 is performed by the communication management system of the vehicle system depicted in FIG. 21.

At 282, the method 280 may include determining operating conditions. Determining operating conditions may include determining whether or not an on-board computing system or a remote computing system of the rail vehicle system is functioning properly. Determining operating conditions may include determining an availability of data communication paths for the rail vehicle system. Determining operating conditions may include receiving rail vehicle state and location information. Determining operating conditions may include determining the collective capabilities of resources of the rail vehicle system. In one example, the collective capabilities include processing capabilities of available computing systems on-board or off-board the rail vehicle system. In one example, the collective capabilities include available propulsive/braking capabilities of the rail vehicles in the rail vehicle system. For example, the propulsive capabilities include the torque output capability of each traction motor of the rail vehicle system based on operating conditions.

At 284, the method 280 may include sending, through the wayside wireless network, operational task assignments to distributed resources of the rail vehicle system to meet an operational load. In cases where the operational load is a processing load, processing tasks are assigned to available processing resources of different remote computing systems. In some cases, the remote computing systems are on-board computing system located on remote rail vehicles of the rail vehicle system. In some cases, the remote computing systems are off-board computing systems located at the remote office or in the wayside device. In cases where the operational load is a propulsive/braking load, such as a torque output or brake demand to meet a desired travel speed, the operational tasks include a desired propulsive/brake output to be produced by each remote rail vehicle in order for the rail vehicle system to meet the desired travel speed.

At 286, the method 280 may include determining if the operational load is increased. In cases where the operational load is a processing load, the operational load is increased when another processing task is generated and needs to be carried out. Non-limiting examples of processing tasks include, calculating brake distance, determining location, determining railroad track state, calculating speed for optimum fuel efficiency, etc. In cases where the operational load a propulsive load, the operational load is increased when the output (e.g., torque, speed) demand is increased. If it is determined that the operational load is increased, the method 280 moves to 288. Otherwise, the method 280 returns to 284.

At 288, the method 280 may include determining if a spare rail vehicle system resource is available. Under some conditions, the entirety of the capabilities of the rail vehicle system resources are not used to meet the operational load, thus additional resources are available for use. If it is determined that a spare rail vehicle system resource is available for use, the method 280 moves to 290. Otherwise, the method 280 moves to 292.

At 290, the method 280 may include assigning, through the wayside wireless network, the operational task associated with the increase in operational load to the spare rail vehicle system resource. In one example where the operational task is a processing task, assigning may include sending a command for a remote computing system on-board or off-board of the rail vehicle system to perform the processing task. In one example where the operational task is a propulsive/braking output, assigning may include sending a command for a spare propulsive/braking resource to adjust operation to meet the propulsive/braking output. In some cases, a plurality of resources is commanded to adjust operation to collectively meet the increase in operational load.

At 292, the method 280 may include adjusting rail vehicle system operation to reduce the operational load to comply with the capability of the distributed rail vehicle system resources. In one example where the operational load is a processing load, adjusting rail vehicle operation may include cancelling a processing task or delaying a processing task from being carried out until a processing resource becomes available. In one example where the operational load is a propulsive/brake load, adjusting rail vehicle operation may include reducing output (e.g., torque demand, speed demand) or operating a different brake component. Furthermore, in cases where the operational load is less than the collective capability of the remaining distributed resources, the operational task can be assigned to a remaining available resource.

By assigning new operational tasks to distributed resources of the rail vehicle system in response to an increase in operational load, the operational load is met even as operating conditions vary. In this way, the rail vehicle system is made more robust. Moreover, by sending data communications through the wayside wireless network, which has a high data rate transport capability, the data communication path has the capacity to handle the intra-train data communications, as opposed to other data communication paths that have less bandwidth and do not have the capacity to handle some levels of data communications.

Embodiments of the inventive subject matter described herein generally relate to systems and methods for communicating data with electronic components of wayside devices disposed along a route of a vehicle, such as a rail vehicle or rail vehicle consist. One or more wayside devices may be disposed at or near the route of the rail vehicles. The wayside device can be used to control operations of the route, such as by controlling a switch at an intersection of two or more diverging sections of track, raising or lowering a crossing gate to allow or prevent vehicles and pedestrians from crossing the track, respectively, and the like. Other wayside devices can be used to control or impact operations of the rail vehicles, such as by providing visual signals to operators on the rail vehicles to proceed, slow down, or stop movement of the rail vehicles, providing control signals (e.g., positive train control, or PTC) to the rail vehicles to control tractive operations of the rail vehicles, and the like. Other wayside devices can include sensors that monitor one or more parameters of the route and/or the rail vehicles, such as hot box detectors that monitor axle and/or wheel bearing temperatures of the rail vehicles as the rail vehicles travel along the track. The wayside devices can be coupled with electronic components that control operations of the wayside devices. The above examples of wayside devices are not intended to limit all embodiments of the presently described subject matter. For example, one or more other wayside devices may be used in connection with one or more of the embodiments described herein.

In one embodiment, router transceiver units are operatively coupled with the electronic components of the wayside devices and with a power supply conductor that delivers electric current to the electronic components and/or other electronic apparatuses other than the electronic components. The power supply conductor may be an existing MU cable bus, such as the MU cable bus 26 shown in FIG. 1. The electric current supplied to the electronic components and/or apparatuses powers the electronic components and/or apparatuses. The router transceiver units communicate (e.g., transmit and/or receive) network data through the power supply conductor. The router transceiver units may communicate the network data at or during the same time when the electronic components or other electronic apparatuses are receiving power from the power supply conductor. For example, the network data may be piggybacked, or transmitted on top of, the current that is supplied through the power supply conductors to power the electronic components and/or apparatuses. Alternatively, the router transceiver units may communicate the network data at times when the electronic components or other electronic apparatuses are not receiving power from the power supply conductor.

In one embodiment, the network data may be transmission control protocol/Internet protocol (TCP/IP) formatted data. Alternatively, another communication protocol may be used. The network data may be transmitted over a pre-existing power supply conductor that previously was coupled with the electronic components and/or apparatuses. For example, the power supply conductors used to transmit the network data may include one or more separate or interconnected buried or exposed power distribution cables, aerial pole lines, and/or cables that are conductively coupled with a commercial power grid.

Several electronic components of the wayside devices disposed at different locations may be conductively interconnected by one or more power supply conductors in a computer network. The router transceiver units of the electronic components may communicate network data with each other using the power supply conductors. In one embodiment, the network is an Ethernet computer network. One or more of the electronic components may be network enabled devices (e.g., Ethernet devices) that generate or create network data for communication to the router transceiver units. Alternatively, one or more of the electronic components may be non-network enabled devices (e.g., analog devices) that generate or create non-network data (e.g., analog data) for communication to the router transceiver units. The router transceiver units may convert the non-network data (e.g., analog data) to network data and transmit the network data through the power supply conductor.

The electronic components may automatically obtain or create data that is communicated by the router transceiver units as network data through the power supply conductor.

For example, the electronic components may periodically obtain or create data and/or may obtain or create the data after detection of an event (e.g., a measured characteristic exceeds or falls below a threshold). The data obtained or created by the electronic components may relate to operation of the associated wayside devices. For example, the data can include sensor data, diagnostic information, alarm information, indication of a status (e.g., on, off, color of a light illuminated by the wayside device, and the like) of the wayside device, indication of a condition (e.g., in need of repair or maintenance, not in need of repair or maintenance, broken, and the like), or other information.

One or more of the electronic components can include one or more sensors that obtain diagnostic information and/or alarm information related to an associated wayside device, the track, and/or the rail vehicle. The router transceiver units can transmit the diagnostic information and/or alarm information with other router transceiver units and/or to a common node in the network. The common node can be a centralized or distributed monitoring station that receives the diagnostic information, alarm information, and/or other information from the electronic components in the network to monitor operations in the network.

Figure 27:
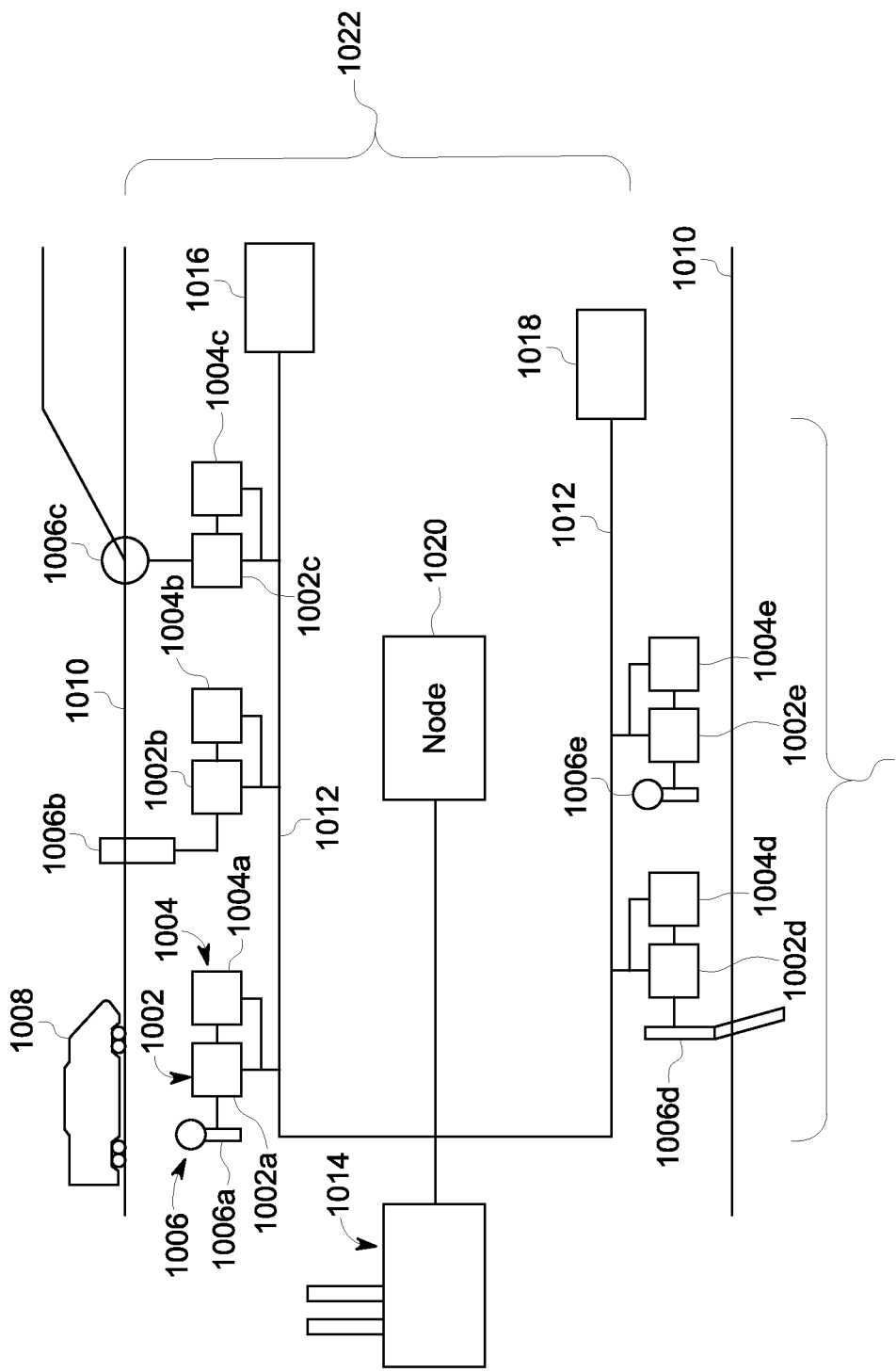
FIG. 27 illustrates a schematic diagram of one embodiment of a communication system.

FIG. 27 is a schematic diagram of one embodiment of a communication system 1000. The system 1000 may include several electronic components 1002 and several router transceiver units 1004 communicatively coupled with the electronic components 1002. "Communicatively coupled" may include connecting an electronic component 1002 with a router transceiver unit 1004 by one or more wired and/or wireless communication links such that data can be communicated between the electronic component 1002 and the router transceiver unit 1004. The electronic components 1002 are generally referred to by the reference number 1002 and are individually referred to by the reference numbers 1002a, 1002b, 1002c, and so on. The router transceiver units 1004 are generally referred to by the reference number 1004 and are individually referred to by the reference numbers 1004a, 1004b, 1004c, and so on.

The electronic components 1002 are operatively coupled with wayside devices 1006. For example, an electronic component 1002 can be operably or operatively coupled with a wayside device 1006 by one or more mechanical, wired, and/or wireless connections such that the electronic component 1002 can control one or more operations of the wayside device 1006 and/or communicate data with the wayside device 1006. The wayside devices 1006 are generally referred to by the reference number 1006 and are individually referred to by the reference numbers 1006a, 1006b, 1006c, and so on. The wayside devices 1006 are positioned along a route 1010 of a vehicle 1008, such as a train, locomotive, and/or rail vehicle consist. Alternatively, the wayside devices 1006 may be positioned along a route of another type of vehicle or vehicle consist. In the illustrated embodiment, the wayside devices 1006 are disposed alongside a track that defines the route 1010 of the vehicle 1008. The wayside devices 1006 may be located within the right of way associated with the route 1010, such as by being disposed within a predetermined distance from the route 1010. For example, the wayside devices 1006 may be no greater than sixty feet from the route 1010. Alternatively, the wayside devices 1006 may be a different distance from the route 1010.

The wayside devices 1006 and the electronic components 1002 perform one or more operations in connection with the vehicle 1008 and/or route 1010. For example, the wayside devices 1006a, 1006e may include rail signal devices that illuminate to convey information or directions to an operator of the vehicle 1008. The wayside devices 1006a, 1006e can include lamps that are illuminated in different colors, such as green, yellow, and/or red to indicate "ok to proceed," "prepare to stop," and "stop," respectively, to the operator. The wayside device 1006b may include a sensor that detects a condition of the vehicle 1008 and/or the route 1010. For example, the wayside device 1006b may include a hot box detector that monitors thermal energy or temperature of wheels, axles, bearings, and the like, of the vehicle 1008. As another example, the wayside device 1006b may include another type of defect detector that monitors the vehicle 1008, such as a dragging equipment detector, a wheel impact detector, a sliding wheel detector, a high car detector, a shifted load detector, a weighing in motion detector, a wide load detector, and the like. The wayside device 1006b may monitor the route 1010, such as by including a sensor that detects a position or state of a switch between diverging sections of the route 1010. In another embodiment, the wayside device 1006b can represent a PTC device, such as a device that transmits signals to speed control units disposed on board the vehicle 1008 to control the speed of the vehicle 1008. The wayside device 1006b may transmit the signals wirelessly or through rails of the track to the vehicle 1008.

The wayside device 1006c may represent a track switch disposed at an intersection of diverging sections of the route 1010. For example, the wayside device 1006c may move a portion of the track between plural positions in order to change the direction that the route 1010 follows. The wayside device 1006d can represent a road crossing warning system, such as a gate that raises or lowers to allow or permit, respectively, vehicles and pedestrians to cross the route 1010. The wayside devices 1006 described herein and the number of wayside devices 1006 are provided as examples. One or more other wayside devices 1006 and/or a different number of one or more of the wayside devices 1006 may be used.

The electronic components 1002 can control one or more operations of the wayside device 1006 and/or communicate data with the wayside device 1006. The electronic components 1002 may include logic-based devices that perform the operations and/or direct the wayside device 1006 to perform the operations. Examples of such logic-based devices include computer processors, controllers, hard-wired logic, application specific integrated circuits (ASICs), and the like. One or more of the electronic components 1002 may generate diagnostic information and/or alarm information related to the vehicle 1008 and/or the route 1010 (e.g., the track). For example, the electronic component 1002b that is coupled with the wayside device 1006b that can represent a defect sensor or detector may generate information related to one or more defects of the vehicle 1008 or route 1010 (e.g., the track) as diagnostic information. If one or more of the defects that is detected by the wayside device 1006b indicates an alarm condition (e.g., a bearing temperature that exceeds a threshold), then the electronic component 1002b can generate alarm information that represents the alarm condition. In another embodiment, the electronic components 1002 may receive the diagnostic information from the wayside devices 1006 and perform the alarming analysis (e.g., processing of the diagnostic information to determine if an alarm condition exists) on the received diagnostic information.

In the illustrated embodiment, the electronic components 1002 are conductively coupled with power supply conductors 1012 that supply electric current to the electronic components 1002 to power the electronic components 1002 and/or the wayside devices 1006. In an embodiment, the power supply conductors 1012 may be portions of the MU cable bus 26, shown in FIG. 1. The power supply conductors 1012 may represent one or more buried or exposed power distribution cables, aerial pole lines, cables conductively coupled with a commercial power grid 1014, and the like. Alternatively, the power supply conductors 1012 may represent one or more conductors that interconnect a plurality of the router transceiver units 1004 in a serial (e.g., daisy chain) or parallel manner to form a network. The commercial power grid 1014 may include one or more networks of power supply conductors 1012 that deliver electric current to customers (e.g., businesses and/or homes) in exchange for a fee. Alternatively, one or more of the electronic components 1002 may not be coupled with the power supply conductors 1012. For example, the electronic components 1002 may receive electric power from another source, such as a battery, solar panel, wind turbine, and the like. The power supply conductors 1012 may supply electric current to one or more of the electronic components 1002 and/or one or more other electronic apparatuses 1016, 1018. The electronic apparatuses 1016, 1018 can represent a device that is powered by the electric current received by the power supply conductors 1012 but that does not perform one or more of the functions of the wayside devices 1006. In one embodiment, the power supply conductors 1012 may include one or more conductors that supply power to the rail vehicles 1008 and/or other conductors disposed along the route 1010. For example, in one embodiment, the power supply conductors 1012 may be conductors other than a running rail of a track on which the vehicle 1008 travels, a powered rail from which the vehicle 1008 receives (e.g., a powered third rail that supplies electric power to a shoe of the vehicle 1008), and/or an overhead catenary that supplies power to the vehicle 1008. Alternatively, the power supply conductors 1012 may not include the conductors that supply power to the rail vehicles 1008.

The router transceiver units 1004 are communicatively coupled with the electronic components 1002 to communicate network data to and/or from the electronic components 1002. Network data can include packetized data, such as data that is arranged into a sequence of packets having headers with an address of the intended recipient of the packets, locations of the packets relative to each other (e.g., for forming the packets back into the original message), and the like. The router transceiver units 1004 can communicate the network data between the electronic components 1002. For example, the router transceiver units 1004 can communicate statuses of various wayside devices 1006 coupled with the electronic components 1002 to the router transceiver units 1004 coupled with other wayside devices 1006 and electronic components 1002. The statuses may indicate a position of a switch, crossing gate, light, and the like. Alternatively, the router transceiver units 1004 can communicate diagnostic information and/or alarm information from one electronic component 1002 to another electronic component 1002.

The router transceiver units 1004 are communicatively coupled with the power supply conductors 1012 and communicate the network data through the power supply conductors 1012. In one embodiment, the router transceiver units 1004 are coupled with pre-existing power supply conductors 1012 that already are conductively coupled with the electronic components 1002 and/or the wayside devices 1006. For example, the router transceiver units 1004 may be retrofitted to the electronic components 1002 and/or the wayside devices 1006 by coupling the router transceiver units 1004 to the power supply conductors 1012 and the electronic components 1002 and/or wayside devices 1006. Retrofitting the router transceiver units 1004 to existing power supply conductors 1012 can add the functionality of communicating network data with the electronic components 1002 and/or wayside devices 1006 without adding more conductive pathways (e.g., wires, cables, and the like) between the electronic components 1002 and/or wayside devices 1006.

The router transceiver units 1004 communicate network data with a remote location. A remote location can include the router transceiver unit 1004 of another electronic component 1002 and/or wayside device 1006. By "remote," it is meant that a transmitter of the network data (e.g., a first network transceiver unit 1004) and a receiver of the network data (e.g., a second network transceiver unit 1004 or other electronic device) are at physically separate locations that are not near or immediately close to each other. The remote location can be disposed several feet or meters apart from the router transceiver unit 1004, several miles or kilometers apart, or a greater distance apart.

In the illustrated embodiment, the router transceiver units 1004 are conductively coupled with a node 1020 by the power supply conductors 1012. The node 1020 can represent one or more computing devices (e.g., one or more computers, processors, servers, and the like) that communicate network data with the router transceiver units 1004 via the power supply conductors 1012. The node 1020 may be a common node to several of the router transceiver units 1004, such as a central node in a computer network 1022 formed by the router transceiver units 1004, the electronic components 1002, and the power supply conductors 1012. Alternatively, the node 1020 may be a common node to several router transceiver units 1004 in a distributed or non-centralized computer network. The network formed by the router transceiver units 1004, the electronic components 1002, and the power supply conductors 1012 may be an Ethernet network, such as a Local Area Network (LAN). The node 1020 may be located at a central dispatch office of a railroad or at a control tower of a rail yard. Alternatively, the node 1020 may be at another location. The node 1020 may receive the diagnostic information and/or the alarm information received from the router transceiver units 1004 to monitor diagnostics and/or alarms related to conditions of the vehicle 1008 and/or route 1010.

In one embodiment, the router transceiver units 1004 are communicatively coupled with each other in the network 1022 by the power supply conductors 1012. The router transceiver units 1004 may communicate network data between each other through the power supply conductors 1012. For example, the router transceiver units 1004 may communicate status information, diagnostic information, alarm information, condition information of wayside devices 1006, and/or other information related to the wayside devices 1006 with other router transceiver units 1004. The router transceiver units 1004 may receive the information related to the wayside devices 1006 to coordinate actions, conditions, or states of the wayside devices 1006. For example, with respect to several wayside devices 1006 that illuminate different colors (e.g., red, yellow, and green) to notify operators of the vehicle 1008 to change movement of the vehicle 1008, the router transceiver units 1004 of the wayside devices 1006 can communicate the current status (e.g., illuminated color) of the corresponding wayside devices 1006 among the router transceiver units 1004 through the network 1022 to ensure that the correct wayside devices 1006 are displaying the correct status or color.

Other information may be communicated between the wayside devices 1006 through the power supply conductors 1012. For example, a first wayside device 1006 may detect occupancy of a section of track by a vehicle 1008 using an electronic track circuit that is shunted when train wheel axles short a signal placed across the rails of the track. The occupancy of the section of the track may be communicated from the first wayside device 1006 to one or more other wayside devices 1006 by the router transceiver units 1004 and through the power supply conductors 1012. In another example, a selection of a route taken by the vehicle 1008 at a switch may be detected by a first wayside device 1006 and communicated to one or more other wayside devices 1006 by the router transceiver units 1004 and through the power supply conductors 1012. Another example may include a failure condition of a wayside device 1006 (e.g., a light out condition at a rail signal device). The wayside device 1006 in the failure condition may communicate the failure condition to other wayside devices 1006 using the router transceiver units 1004 and through the power supply conductors 1012. The wayside devices 1006 that receive the failure condition may change their own status in response thereto (e.g., change their light color in response to the light of a previous wayside device 1006 being out).

Figure 29:
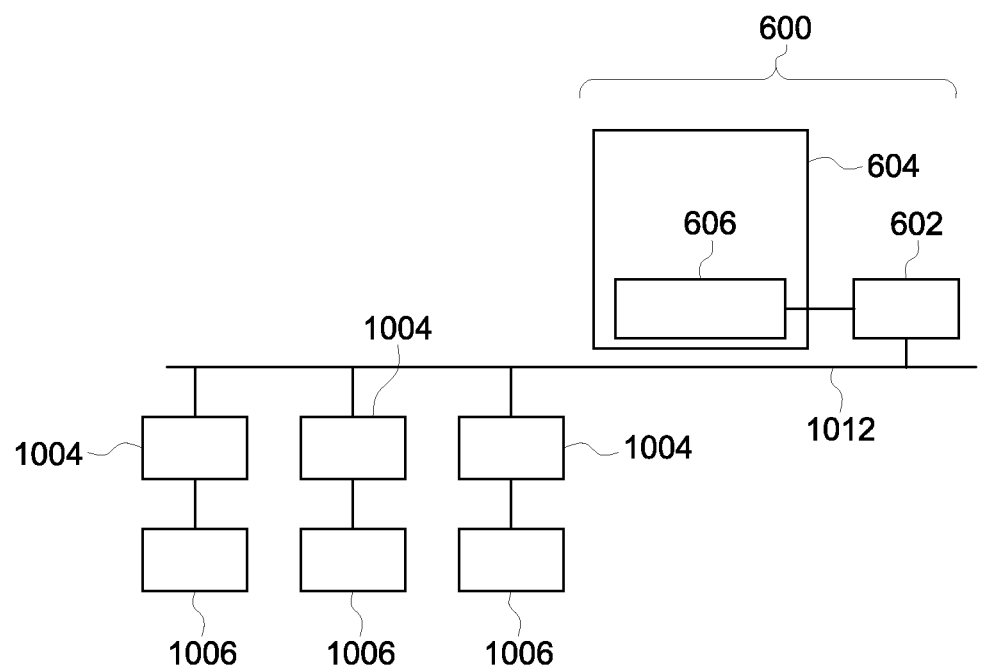
FIG. 29 is a schematic diagram of one embodiment of a node that is coupled with a plurality of the router transceiver units and the wayside devices by a power supply conductor shown in FIG. 27.

FIG. 29 is a schematic diagram of one embodiment of a node 600 that is coupled with a plurality of the router transceiver units 1004 and the wayside devices 1006 by a power supply conductor 1012. The node 600 may represent the node 1020 shown in FIG. 27. The router transceiver units 1004 and the wayside devices 1006 may be remote from the node 600. For example, the router transceiver units 1004 and the wayside devices 1006 may be several miles (e.g., 5, 10, 20, or 50 miles or more) apart from the node 600.

The node 600 may include a router transceiver unit 602 that communicates the network data with the router transceiver units 1004. The router transceiver unit 602 may be similar to one or more of the router transceiver units 1004. For example, the router transceiver unit 602 can receive and/or transmit network data with the router transceiver units 1004 of the wayside devices 1006 through the power supply conductor 1012. The node 600 can include a physical structure or building 604 used by one or more human persons, such as a dispatch or other office, a signaling bungalow or shack, or other structure. The node 600 may include a computing device 606, such as a computer, server, or other device capable of interacting with human persons to receive input and/or provide output to the persons. The computing device 606 can be disposed within the building 604 and may include one or more processors and/or computer readable storage media, such as a computer hard drive, that operate on the network data received by the router transceiver unit 602 and/or generate network data for transmission by the router transceiver unit 602. The computing device 606 may be used by persons to monitor the statuses, measurements obtained by, and other information relevant to the wayside devices 1006 and communicated to the node 600 as network data by the router transceiver units 1004. Although not shown in FIG. 29, the router transceiver units 1004 can be coupled with electronic components 1002 (shown in FIG. 27) of the wayside devices 1006, as described above.

Figure 30:
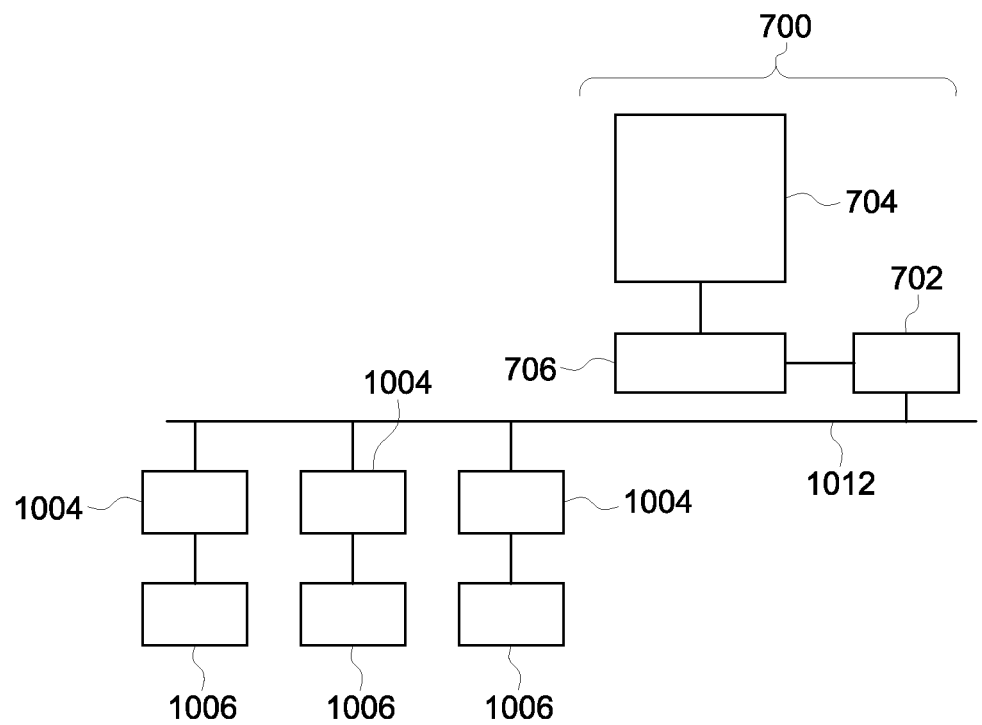
FIG. 30 is a schematic diagram of another embodiment of a node that is coupled with a plurality of the router transceiver units and the wayside devices by a power supply conductor shown in FIG. 27.

FIG. 30 is a schematic diagram of another embodiment of a node 700 that is coupled with a plurality of the router transceiver units 1004 and the wayside devices 1006 by a power supply conductor 1012. The node 700 may represent the node 1020 shown in FIG. 27. The router transceiver units 1004 and the wayside devices 1006 may be remote from the node 700. For example, the router transceiver units 1004 and the wayside devices 1006 may be several miles (e.g., 5, 10, 20, or 50 miles or more) apart from the node 700.

The node 700 may include a router transceiver unit 702 that may be similar to the router transceiver unit 602 (shown in FIG. 29) of the node 600 (shown in FIG. 29). For example, the router transceiver unit 702 may communicate network data with the router transceiver units 1004 through the power supply conductor 1012. Although not shown in FIG. 30, the router transceiver units 1004 can be coupled with electronic components 1002 (shown in FIG. 27) of the wayside devices 1006, as described above.

The node 700 can include a physical structure or building 704 that is similar to the building 604 (shown in FIG. 29) of the node 600 (shown in FIG. 29). For example, the building 704 may be used by one or more human persons to monitor the statuses, measurements obtained by, and other information relevant to the wayside devices 1006 and communicated to the node 700 as network data by the router transceiver units 1004. Although not shown in FIG. 30, the node 700 can include a computing device, such as the computing device 606 shown in FIG. 29, to allow the persons to interact with and/or monitor the network data transmitted to and/or received from the router transceiver units 1004.

In the illustrated embodiment, the building 704 represents a remote office. For example, the building 704 may represent one or more structures that are disposed at least several miles away from the router transceiver unit 702 and/or the power supply conductor 1012. The router transceiver unit 702 can communicate with the building 704 via a network connection 706. The network connection 706 can represent one or more computing devices, communication lines, and the like, that are communicatively coupled with one another in a network or a portion of a network. For example, the network connection 706 may represent one or more Ethernet lines (e.g., conductive pathways used to communicate network data), routers, modems, computers, servers, and/or other devices that are coupled together in a packet-switched network, such as the Internet, an internet, a Wide Area Network (WAN), a Local Area Network (LAN), and the like. The router transceiver unit 702 communicates the network data with the building 704 through the network connection 706 such that the router transceiver unit 702 does not need to be directly coupled with and/or located close to the building 704. In one embodiment, the network connection 706 can include one or more wireless connections through which the network data is communicated.

In one embodiment, the router transceiver unit 702 receives electrical signals (e.g., first signals) from a plurality of the wayside devices 1006 (e.g., as transmitted by the router transceiver units 1004) through the power supply conductor 1012. The electrical signals may be transmitted and received over the power supply conductor 1012 as modulated network data. The router transceiver unit 702 may demodulate the received electrical signals into demodulated electrical signals (e.g., second signals) that include the network data. The router transceiver unit 702 may convert the demodulated electrical signals into another type of electrical signals (e.g., third signals) that are formatted to be transmitted to the building 704 through the network connection 706.

Figure 31:
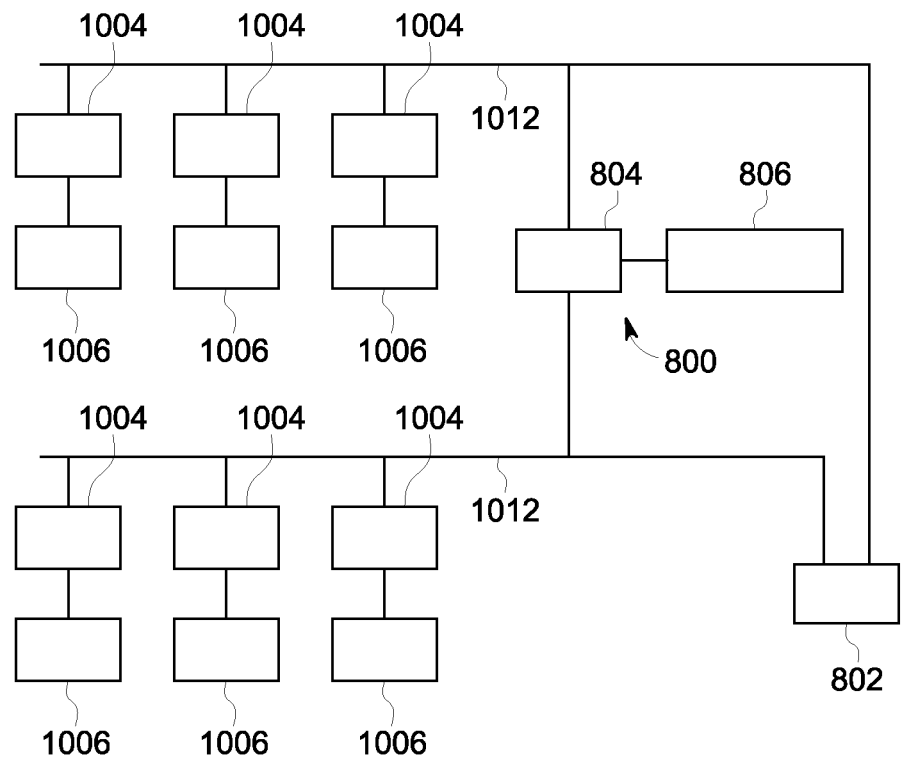
FIG. 31 is a schematic diagram of another embodiment of a node that is coupled with a plurality of the router transceiver units and the wayside devices by plural power supply conductors shown in FIG. 27.

FIG. 31 is a schematic diagram of another embodiment of a node 800 that is coupled with a plurality of the router transceiver units 1004 and the wayside devices 1006 by plural power supply conductors 1012. The node 800 may represent the node 1020 shown in FIG. 27. The router transceiver units 1004 and the wayside devices 1006 may be remote from the node 800. For example, the router transceiver units 1004 and the wayside devices 1006 may be several miles (e.g., 5, 10, 20, or 50 miles or more) apart from the node 800.

As shown in FIG. 31, plural power supply conductors 1012 conductively couple the node 800 with the router transceiver units 1004. The power supply conductors 1012 may be separate and distinct from each other such that electric current and/or network data that is conveyed through a first power supply conductor 1012 is not conveyed through a different, second power supply conductor 1012. The power supply conductors 1012 may be part of a commercial power grid, such as the power grid 1014 shown in FIG. 27. For example, the power supply conductors 1012 may extend from a power sub-station 802 of the power grid 1014 to the router transceiver units 1004 and the wayside devices 1006. The power sub-station 802 can supply electric current to the router transceiver units 1004 and/or the wayside devices 1006 to power the router transceiver units 1004 and/or the wayside devices 1006. The node 800 also is coupled with the power supply conductors 1012 to communicate network data with the router transceiver units 1004 through the same power supply conductors 1012. Although not shown in FIG. 31, the router transceiver units 1004 can be coupled with electronic components 1002 (shown in FIG. 27) of the wayside devices 1006, as described above.

Figure 32:
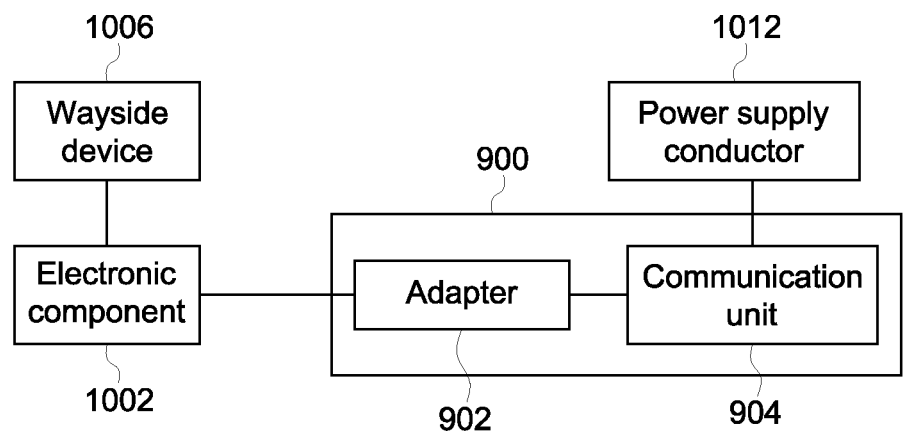
FIG. 32 is a schematic diagram of another embodiment of a router transceiver unit.

The node 800 may be similar to the node 600 and/or the node 700 shown in FIGS. 31 and 32. For example, the node 800 may include a router transceiver unit 804 that is similar to the router transceiver unit 602 and/or 702 (shown in FIGS. 31 and 32). The node 800 can include a structure or building 806, such as the building 604 and/or the building 704 (shown in FIGS. 31 and 32). In one embodiment, the node 800 can include a network connection that is similar to the network connection 706 (shown in FIG. 30) between the router transceiver unit and the building 806.

In one embodiment, the router transceiver unit receives a plurality of electrical signals (e.g., first signals) from a plurality of the wayside devices 1006 (e.g., as transmitted by the router transceiver units 1004) through different power supply conductors 1012. For example, the router transceiver unit may receive at least one of the first signals over a first power supply conductor 1012 and at least a different one of the first signals over a different, second power supply conductor 1012.

The router transceiver unit may demodulate the received electrical signals into demodulated electrical signals (e.g., second signals) that include the network data. The router transceiver unit may convert the demodulated electrical signals into another type of electrical signals (e.g., third signals) that are formatted to be transmitted to the building 806 through the network connection (e.g., the router transceiver unit 804).

FIG. 32 is a schematic diagram of another embodiment of a router transceiver unit 900. The router transceiver unit 900 may be similar to the router transceiver unit 1004 shown in FIG. 27. For example, the router transceiver unit 900 may be coupled with the power supply conductor 1012, the electronic component 1002, and/or the wayside device 1006 to transmit network data from the electronic component 1002 and/or the wayside device 1006 through the power supply conductor 1012 and/or receive network data through the power supply conductor 1012.

In the illustrated embodiment, the router transceiver unit 900 may include an adapter 902 and a communication unit 904 operably coupled with each other to permit communication of data between the adapter 902 and the communication unit 904. The adapter 902 is operably coupled with the electronic component 1002 of a wayside device 1006. The electronic component 1002 may generate data related to the wayside device 1006. For example, the electronic component 1002 may create data that represents or may include measurements obtained from a sensor, diagnostic information of the wayside device 1006, alarm information of the wayside device 1006, a status of the wayside device 1006 (e.g., a current state of a rail signal device), or a condition of the wayside device 1006 (e.g., in need of repair or maintenance, functioning without need for repair or maintenance, and the like). The data may be non-network data, such as analog data, or a non-digital signal. For example, the electronic component 1002 may be a non-network enabled device that transmits data other than network data (e.g., other than packetized data) to the adapter 902.

The electronic component 1002 communicates the data as electric signals to the adapter 902. Alternatively, the electronic component 1002 may be network enabled such that the electronic component 1002 transmits the data as network data (e.g., packet data) over an Ethernet line or connection between the electronic component 1002 and the adapter 902.

The communication unit 904 is conductively coupled to the power supply conductor 1012 that supplies electric current to the wayside device 1006 and/or another electronic apparatus other than the electronic component 1002 to power the electronic component 1002 and/or electronic apparatus. The power supply conductor 1012 may supply the electric current from a remote source, such as a source that is disposed outside of the router transceiver unit 900, the electronic component 1002, and/or the wayside device 1006. In one embodiment, the power supply conductor 1012 supplies electric current from a power sub-station or a power grid that is disposed several miles (e.g., 5, 10, 15, 20, 25, or 50 miles or farther) away from the router transceiver unit 900.

The communication unit 904 receives the non-network data as the electric signals from the adapter 902 and converts the non-network data into network data (e.g., "converted network data"). For example, the communication unit 904 may convert analog electric signals received from the adapter 902 to modulated network data. The communication unit 904 communicates the modulated network data over the power supply conductor 1012 to another location, such as another router transceiver unit 900 coupled with another wayside device 1006, a node 1020 (shown in FIG. 27), and/or another location. In one embodiment, the communication unit 904 communicates the converted network data to a remote location, such as a location that is at least several miles away.

Figure 33:
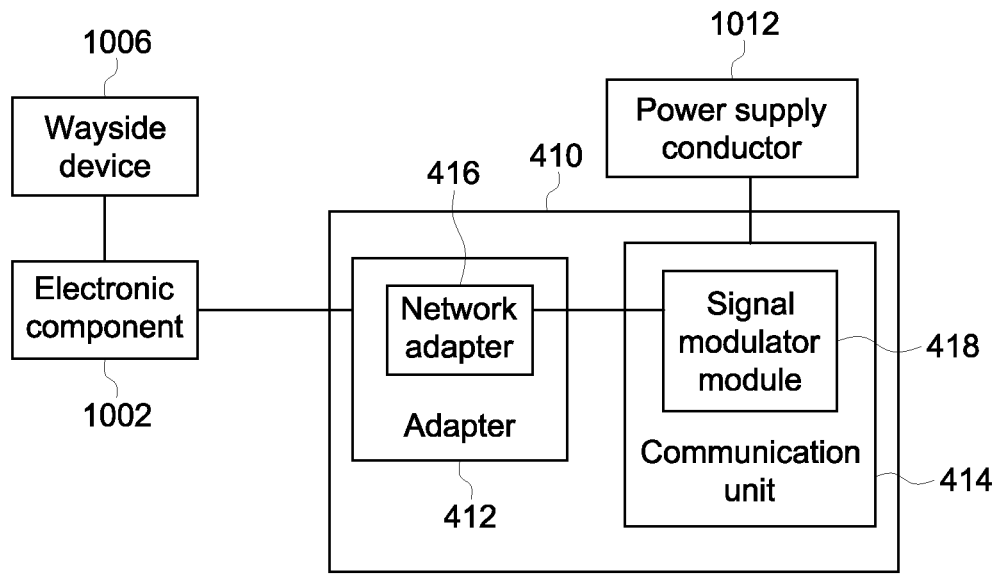
FIG. 33 is a schematic diagram of another embodiment of a router transceiver unit.

FIG. 33 is a schematic diagram of another embodiment of a router transceiver unit 410. The router transceiver unit 410 may be similar to the router transceiver unit 1004 shown in FIG. 27. For example, the router transceiver unit 410 may be coupled with the power supply conductor 1012, the electronic component 1002, and/or the wayside device 1006 to transmit network data from the wayside device 1006 and/or from the electronic component 1002 through the power supply conductor 1012 and/or receive network data through the power supply conductor 1012.

The router transceiver unit 410 may include an adapter 412 and a communication unit 414 operably coupled with each other. The adapter 412 is operably coupled with the electronic component 1002 of the wayside device 1006. The adapter 412 receives data as electrical signals from the electronic component 1002. In the illustrated embodiment, the adapter 412 may include a network adapter 416 that receives network data from the electronic component 1002.

The communication unit 414 is conductively coupled to the power supply conductor 1012 that supplies electric current to the wayside device 1006 to power the electronic component 1002 and/or another electronic apparatus other than the electronic component 1002. The power supply conductor 1012 may supply the current from a remote source, such as a source that is located several miles away. The communication unit 414 converts the network data received from the electronic component 1002 via the network adapter 416 of the adapter 412 to modulated network data. The communication unit 414 transmits the modulated network data over the power supply conductor 1012 to another location, such as another wayside device 1006 and/or another remote location.

In one embodiment, the communication unit 414 may include a signal modulator module 418 operably coupled with the network adapter 416 of the adapter 412. The signal modulator module 418 receives the network data from the network adapter 416 and converts the network data (e.g., such as by modulating the network data) to converted network data (e.g., such as modulated network data) for transmission over the power supply conductor 1012.

Figure 34:
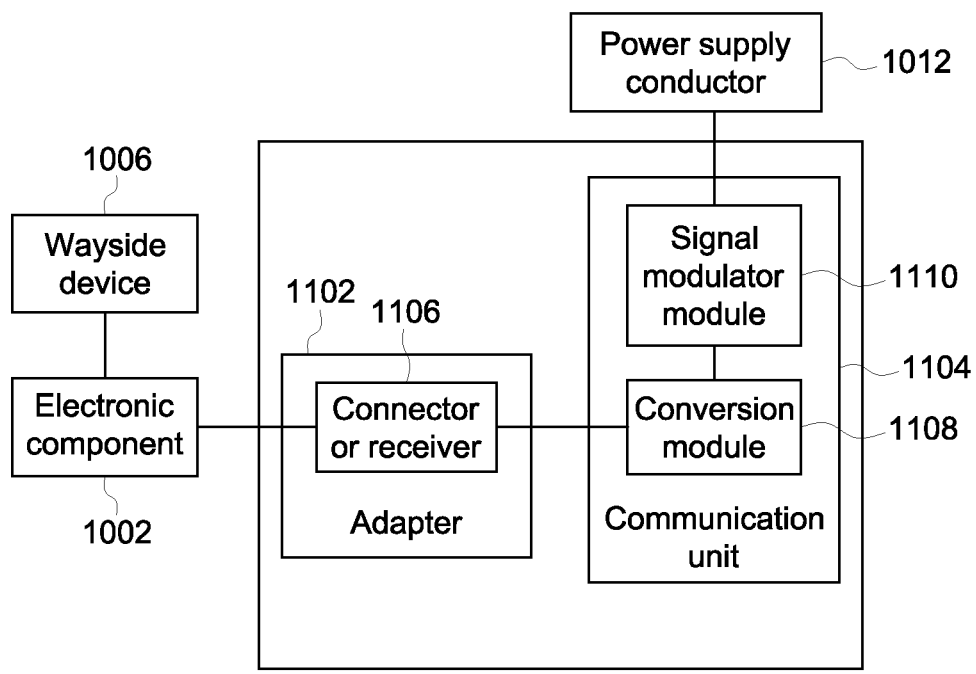
FIG. 34 is a schematic diagram of another embodiment of a router transceiver unit.

FIG. 34 is a schematic diagram of another embodiment of a router transceiver unit 1100. The router transceiver unit 1100 may be similar to the router transceiver unit 1004 shown in FIG. 27. For example, the router transceiver unit 1100 may be coupled with the power supply conductor 1012, the electronic component 1002, and/or the wayside device 1006 to transmit network data from the wayside device 1006 and/or the electronic component 1002 through the power supply conductor 1012 and/or receive network data through the power supply conductor 1012.

The router transceiver unit 1100 may include an adapter 1102 and a communication unit 1104 operably coupled with each other. The adapter 1102 is operably coupled with the electronic component 1002 of the wayside device 1006. The adapter 1102 receives data as electrical signals from the electronic component 1002. The adapter 1102 may include an electrical interface component 1106 ("Connector or Receiver") that interfaces with the electronic component 1002. The interface component 1106 may include an electrical connector that mechanically couples with the electronic component 1002 to receive electrical signals that include data (e.g., analog data and/or network data) obtained or generated by the electronic component 1002. Alternatively or additionally, the interface component 1106 may include a wireless transceiver that wirelessly communicates with the electronic component. For example, the interface component may receive data from the electronic component 1002 via a wireless communication link.

In one embodiment, the interface component 1106 may include one or more electronic receiver elements that perform signal processing of the electric signals received from the electronic component 1002. For example, the interface component 1106 may include one or more devices such as buffers, level shifters, demodulators, amplifiers, filters, and the like, that are used to process electrical signals received from the electronic component 1002 and that include the data from the electronic component 1002.

The communication unit 1104 is conductively coupled to the power supply conductor 1012 that supplies electric current to the electronic component 1002 and/or the wayside device 1006 to power the electronic component 1002, the wayside device 1006, and/or an electronic apparatus other than the electronic component 1002. As described above, the power supply conductor 1012 may supply electric current from a remote source, such as a source that is located several miles away.

The communication unit 1104 may convert the data received from the electronic component 1002 via the adapter 1102 to modulated network data and to transmit the modulated network data over the power supply conductor 1012. The communication unit 1104 may transmit the modulated network data to a remote location, such as another router transceiver unit 1100 and/or node 1020 (shown in FIG. 27) disposed several miles away.

In the illustrated embodiment, the communication unit 1104 may include a conversion module 1108 and a signal modulator module 1110. The conversion module 1108 is operably coupled to the adapter 1102 to receive the data from the electronic component 1002 via the adapter 1102. The conversion module 1108 converts the received data to network data. For example, the conversion module 1108 may receive non-network data (e.g., analog data) from the adapter 1102 and reformat the data into packet form, including headers, footers, and/or data conversion from an analog format to a digital format, to form the network data.

The signal modulator module 1110 receives the network data from the conversion module 1108 and may convert the network data, such as by modulating the network data, into modulated network data for transmission over the power supply conductor 1012. The communication unit 1104 may then transmit the modulated network data through the power supply conductor 1012.

Figure 28:
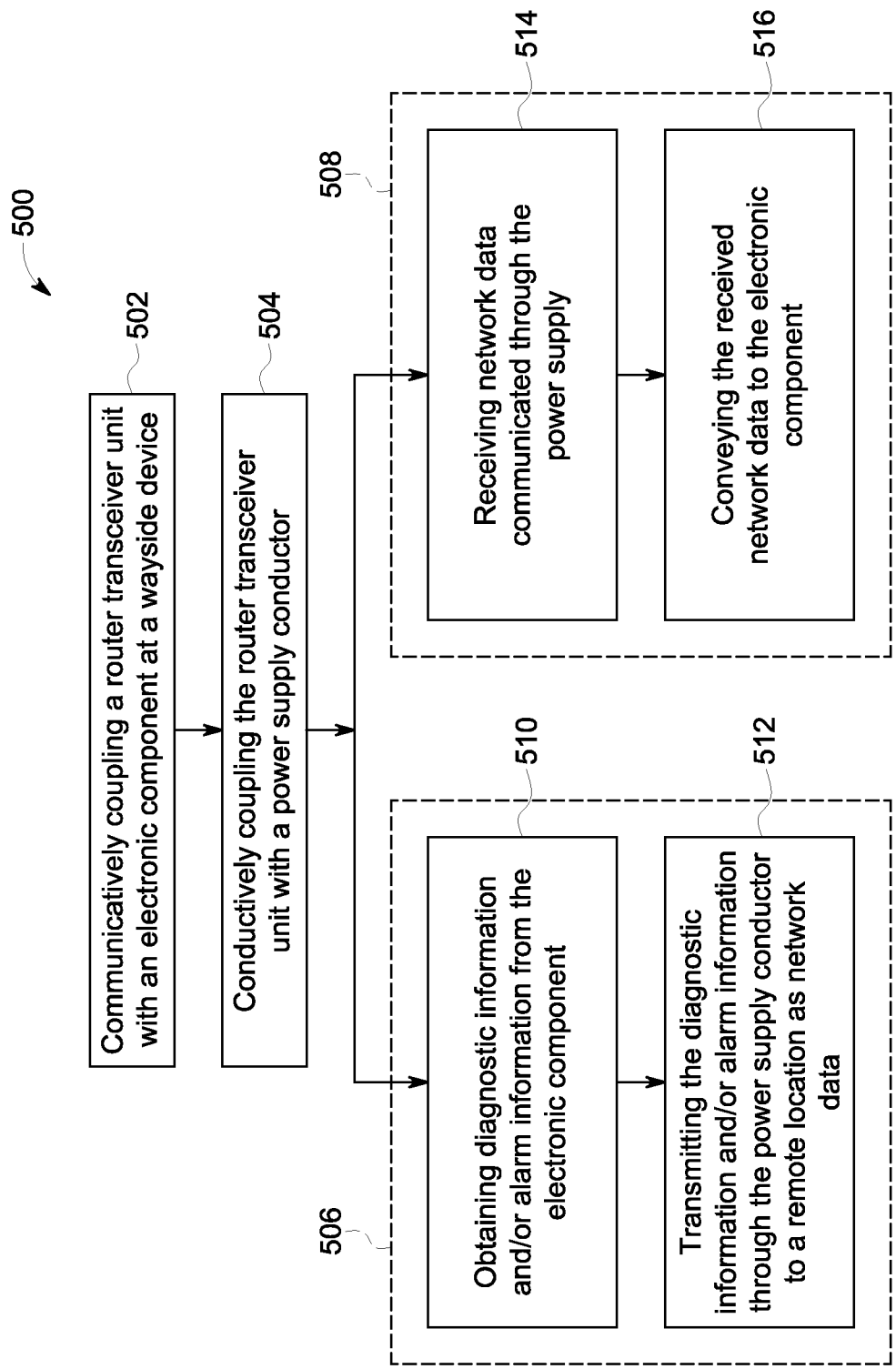
FIG. 28 is a flowchart of a method for communicating network data.

FIG. 28 is a flowchart of a method 500 for communicating network data. The method 500 may be used in conjunction with one or more embodiments of the communication system 1000 shown in FIG. 27. For example, the method 500 may be used to communicate network data with and/or between the router transceiver units 1004 (shown in FIG. 27) coupled with the electronic components 1002 (shown in FIG. 27) of the wayside devices 1006 (shown in FIG. 27) through the power supply conductors 1012 (shown in FIG. 27).

At 502, a router transceiver unit is communicatively coupled with an electronic component of a wayside device. As described above, the router transceiver unit 1004 (shown in FIG. 27) can be coupled with the electronic component 1002 (shown in FIG. 27) using one or more wired and/or wireless communication links.

At 504, the router transceiver unit is conductively coupled with a power supply conductor. For example, the router transceiver unit 1004 (shown in FIG. 27) may be conductively coupled with the power supply conductor 1012 (shown in FIG. 27) that also supplies electric current to the electronic component 1002 (shown in FIG. 27) and/or one or more other electronic apparatuses 1016, 1018 (shown in FIG. 27).

The method 500 may include two legs that include a transmission leg 506 and a receiving leg 508. One or more of the operations described in connection with each of the legs may be performed at different time periods, concurrently, or simultaneously. With respect to the transmission leg 506, at 510, diagnostic information and/or alarm information is obtained from the electronic component to which the router transceiver unit is coupled. For example, the electronic component 1002 (shown in FIG. 27) may obtain diagnostic and/or alarm information related to the vehicle 1008 (shown in FIG. 27) and/or the route 1010 (shown in FIG. 27). This diagnostic and/or alarm information is communicated to the router transceiver unit 1004 (shown in FIG. 27).

At 512, the router transceiver unit transmits the diagnostic information and/or alarm information through one or more of the power supply conductors as network data. For example, the router transceiver unit 1004 (shown in FIG. 27) may communicate network data that may include diagnostic information, alarm information, or another type of information to a remote location, such as the node 1020 (shown in FIG. 27) and/or another router transceiver unit 1004.

With respect to the receiving leg 508, at 514, the router transceiver unit receives network data through the power supply conductor. For example, the router transceiver unit 1004 (shown in FIG. 27) may receive control information used to control the vehicle 1008 (show in FIG. 27), status information, diagnostic information, alarm information, or another type of information. The router transceiver unit 1004 may receive the information as network data that is communicated in packets through one or more of the power supply conductors 1012 (shown in FIG. 27).

At 516, the router transceiver unit conveys the information of the received network data to the electronic component coupled with the router transceiver unit. For example, the router transceiver unit 1004 (shown in FIG. 27) may convey control information that directs the electronic component 1002 (shown in FIG. 27) to change a color of a light that is illuminated at the wayside device 1006 (shown in FIG. 27), to change a position of a switch of the wayside device 1006, or to otherwise change a condition of the electronic component 1002 and/or the wayside device 1006.

Other embodiments relate to systems and methods that allocate portions of a data communication bandwidth of a communication pathway extending between vehicles for the communication of different categories of data signals. Data may include information that is conveyed or communicated in a data signal. A data signal may include additional information that is used to convey or communicate the data. For example, a sensor may generate a measurement of speed as data. The speed measurement may be packetized in one or more packets that include additional information, such as header portions of the packets that specify recipients and/or orders of the packets. The packets may represent the data signals that are used to convey the data.

Figure 35:
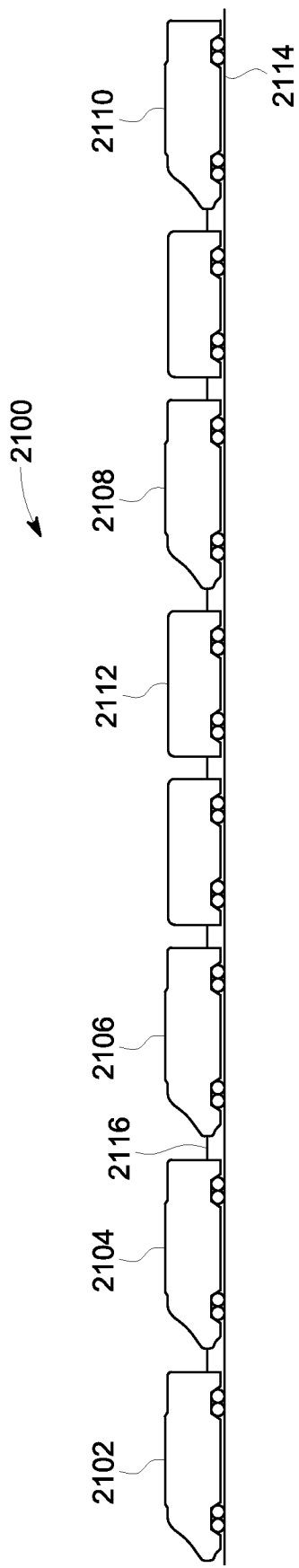
FIG. 35 is a schematic illustration of one embodiment of a vehicle consist.

FIG. 35 is a schematic illustration of one embodiment of a vehicle system 2100. The system 2100 shown in FIG. 35 is a rail vehicle system (e.g., a train or part of a train), but alternatively may be a non-rail vehicle system (e.g., a vehicle consist formed from two or more vehicles that are not rail vehicles). The system 2100 includes a lead vehicle 2102 and one or more trailing or remote vehicles 2104, 2106, 2108, 2110 and/or one or more non-propulsion-generating vehicles 2112. The units or vehicles 2104, 2106, 2108, 2110, 2112 alternatively may be referred to as vehicles, such as propulsion-generating vehicles 2104, 2106, 2108, 2110 (e.g., locomotives, automobiles, mining vehicles, marine vessels, etc.) and non-propulsion-generating vehicles 2112 (e.g., railcars, trailers, etc.).

The system 2100 travels along a route 2114 (e.g., track, road, waterway, etc.). A vehicle system may include a single propulsion-generating vehicle or multiple propulsion-generating vehicles. By way of example, a rail vehicle consist (e.g., train) may include several propulsion-generating and non-propulsion-generating vehicles or cars (e.g., rail vehicles), with the propulsion-generating vehicles being capable of self-propulsion and the non-propulsion-generating vehicles being incapable of self-propulsion. A locomotive consist may include several propulsion-generating vehicles (e.g., locomotives) that coordinate the tractive and/or braking efforts provided by the propulsion-generating vehicles such that the locomotive consist operates as a single unit. The vehicle system may include one or more locomotive consists. In one embodiment, the vehicles in the vehicle system 2100 are not mechanically coupled with each other. For example, two or more separate vehicles may travel together along a route as the system 2100, with the vehicles communicating with each other (e.g., using wireless communications) to coordinate the movements of the vehicles with each other so that the vehicles travel together as a group or unit.

The propulsion-generating vehicles 2102, 2104, 2106, 2108, 2110 supply tractive forces to propel the system 2100 along the route 2114. In one embodiment, the system 2100 includes the lead vehicle 2102 disposed at the front end of the consist 2100; alternatively, the lead vehicle 2102 may be located intermediate in the system 2100. In either case, the lead vehicle 2102 is the lead in terms of consist operation. The lead vehicle in a vehicle system may remotely control operations of the remote and/or trail vehicles in the same vehicle system. For example, the lead vehicle may issue command messages via wired and/or wireless communication pathways to the other vehicles in the vehicle system. These messages can direct the vehicles to implement designated operational settings (e.g., throttle settings, brake settings, speeds, accelerations, etc.).

The non-propulsion-generating vehicles 2112 may be cars for carrying cargo (e.g., goods and/or passengers) along the route 2114. The other propulsion-generating vehicles 2104, 2106, 2108, 2110 in the system 2100 may be remote propulsion-generating vehicles or trail propulsion-generating vehicles, depending on where in the system they are located and/or on how they are functionally linked with other propulsion-generating vehicles. In the example of FIG. 35, the propulsion-generating vehicles 2104, 2106 are trail or remote propulsion-generating vehicles, and the propulsion-generating vehicles 2108, 2110 are remote propulsion-generating vehicles. A remote propulsion-generating vehicle is one that is operationally linked (e.g., wirelessly) with the lead propulsion-generating vehicle 2102 for coordinated tractive effort (e.g., throttle or braking), in a distributed power (DP) system. Typically, remote propulsion-generating vehicles are not in the same propulsion-generating vehicle consist (e.g., locomotive consist) as the lead propulsion-generating vehicle 2102 (e.g., a remote vehicle may be spaced apart from the lead consist by one or more non-propulsion-generating vehicles), but this is not necessarily the case. A trail propulsion-generating vehicle is one that is in the same propulsion-generating vehicle consist as another propulsion-generating vehicle, and that is controlled by the other propulsion-generating vehicle, such as through a cable or other wired connection that interconnects the two. The number of propulsion-generating vehicles 2102, 2104, 2106, 2108, 2110 in the system 2100 may vary from those shown in FIG. 35.

The propulsion-generating vehicles 2102, 2104, 2106, 2108, 2110 and/or non-propulsion-generating vehicles 2112 may include data sources disposed on board the various propulsion-generating vehicles 2102, 2104, 2106, 2108, 2110 and/or non-propulsion-generating vehicles. For example, the propulsion-generating vehicles 2102, 2104, 2106, 2108, 2110 and/or non-propulsion-generating vehicles 2112 may include sensors, radios, software applications, and other components that generate data. The data can represent the output of the data sources and can be communicated between the propulsion-generating vehicles 2102, 2104, 2106, 2108, 2110 and/or non-propulsion-generating vehicles 2112 in the system 2100 via data signals. For example, the data signals may include the data that is sensed, measured, obtained, or the like, by the data sources. The data signals can be communicated throughout the system 2100 via one or more communication pathways 2116. The communication pathway 2116 may comprise a conductive communication pathway, such as a wire or other conductor, or a group of wires or other conductors, e.g., a trainline or MU cable, that extends through the system 2100 between the propulsion-generating vehicles 2102, 2104, 2106, 2108, 2110 and/or the non-propulsion-generating vehicles 2112. In another embodiment, the communication pathway 2116 may be another type of communication link among or between the vehicles 2102, 2104, 2106, 2108, 2110, 2112, such as one or more wireless connections in a wireless network. The data that is communicated as data signals through the communication pathway 2116 may be network data and/or high-bandwidth network data.

Figure 36:
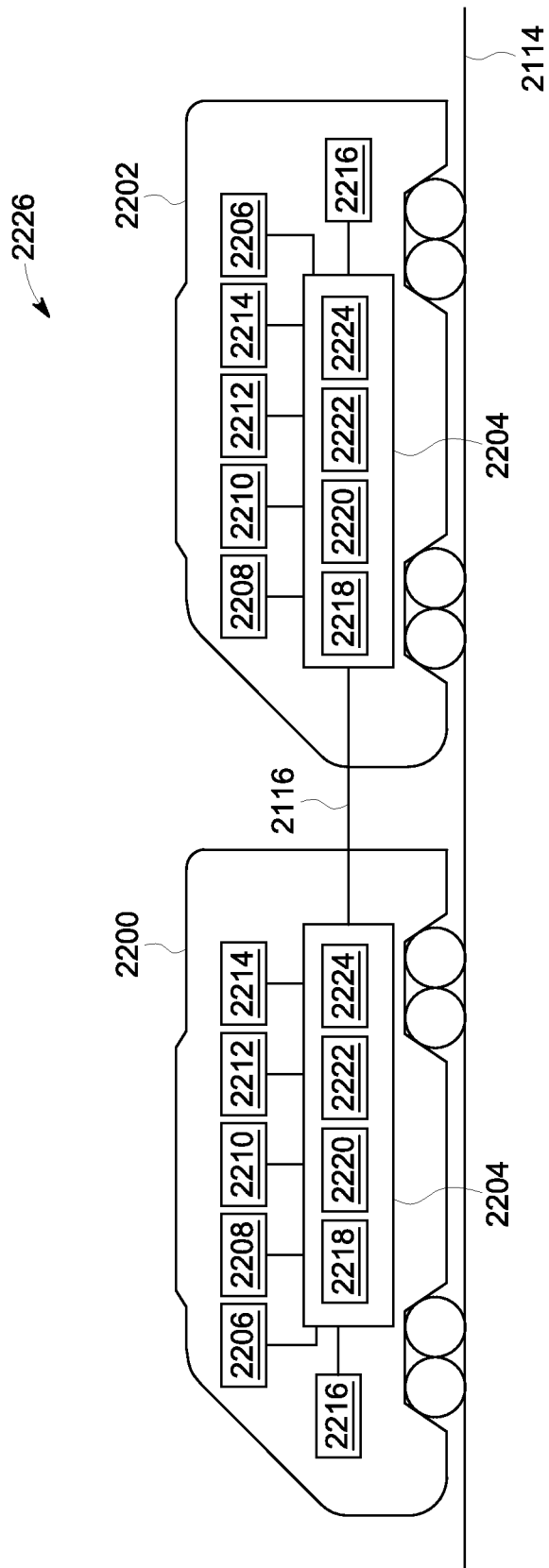
FIG. 36 is a schematic diagram of one embodiment of a communication system that communicates data signals between a first vehicle and a second vehicle of the consist shown in FIG. 35.

FIG. 36 is a schematic diagram of one embodiment of a communication system 2226 that communicates data signals between a first vehicle 2200 and a second vehicle 2202 of the consist 2100 shown in FIG. 35. The vehicles 2200, 2202 may represent two of the propulsion-generating and/or non-propulsion-generating vehicles 2102, 2104, 2106, 2108, 2110, 2112 (shown in FIG. 35). For example, the vehicles 2200, 2202 may represent two of the powered and/or non-propulsion-generating vehicles 2102, 2104, 2106, 2108, 2110, 2112 adjacent to each other in the consist 2100 shown in FIG. 35. Alternatively, the vehicles 2200, 2202 may be separated by one or more other powered and/or non-propulsion-generating vehicles 2102, 2104, 2106, 2108, 2110, 2112. As described above, the communication pathway 2116 extends between the vehicles 2200, 2202 to permit communication of data signals between the vehicles 2200, 2202. While the communication system 2226 is shown as extending between two vehicles 2200, 2202, the communication system 2226 may extend among three or more vehicles 2200, 2202. For example, the communication system 2226 may communicate data between or among several propulsion-generating vehicles in a vehicle system.

In the illustrated embodiment, the vehicles 2200, 2202 include one or more control systems 2216 that operate to control movement of the vehicles 2200, 2202. While only one control system 2216 is shown onboard each of the vehicles 2200, 2202, alternatively, one or more of the vehicles 2200, 2202 may have multiple control systems 2216 which can perform the same or different operations.

The control systems 2216 can represent one or more systems, such as a propulsion system, a brake system, a safety system, or the like. A propulsion system 2216 can provide tractive effort to propel the vehicles 2200, 2202. The propulsion systems can represent one or more traction motors, engines (e.g., diesel engines) that propel, accelerate, decelerate, and/or stop movement of the vehicle system 2100 (shown in FIG. 35). Alternatively, one or more of the vehicles 2200, 2202 may not include a propulsion subsystem 2216. A brake system can include brakes that generate braking effort to slow and/or stop movement of the vehicle system 2100. For example, the system 2216 can represent an air brake system having one or more pipes, conduits, compressors, valves, or the like, for increasing air pressure in the system 2216 to deactivate or disengage brakes of the vehicle system 2100 and/or decreasing air pressure in the system 2216 to activate or engage brakes of the vehicle system 2100. A safety system can represent the PTC system 1208 described herein.

The system 2226 includes processors 2204 disposed onboard the vehicles 2200, 2202. The processor 2204 may include computer processors, microprocessors, controllers, microcontrollers, or other hardware devices. For example, the processors 2204 can be programmable logic-based devices; dedicated, hard-wired state machines; or a combination thereof. The reference number 2204 can refer to a single processor or multiple processors, arithmetic-logic units (ALUs), central processing units (CPUs), or the like, disposed on board each of the vehicles 2200, 2202. The processors 2204 operate based on one or more sets of instructions. The one or more sets of instructions can include one or more software applications or programs stored on computer readable storage media disposed on board the vehicles 2200, 2202, such as memories 2206. The memories 2206 may be tangible and non-transitory computer readable storage media, such as solid-state, electromagnetic, and/or optical memories. The memories 2206 can be volatile, nonvolatile, or a mixture thereof. Some or all of the memories 2206 can be portable, such as a disk, card, memory stick, cartridge, and the like.

The processors 2204 are communicatively coupled with one or more data sources of the system 2226. For example, the processors 2204 may be capable of communicating with data sources disposed on board the same vehicle 2200, 2202 and/or with one or more data sources disposed on another vehicle by wired and/or wireless connections, such as busses, wires, wireless networks, and the like. In the illustrated embodiment, the data sources disposed on board each vehicle 2200, 2202 include a sensor 2208, an input device 2210, a control device 2212, and a computer application 2214. Alternatively, one or more other data sources may be disposed on the first and/or second vehicles 2200, 2202. In one embodiment, the data sources disposed on each of the vehicles 2200, 2202 may differ from the data sources disposed on board the other vehicle 2202, 2200.

The sensor 2208 includes a device capable of sensing or measuring a state or condition of a component and producing data representative of the sensed or measured state or condition. For example, the sensors 2208 can output operational data representative of a state of one or more control systems 2216 of the vehicles. This operational data can represent characteristics of the control systems 2216, and can include measurements of the control system 2216, such as a measured speed of an engine or vehicle, a measured torque or horsepower output by the vehicle, a measured location of the vehicle (e.g., global position system or other coordinates), a temperature of the vehicle, an acceleration of the vehicle, or the like. With respect to a brake system as the control system 2216, the operational data can include air pressure in the brake system, a rate of air flow in the brake system, a braking force of the brake system, a temperature of the brake system, a temperature of the vehicle system, a volume of air in the brake system, or the like.

The sensors 2208 can include active and/or passive sensors that monitor one or more characteristics of the vehicles 2200, 2202. The sensors 2208 may provide data that represents a health or status of one or more of the vehicles 2200, 2202. For example, the sensors 2208 may monitor the propulsion subsystems 2216, such as by monitoring the traction motors, engines, and/or brakes of the propulsion subsystems 2216. Alternatively, the sensors 2208 may include one or more other devices that provide data representative of a health, status, or condition of one or more other components of the vehicles 2200, 2202. The sensors 2208 may generate data that is to be communicated to one or more other vehicles 2200, 2202.

The input devices 2210 include one or more components that receive input from an outside source and generate data based on the input. The input devices 2210 can be devices that are used by human operators of the vehicles 2200 and/or 2202 to provide input into the system 2226. By way of example, the input devices 2210 can include keyboards, touchscreens, microphones, styluses, an electronic mouse, and the like. Alternatively, the input devices 2210 may be devices that receive data in data signals communicated from one or more other vehicles, such as the vehicle 2202. For example, the input device 2210 can include an antenna and/or coupling with the communication pathway 2116 to receive data from another vehicle. The input devices 2210 may generate data that is to be communicated to one or more other vehicles 2200, 2202.

The control device 2212 includes a device that is used to control tractive operations of the propulsion subsystem. For example, the control device 2212 may include a computer processor and one or more sets of instructions (e.g., software applications) that direct the computer processor to change tractive effort and/or braking effort supplied by the propulsion subsystem 2216. The control device 2212 may automatically control operations of the propulsion subsystem 2216, such as by changing the tractive efforts and/or braking efforts according to instructions received from another vehicle 2200 or 2202 (e.g., in a distributed power arrangement of the consist 2100 shown in FIG. 35), instructions received from the operator via the input device 2210, and/or a trip profile. The trip profile may be a series of settings for the propulsion subsystem (e.g., throttle and brake settings) that are automatically implemented by the control device 2212 during a trip of the consist 2100. For example, the trip profile may include different throttle settings based on a variety of factors, such as speed limits in different portions of the trip, emission limits, tonnage of cargo being conveyed, grade and/or curvature of the track 2114, and the like. The control device 2212 may generate data that is to be communicated with the control device 2212 and/or one or more other components on another vehicle 2200, 2202, such as to control tractive efforts of another vehicle 2200, 2202.

The computer application 2214 includes a device that performs one or more functions related to or dependent upon the operations of the vehicle 2200 or 2202. For example, the computer application 2214 may represent a computer processor and one or more sets of instructions that direct the processor to measure conditions of the vehicle 2200 or 2202 (e.g., throttle settings, current speed, brake pressure, temperature, horsepower, and the like) and use the measured conditions for one or more purposes, such as for calculating fuel efficiency, tracking performances of the operator of the vehicle 2200, 2202, providing safety features (e.g., speed limits), and the like, for the vehicle 2200, 2202. The computer applications 2214 on different vehicles 2200, 2202 may generate and communicate data with each other and/or with one or more other components on another vehicle 2200, 2202.

The processors 2204 receive data from one or more of the data sources described above and/or from one or more other data sources and communicate the data in data signals to another vehicle. For example, the processor 2204 of the first vehicle 2200 may transmit data signals that include data from one or more data sources 2208, 2210, 2212, 2214 of the first vehicle 2200 to the processor 2204 of the second vehicle 2200. The data signals can be transmitted through one or more wired and/or wireless connections, such as through the communication pathway 2116. The communication pathway 2116 can represent one or more wired connections, such as the MU cable, or may represent one or more wireless connections, such as a wireless network. Alternatively, the processor 2204 may transmit the data signals to one or more other vehicles of the consist 2100 shown in FIG. 35.

One or more of the processors 2204 on the vehicles 2200, 2202 may include several functional modules that perform various operations to communicate the data signals between vehicles of the consist 2100 (shown in FIG. 35). The modules may be embodied in one or more sets of instructions stored in the memory 2206 of the corresponding vehicle 2200, 2202. In the illustrated embodiment, the processors 2204 include input modules 2218 that receive data from the data sources. For example, the processors 2204 may be communicatively coupled with the sensors 2208, input devices 2210, control devices 2212, and computer applications 2214 disposed on the same vehicle 2200, 2202 by one or more wired and/or wireless connections. The input modules 2218 may receive data from the data sources disposed on board the same vehicle 2200, 2202. Alternatively, the input modules 2218 may receive data from one or more other data sources and/or from one or more data sources disposed on a different vehicle 2200, 2202.

In one embodiment, a prioritization module 2220 assigns different priority ranks to the data signals used to convey the data received from the data sources. The priority ranks may be assigned to the data signals based on one or more categories of the data that is transmitted in the data signals. For example, the prioritization module 2220 can associate data received from the data sources with one or more categories and assign the same or similar priority ranks to data associated with the same category. The categories can be customizable and changed over time. As one example, the categories can include, but are not limited to, a: first category, comprising data associated with controlling operations of a propulsion subsystem of one or more of a first vehicle or a different, second vehicle (referred to herein as the control category); a second category, comprising data associated with enforcement of a safety limitation on operations of one or more of the first vehicle or the second vehicle (referred to herein as the safety category); a third category, comprising data representative of information about at least one of a state or condition of one or more of the first vehicle or the second vehicle (referred to herein as the informational category); and/or a fourth category, comprising data used by one or more software applications (referred to herein as the software application category). The categories can additionally or alternatively include a fifth, third party category (comprising data that is requested by and/or used by one or more third party software applications), and a sixth, inherent category (comprising data that is requested by and/or used by one or more software applications provided by the manufacturer or supplier of the vehicle). One or more additional categories may be used. In one embodiment, a seventh, "other" category may include data that is not included in one or more other categories.

The control category includes data that relates or is used to control operations of the vehicle 2200, 2202. For example, the control category may include instructions to change one or more settings of the propulsion subsystem 2216 of a vehicle 2200, 2202. In operation, the first vehicle 2200 may transmit instructions to the second vehicle 2202 to change a throttle setting, a brake setting, or some other setting that controls tractive operations of the second vehicle 2202. These instructions may be associated with the control category by the prioritization module 2220 prior to transmitting the instructions in data signals from the first vehicle 2200 to the second vehicle 2202.

The informational category includes data that provides information about a state or condition of one or more of the vehicles 2200, 2202. For example, the informational category may include fuel levels, speeds, temperatures, horsepower, and the like, of one or more of the vehicles 2200, 2202. In one embodiment, the data in the informational category may not include directions or instructions to change, vary, or maintain a setting or other state or condition of the propulsion subsystem 2216.

The safety category includes data that may be used for the safe operation of the vehicle 2200, 2202. For example, the data in the safety category may be used to prevent or avoid physical harm to bystanders, the vehicles 2200, 2202, other vehicles, nearby equipment, and the like, by enforcing one or more safety limitations (e.g., speed and/or geographical limitations) on the vehicles 2200, 2202. The data of the safety category may be used by the vehicles 2200, 2202 to control operations of the vehicles 2200, 2202. For example, the data in the safety category can include positive train control (PTC) information that is used to monitor and/or control movements of one or more of the vehicles 2200, 2202 and/or the consist 2100 shown in FIG. 35. The PTC information may represent geographic locations of the vehicles 2200, 2202 and/or consist 2100 relative to boundaries that represent restricted areas that the vehicles 2200, 2202 and/or consist 2100 are not permitted due to safety limitations (e.g., the presence of another consist on the track 2114). As another example, the PTC information may represent current speeds of the vehicles 2200, 2202 and/or consist 2100 relative to speed limits associated with different geographic areas. The data in the safety category can be used to change operations of the vehicle 2200, 2202, such as to stop movement of the vehicle 2200 and/or 2202 when the vehicle 2200, 2202 approaches or enters a restricted area, to slow down movement of the vehicle 2200 and/or 2202 when the vehicle 2200, 2202 approaches a reduced speed limit, and the like. Other information in addition to the above examples may be data in the safety category.

The third party category includes data that is requested by and/or used by one or more third party software applications to perform one or more operations. For example, the computer application 2214 may be a third party software application, such as a software application provided by an entity or party other than the manufacturer or supplier of the vehicle 2200 and/or 2202. The third party software application may use the data for a variety of purposes, such as for monitoring or tracking one or more states, conditions, or operations of the vehicle 2200, 2202.

The inherent category includes data that is requested by and/or used by one or more software applications provided by the manufacturer or supplier of the vehicle 2200, 2202. For example, the computer application 2214 may be a software application that is pre-loaded or pre-existing on the vehicle 2200, 2202 when the vehicle 2200, 2202 is acquired, or is provided after acquisition of the vehicle 2200, 2202 by the manufacturer or supplier. The software application may use the data for a variety of purposes, such as for monitoring or tracking one or more states, conditions, or operations of the vehicle 2200, 2202. The third party category and the inherent category may collectively be referred to as a software application category.

In one embodiment, the prioritization module 2220 assigns a low or relatively low priority rank to data of the third party category and a higher priority rank to the data of the inherent category. The prioritization module 2220 may assign a priority rank to the informational category that is the same or higher than the priority rank of the inherent category. Alternatively, the data in at least a plurality of the third party category, the inherent category, and/or the informational category may be assigned the same priority rank. The prioritization module 2220 can assign a higher priority rank to the data in the control category than the priority ranks of the third party category, the inherent category, and/or the informational category. The data of the safety category may be provided with a priority rank that is higher than one or all of the other categories. Alternatively, a different order of priority ranks may be assigned to the data of the different categories. In one embodiment, data may belong or be associated with a plurality of categories. The prioritization module 2220 may assign the priority rank that is greatest among the plurality of categories to which the data is associated, or at least a priority rank that is greater than one or more of the other categories to which the data is associated.

The prioritization module 2220 can assign different data to the different categories in a variety of manners. In one embodiment, different data sources may have electrical connectors that mechanically and electrically couple the data sources with the processor 2204, or with a housing that includes the processor 2204. For example, the data sources may be connected to connector plugs that are received in different connector sockets. The prioritization module 2220 may identify which socket is used to receive data and, based on the socket, assign the data to a particular category. As different data sources can be coupled with different sockets, the data from the different data sources can be associated with different categories.

In another embodiment, the prioritization module 2220 can assign different data to the different categories based on identifiers of the data sources. For example, the different data sources may be associated with identifiers, such as Internet Protocol (IP) addresses. The IP addresses may be unique or shared by two or more of the data sources. The prioritization module 2220 may assign the data received from one or more data sources having one or more identifiers to a first category, the data received from other data sources having other identifiers to a second category, and so on.

A bandwidth module 2222 allocates different portions of a data communication bandwidth that is available on the communication pathway 2116 to the data signals. In one embodiment, the bandwidth module 2222 allocates the portions of the bandwidth to the categories of data based on priority ranks associated with the categories. Alternatively, the bandwidth module 2222 may allocate the portions of the bandwidth based on an amount of available bandwidth. The communication pathway 2116 may have a bandwidth that represents a measurement of data communication resources that are available for communicating the data signals. The bandwidth may be expressed as a bit rate, or rate of communication of data through the communication pathway 2116, such as bits per second, kilobits per second, and the like. In one embodiment, the communication pathway 2116 has a bandwidth of 10 megabits per second. Alternatively, the communication pathway 2116 may have a smaller or larger bandwidth. The bandwidth may be referred to as a channel capacity of the communication pathway 2116.

The bandwidth of the communication pathway 2116 may be allocated among different categories of data by dividing the available bandwidth into portions and assigning different portions and/or different sized portions to different categories. For example, the safety category may be assigned a first portion of the bandwidth, the control category may be assigned a second portion of the bandwidth, the informational category may be assigned a third portion of the bandwidth, and so on. In one embodiment, the portions of the bandwidth represent different subsets of the physical portions of the MU cable to the different categories. For example, if the MU cable includes "n" physical portions, the bandwidth module 2222 may dedicate or assign one of the physical portions to a first subset of physical portions, another of the physical portions to a second subset, another of the physical portions to a third subset, and another of the physical portions to a fourth subset. The different subsets of the physical portions may include non-overlapping subsets of the physical portions. For example, in one embodiment, no two subsets of the physical portions include the same physical portion or physical portions. Alternatively, a plurality of the subsets of the physical portions may share one or more physical portions. Different categories of the data may be assigned to different subsets of the physical portions.

The bandwidth module 2222 can allocate the different subsets of the physical portions to the different categories of data in order to provide greater bandwidth to one or more of the categories than one or more other categories. For example, if the portions are the same size or approximately the same size (e.g., the portions have the same or approximately same number of physical portions), then the bandwidth module 2222 can allocate a greater number of the portions of the physical portions to a first category relative to a second category to provide the first category with greater bandwidth. Alternatively, if the portions are not the same size (e.g., the portions have different numbers of physical portions), then the bandwidth module 2222 can allocate a portion having a larger number of physical portions to a first category relative to a second category so that the first category has a greater bandwidth. As the number of physical portions that is allocated to a category increases, the size of the bandwidth in the communication pathway 2116 that is used to communicate data signals having data of the category increases. Conversely, as the number of physical portions that is allocated to a category decreases, the size of the bandwidth in the communication pathway 2116 that is used to communicate data signals having data of the category also may decrease.

In another embodiment, the bandwidth of the communication pathway 2116 may be expressed as a range of frequencies that can be used to communicate data signals through the communication pathway 2116. For example, the bandwidth may include a range of frequencies ($\Delta f$) extending from a lower frequency limit (fL) to an upper frequency limit (fU). The frequencies within the range of frequencies ($\Delta f$) may be grouped into subsets or channels, with each subset or channel representing a smaller range of the frequencies. For example, the bandwidth module 2222 may allocate of the range of frequencies ($\Delta f$) to a first subset or channel, another of the range of frequencies ($\Delta f$) to a second subset or channel, another of the range of frequencies ($\Delta f$) to a third subset or channel, and another of the range of frequencies ($\Delta f$) to a fourth subset or channel. Different subsets or channels can be assigned to the different categories of data such that data signals conveying different categories of data are communicated using different subsets of the range of frequencies ($\Delta f$). In one embodiment, a plurality or all of the same physical portions of the communication pathway 2116 may be used to communicate data signals having data of different categories at the same time, but with different subsets or channels of the range of frequencies ($\Delta f$).

The different subsets or channels of the range of frequencies ($\Delta f$) may include non-overlapping subsets of the range of frequencies ($\Delta f$). For example, in one embodiment, no two subsets or channels of the range of frequencies ($\Delta f$) include the same frequency. Alternatively, a plurality of the subsets or channels of the range of frequencies ($\Delta f$) may share one or more frequencies.

The bandwidth module 2222 may allocate fixed portions of the bandwidth to the categories of data. For example, the bandwidth module 2222 may assign different subsets of the physical portions and/or of the range of frequencies ($\Delta f$) to different categories prior to a trip of the consist 2100 (shown in FIG. 35) (e.g., the movement of the consist 2100 from a starting location to a destination location) and keep the allocation of the subsets among the categories the same for the remainder of the trip.

Alternatively, the bandwidth module 2222 may dynamically allocate the portions of the bandwidth among the categories of data. For example, the bandwidth module 2222 may initially assign different subsets of the physical portions and/or of the range of frequencies ($4f$) to different categories but change the size of the assigned portion of the bandwidth for one or more of the categories. The bandwidth module 2222 may change the size of the portion of the bandwidth for a category by allocating a different number of physical portions to communicating data signals having data of the category and/or by allocating a larger or smaller subset of the range of frequencies ($\Delta f$) to the communication of data signals having data of the category.

The bandwidth module 2222 can dynamically allocate the bandwidth among the categories of data based on an operating condition of the vehicle 2200 and/or 2202. An operating condition represents a state or the occurrence of an event related to operations of the vehicle 2200, 2202. For example, application of an emergency brake, a shutdown (e.g. turning off) of an engine, failure of a traction motor, detection of impending failure of a traction motor, an unsafe increase or change in an engine temperature, and the like, may represent an emergency or abnormal operating condition of the vehicle 2200, 2202. When such an emergency or abnormal operating condition occurs, the bandwidth module 2222 may increase the size and/or number of portions of the bandwidth that are allocated to one or more categories of data having higher priority ranks and/or reduce the size and/or number of portions of the bandwidth allocated to other categories having lower priority ranks. Detection of the operating condition of the vehicle 2200, 2202 may be provided by the input device 2210 and/or one or more other data sources to the bandwidth module 2222.

The bandwidth module 2222 can dynamically allocate the bandwidth among the categories of data based on a failure rate of communication between the vehicle 2200 or 2200 and one or more other vehicles of the consist 2100 (shown in FIG. 35). The failure rate of communication represents a frequency at which data signals transmitted by a first vehicle of the consist 2100 do not reach, or are not received, by a different, second vehicle of the consist 2100. With respect to data signals transmitted as a plurality of data packets, a data signal may not reach or be received when one or more of the data packets that are necessary to interpret the data signal do not reach the intended recipient. In one embodiment, the vehicles 2200, 2202 may transmit data signals and confirmation signals to each other. The data signals include data, as described above, and the confirmation signals may include indications that the data signals were successfully received. If a receiving first vehicle does not transmit a confirmation signal to a transmitting second vehicle, then a failure of communication may have occurred.

The input module 2218 of a transmitting vehicle may track or monitor how often data signals are sent to another receiving vehicle without a confirmation signal being received from the receiving vehicle. If the frequency or number of times that confirmation signals are not received exceeds a threshold, then the input module 2218 of the transmitting vehicle may notify the bandwidth module 2222 of the transmitting vehicle. In response, the bandwidth module 2222 may increase the size and/or number of portions of the bandwidth that are allocated to one or more categories of data transmitted by the transmitting vehicle to attempt to decrease the failure rate of communication from the transmitting vehicle. Conversely, if the rate of communication failure decreases below a threshold, then the input module 2218 may inform the bandwidth module 2222 and the bandwidth module 2222 may decrease the size and/or number of portions of the bandwidth allocated to one or more categories of the data transmitted by the transmitting vehicle.

The bandwidth module 2222 can dynamically allocate the bandwidth among the categories of data based on a change in the amount of bandwidth that is available through the communication pathway 2116. For example, due to physical damage to the communication pathway 2116, interference in communication within the communication pathway 2116, an increase in the amount of data signal traffic in the communication pathway 2116, and/or one or more external conditions, the amount of bandwidth that is available on the communication pathway 2116 may change or decrease. The bandwidth module 2222 may monitor the available bandwidth on the communication pathway 2116. When the available bandwidth decreases below a threshold, the bandwidth module 2222 may increase the size and/or number of portions of the bandwidth that are allocated to one or more categories of data having higher priority ranks and/or reduce the size and/or number of portions of the bandwidth allocated to other categories having lower priority ranks. In one embodiment, if the available bandwidth increases above a threshold, the bandwidth module 2222 may change the size and/or number of portions of the bandwidth that are allocated to one or more categories of data, or may stop allocating bandwidth among the categories such that all or a plurality of the categories are transmitted using any or all of the available bandwidth.

A transceiver module 2224 directs transmission of the data signals from one vehicle 2200 or 2202 to another vehicle 2202 or 2200 through the communication pathway 2116. If the bandwidth module 2222 has allocated different portions of the bandwidth of the communication pathway 2116 to different categories of data, then the transceiver module 2224 may transmit the data signals having the data using the allocated portions of the bandwidth. As described above, a transceiver module such as the router transceiver units described herein may be used to transmit and/or receive data signals on the communication pathway 2116. For example, the transceiver module 2224 may include or be embodied in a router transceiver unit to transmit and/or receive the data signals.

In one embodiment, the bandwidth module 2222 throttles the available bandwidth for transmitting the data signals based on the priorities associated with the data signals by communicating the data signals through the communication pathway 2116 using one or more layers of the OSI model of communication. For example, the data signals may be transmitted through the communication pathway 2116 by the transceiver module 224 as data packets according to the TCP/IP protocol. The layers of the OSI model provide services to one or other layers of the OSI model to permit successful communication of the data packets from a transmitter to a receiver of the data packets, with the data packets being combined to form a data signal by the receiver of the data packets. For example, the network layer (also referred to as "Layer 3") of the OSI model can provide for the routing of the data packets forming the data signal between communication components along a pathway between the transmitter and the receiver of the data signal. The communication components include one or more devices or modules that receive data packets and re-transmit the data packets between the transmitter and the receiver. In one embodiment, the communication components that route the data packets according to the network layer include transceiver modules 2224 disposed in the consist 2100, such as by being disposed on-board one or more propulsion-generating vehicles 2104, 2106, 2108, 2110 and/or non-propulsion-generating vehicles 2112 of the consist 2100. The transceiver module 2224 that transmits the data packets can send the data packets to the transceiver module 2224 on another unit 2104, 2106, 2108, 2110, 2112, with the network layer routing the data packets through other transceiver modules 2224 disposed between the transmitting transceiver module 2224 and the receiving transceiver module 2224. These other transceiver modules 2224 receive and re-transmit the data packets so that the data packets end up at and are recombined at the receiving transceiver module 2224.

The transport layer (also referred to as "Layer 4") of the OSI model can provide for controlling the reliability in transmitting the data packets from the transmitting transceiver module 2224 and the receiving transceiver module 2224. For example, the transport layer can control the flow of the data packets (e.g., by changing the bandwidth allocated to communicating the data packets of different data signals), the segmentation and/or desegmentation of groups of packets and/or of individual packets (e.g., by combining data packets into groups and/or separating groups of data packets), and the like. The transport layer can control the order in which the data packets are transmitted so that the receiving transceiver module 2224 receives the data packets in a predetermined order, such as in the order that the data packets are combined to form the data signal. The transport layer can provide error checking of the data packets, such as by examining the contents of the data packets to ensure the data included therein is not corrupted and/or by determining if the receiving transceiver module 2224 actually receives the data packets.

The network and transport layers can be used to communicate the data signals over the communication pathway 2116 that includes, or is formed from, the MU cable in the consist 2100. For example, the transceiver modules 2224 of the consist 2100 and the communication pathway 2116 may form interconnected components of a network, such as an Ethernet network. The network and transport layers may then be used to communicate the data packets of the data signal between the transceiver modules 2224 and through the communication pathway 2116. The network and transport layers may transmit the data packets according to the bandwidth allocations determined by the bandwidth module 2222, and may provide quality of service (QoS) mechanisms to the communication of the data packets. For example, by assigning different priorities to the data signals, allocating different portions of available bandwidth according to the priorities, using the network layer to transmit the data packets along pathways in the Ethernet network according to the allocated portions of the bandwidth (e.g., higher priority signals having shorter paths through the network), and/or using the transport layer to provide more bandwidth to the data packets associated with higher priorities, a QoS mechanism that provides increased speed and/or reliability in transmitting higher priority data may be achieved.

Figure 37:
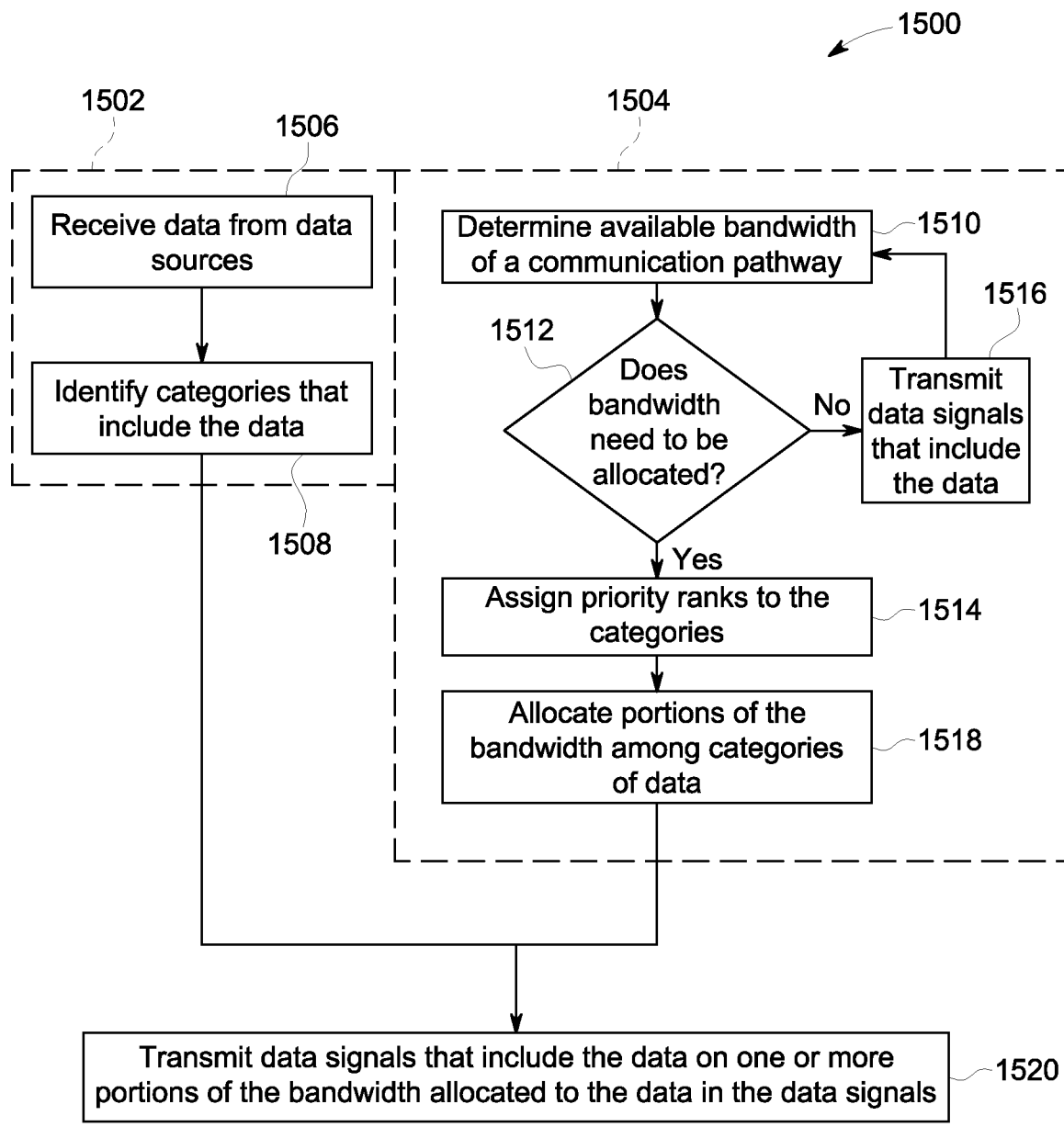
FIG. 37 is a flowchart of an embodiment of a method for communicating data signals in a vehicle consist.

FIG. 37 is a flowchart of one embodiment of a method 1500 for communicating data signals in a vehicle consist. The method 1500 may be used in conjunction with one or more embodiments of the communication system 2226 (shown in FIG. 36) to communicate data signals between vehicles 2200, 2202 (shown in FIG. 36) of the consist 2100 (shown in FIG. 35). The method 1500 is shown as including two legs 1502, 1504 that are referred to as a data acquisition leg 1502 and a bandwidth allocation leg 1504. The operations described in connection with the different legs 1502, 1504 may be performed at different times, during the same time periods, or during at least partially overlapping time periods.

In the data acquisition leg 1502, at 1506, data is received from one or more data sources. As described above, the processor 2204 on the vehicle 2200 may receive data from a variety of input sources, such as the sensor 2208, the input device 2210, the control device 2212, the computer application 2214, and the like.

At 1508, categories of the data are identified. For example, the data may be associated with one or more categories based on the data source that provided the data and/or the contents of the data. As described above, the categories may include a safety category, a control category, an informational category, a third party category, an inherent category, an other category, and the like.

In the allocation leg 1504, at 1510, an amount of available bandwidth on a communication pathway between the vehicles is determined. For example, the processor 2204 (shown in FIG. 36) may determine how much bandwidth is available on the conductive communication pathway 2116 (shown in FIG. 35) extending between the vehicles 2200, 2202 (shown in FIG. 36) for transmission of the data signals from the vehicle 2200 to the vehicle 2202. The bandwidth may be expressed as a bit rate for data transmission and/or a range of frequencies (Δf) that may be used to data transmission.

At 1510, a determination is made as to whether the bandwidth of the communication pathway needs to be allocated. For example, the processor 2204 (shown in FIG. 36) may determine if the amount of available bandwidth is relatively low, such as by being less than a bit rate threshold or frequency range threshold. If the amount of available bandwidth is relatively low, then the communication pathway may have insufficient resources to communicate data signals between the vehicles 2200, 2202 (shown in FIG. 36) without allocating the bandwidth among different categories of the data in the data signals. As a result, flow of the method 1500 may continue to 1514.

On the other hand, if the amount of available bandwidth is not relatively low, such as by being at least as great as a bit rate threshold or a frequency range threshold, then the communication pathway may have sufficient resources to communicate the data signals between the vehicles 2200, 2202 (shown in FIG. 36) without allocating the bandwidth among the categories of the data in the data signals. As a result, flow of the method may continue to 1516.

At 1516, data signals that include the data are transmitted from the vehicle 2200 (shown in FIG. 36) to the vehicle 2202 (shown in FIG. 36) without allocating the bandwidth of the communication pathway among the categories of data. Flow of the method 1500 may return to 1510 so that the method 1500 proceeds in a loop-wise manner and the available bandwidth is repeatedly examined to determine if the bandwidth needs to be allocated. Alternatively, flow of the method 1500 may not return to 1510.

At 1514, priority ranks are assigned to the categories of the data. For example, the categories of the data may be prioritized based on which data sources provided the data and/or the contents of the data. As described above, certain categories may receive a higher priority than other categories based on the type of data. For example, data related to the safe operation and/or control of the vehicles 2200, 2202 (shown in FIG. 36) may be provided with a higher priority rank than data that is provided for informational purposes only (e.g., a fuel level measurement or a cabin temperature measurement).

At 1518, at least some of the available bandwidth of the communication pathway between the vehicles 2200, 2202 (shown in FIG. 36) is allocated among at least a plurality of the categories of the data. For example, the bandwidth may be divided into portions that are defined by subsets of different, discrete conductors and/or subsets of the range of frequencies (Δf). The portions may be the same size or different sizes. One or more of the portions may be allocated to each of a plurality or all of the categories. As described above, categories having higher priority ranks may be allocated larger portions of the bandwidth and/or a larger number of portions of the bandwidth.

At 1520, data signals that include the data are transmitted from the vehicle 2200 to the vehicle 2202. The data signals are transmitted through the communication pathway between the vehicles 2200, 2202. The data signals are transmitted using the portions of the bandwidth that are allocated based on the categories of the data. For example, a first data signal having data in a first category may be transmitted using a first portion of the bandwidth while a second data signal having data in a second category is transmitted using a different, second portion of the bandwidth. As described above, the data signals may be transmitted as network data comprised of data packets.

The method 1500 may proceed in a loop-wise manner. For example, flow of the method 1500 may return to 1506 and/or 1510 in order to obtain more data and/or allocate available bandwidth based on the categories of the data. The allocation of bandwidth may be fixed for a trip of the vehicles 2200, 2202 or may be dynamically changed during the trip, as described above.

Figure 38:
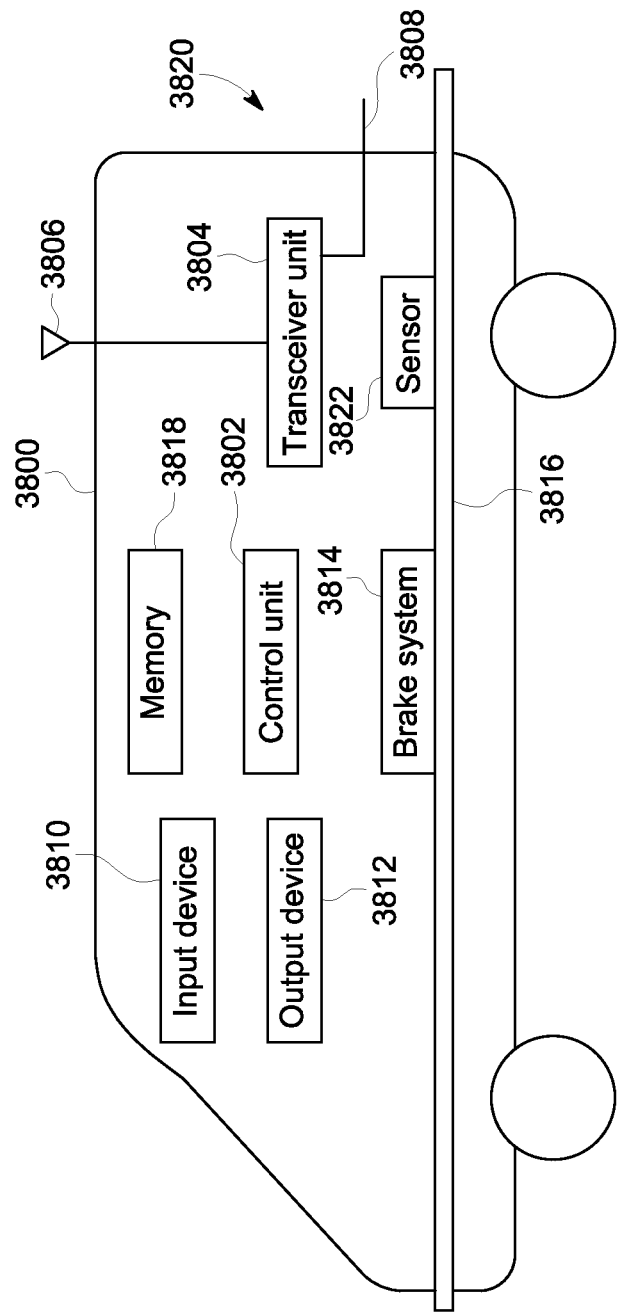
FIG. 38 is a schematic illustration of another embodiment of a vehicle.

FIG. 38 is a schematic illustration of another embodiment of a vehicle 3800. The vehicle 3800 can represent one or more of the vehicles described above. For example, the vehicle 3800 can represent one or more of the propulsion-generating vehicles, rail vehicles, or other types of vehicles described herein. The vehicle 3800 can be included in a vehicle system or vehicle consist formed from two or more vehicles 3800 to travel together along a route, such as a road, track, or the like.

The vehicle 3800 includes a control unit 3802. The control unit 3802 can represent one or more of the control units described herein. For example, the control unit 3802 can represent hardware circuits or circuitry that include and/or are connected with one or more processors for controlling operations of the vehicle 3800 and/or the vehicle system that includes the vehicle 3800. The control unit 3802 is operably coupled with other components of the vehicle 3800 by one or more wired and/or wireless connections that permit the communication of data between the components.

One or more transceiver units 3804 are disposed onboard the vehicle 3800 and are operably coupled with the control unit 3802. The transceiver unit 3804 shown in FIG. 38 represents one or more of the transceiver units, communication units, radio units, or the like, described herein. A communication system 3820 may be formed by plural transceiver units 3804 onboard two or more vehicles 3800 in the same vehicle system or vehicle consist. As a result, only part of the communication system 3820 is shown in FIG. 38.

The transceiver unit 3804 can be operably connected with transceiving circuitry, such as an antenna 3806 and associated hardware for wirelessly communicating data (such as packetized network data) with one or more other vehicles 3800. The transceiver unit 3804 can be operably connected with one or more wired communication pathways 3808 extending along the vehicle system or vehicle consist. In one embodiment, the wired communication pathway 3808 shown in FIG. 38 represents an MU cable. Alternatively, the pathway 3808 can represent one or more other wired connections. The transceiver unit 3804 can communicate data (e.g., packetized network data) with one or more other vehicles 3800 in the same vehicle system or vehicle consist via the communication pathway 3808 and/or wirelessly via the antenna 3806.

An input device 3810 is operably connected with the control unit 3802 so the control unit 3802 can receive input from an operator of the vehicle 3800 and/or other sources of input. The input device 3810 can represent one or more of the input device described herein, such as the input device 2210. An output device 3812 is operably connected with the control unit 3802 so the control unit 3802 can present information to an operator of the vehicle 3800, such as operational data, operational capabilities of the vehicle system, or the like. The output device 3812 can represent one or more electronic devices used to communicate information to the operator. For example, the output device 3812 can represent the display described herein, a speaker, a haptic device, a touchscreen, one or more lights, or the like.

As described above, the vehicle 3800 can include a control system 2216, such as a brake system 3814 shown in FIG. 38. The control system 2216 can control movement events of the vehicle 3800 or consist that includes the vehicle 3800. A movement event can include changing a current movement of the vehicle 3800 or consist. For example, movement events can include slowing movement of the vehicle 3800 or consist, stopping movement of the vehicle 3800 or consist, speeding up movement of the vehicle 3800 or consist, or the like.

The brake system 3814 operates to slow or stop movement of the vehicle 3800. In one embodiment, the brake system 3814 represents an air brake system that maintains air pressure in one or more conduits and/or reservoirs (collectively shown as 3816 in FIG. 38) above a designated threshold to deactivate or disengage breaks of the vehicle 3800. The brake system 3814 can reduce this air pressure to engage the breaks of the vehicle 3800. Alternatively, the brake system 3814 may represent another type of brake system. The brake system 3814 show in FIG. 38 can represent the brake system of only the vehicle 3800, or can represent the brake system of the vehicle system. For example, the brake system 3814 shown in FIG. 38 can represent a combination of the brake systems disposed onboard multiple vehicles in a vehicle system. In another embodiment, the brake system 3814 represents another type of control system of the vehicle 3800, such as a propulsion system, a safety system, or the like.

One or more sensing devices 3822 (shown as "sensor 3822" in FIG. 38) are disposed onboard the vehicle 3800 and operably connected with the control unit 3802. The sensing device 3822 shown in FIG. 38 can output operational data that represents a state of one or more of the control system to the vehicle 3800 and/or the vehicle system. This operational data can be obtained by the sensing device 3822 measuring one or more characteristics of the control system.

In the embodiment shown in FIG. 38, the sensing device 3822 can output operational data that represents measurements of the brake system 3814. The sensing device 3822 can measure characteristics of the brake system 3814 such as air pressure in the brake system 3814, a rate of air flowing through conduits and/or reservoirs of the brake system 3814, a braking force of the brake system 3814, a temperature of the brake system 3814, a volume of air in the brake system 3814, or the like. The air pressure, rate of air flow, temperature, and/or air volume that is measured by the sensing device 3822 can be measured from the air in the conduits and/or reservoirs 3816 of the brake system 3814. The braking force of the brake system 3814 can represent the amount of breaking effort that the brake system 3814 is currently generating, has previously generated, and/or is capable of generating. Optionally, one or more other characteristics of the brake system 3814 or another control system may be measured by the sensing device 3822.

The operational data can be communicated to the control unit 3802. Using this operational data, the control unit 3802 can determine or monitor a state of the control system. For example, the control unit 3802 can calculate or estimate and operational capability of the control system. In one aspect, this operational capability that is determined by the control unit 3802 can represent a braking capability of the vehicle system. The braking capability can represent a braking effectiveness of the braking system 3814, such as how quickly and/or how long of the distance will be required to stop the vehicle 3800 and/or the vehicle system responsive to engaging the breaks of the brake system 3814. Optionally, the braking capability can represent an upper limit on amount of mass and/or weight that the brake system 3814 is able to slow or stop movement of within a designated distance. In another aspect, the braking capability can represent an upper limit on a moving speed of the vehicle 3800 and/or the vehicle system that the brake system 3814 is able to slow down or stop movement of within a designated distance.

The operational data can be used by the control unit 3802 to calculate or estimate the operational capability of the control system. With respect to the brake system 3814, the operational data can be used to calculate or estimate the braking effectiveness of the braking system 3814. The calculated or estimated braking effectiveness can be referred to as a braking effectiveness rating of the vehicle 3800 and/or the vehicle system. Changes in the operational data can result in changes in this rating. For example, increased air pressure in the brake system 3814 can result in the braking effectiveness rating increasing, while decreased air pressure can result in the braking effectiveness rating decreasing. Larger ratings indicate increased braking effectiveness, such as shorter stopping distances, faster allowable speeds, or the like. Smaller ratings indicate decreased braking effectiveness, such as longer stopping distances, slower allowable speeds, or the like.

As another example, increased airflow in the brake system 3814 can indicate that the air pressure in the conduits and/or reservoirs 3816 of the brake system 3814 are recharging or refilling with air. As a result, the braking effectiveness rating may decrease relative to reduced airflow in the brake system 3814 (which can indicate conduits that are full or nearly full with air). As another example, increased temperatures measured in the braking system 3814 can represent higher pressures in the brake system 3814 and, as a result, increased braking effectiveness rating, while reduce temperatures can represent reduced braking effectiveness ratings.

The control unit 3802 onboard the lead vehicle 3800 can monitor the operational data of multiple vehicles 3800 in the vehicle system or consist. The control unit 3802 can repeatedly receive operational data and/or updated operational data from the vehicles 3800 in the vehicle system so that the control unit 3802 can determine an operational capability of the vehicle system. With respect to brake systems 3814, the control unit 3802 onboard the lead vehicle 3800 can receive operational data from remote vehicles 3800 in the vehicle system to determine the braking effectiveness of the vehicle system. Depending on increases or decreases in this operational capability of the vehicle system, the control unit 3802 may vary how the vehicle system is controlled and how the remote vehicles are remotely controlled by the lead vehicle 3800. For example, if the operational data received by the control unit 3802 on the lead vehicle 3800 indicates a reduced braking effectiveness rating, the control unit 3802 of the lead vehicle 3800 may communicate with the remote vehicles 3800 to direct the remote vehicles 3800 to operate at slower speeds and/or to engage the brake systems 3814 of the remote vehicles 3800. On the other hand, if the operational data received by the control unit 3802 on the lead vehicle 3800 indicates an increased braking effectiveness rating, the control unit 3802 onboard the lead vehicle 3800 can communicate with the remote vehicles 3800 to direct these remote vehicles 3800 to operate at faster speeds and/or to disengage the brake systems 3814 of the remote vehicles 3800.

In some vehicle systems, the operational data that is received by a lead vehicle may be lost due to one or more faults or problems onboard the lead vehicle. For example, the control unit 3802 of the lead vehicle may reset or reboot for various reasons, such as computer error, operator error, or another cause. The re-setting or re-booting of the control unit 3802 can result in the operational data received by the control unit 3802 from other vehicles being lost. The control unit 3802 can store operational data received from remote vehicles in a memory 3818 onboard the lead vehicle 3800. The memory 3818 may be a tangible and non-transitory computer readable storage medium, such as solid-state, electromagnetic, and/or optical memories. The memory 3818 can be a volatile memory, nonvolatile memory, or a mixture thereof. The memory 3818 can be portable, such as a disk, card, memory stick, cartridge, and the like. Optionally, the memory 3018 may be included in the control unit 3002. For example, the memory 3818 may be an internal memory of the control unit 3802. Optionally, the memory 3018 may be external the control unit 3802.

An operational fault or failure of the control unit 3802 or another component of the lead vehicle 3800 can cause some or all of the operational data received from other vehicles 3800 to be lost. For example, re-setting or re-booting of the control unit 3802 can result in the most recently received operational data or other operational data to be erased from the memory 3818. The re-setting or re-booting of the control unit 3802 may occur when the vehicle 3800 is moving along a route, or when the vehicle 3800 is stationary. In one embodiment, the control unit 3802 implements one or more safety features responsive to losing the operational data that prevents continued movement or prevents starting movement of the vehicle 3800 and/or the vehicle system. For example, the control unit 3802 can prevent the vehicle system from moving unless and until the operational data received from the remote vehicles indicates a braking effectiveness rating that is exceeds a designated threshold (e.g., the start the calculus stopping distance is less than a designated distance, and upper speed limit allowed by the braking system 3814 exceeds a designated speed limit, or the like). If the vehicle system is moving, the control unit 3002 can automatically (e.g., without operator intervention) engage the brake system 3814, reduce throttle settings, or otherwise control the lead vehicle 3800 and/or one or more remote vehicles 3800 to slow or stop movement of the vehicle system. Another example of the safety feature may be the control unit 3802 detecting movement of the vehicle 3800 and/or the vehicle system in violation of a designated PTC restriction. For example, a PTC restriction may indicate that a vehicle system is not permitted to enter into one or more areas, exit one or more areas, travel faster than a designated speed limit, or the like. Responsive to detecting movement in violation of one or more of these restrictions, the control unit 3802 may automatically slow or stop movement of the vehicle system. Another PTC restriction can be the loss of operational data. For example, responsive to losing some or all operational data from the remote vehicles (e.g., before the control unit 3802 can calculate an operational capability from the data), a PTC restriction may require that the control unit 3802 stop or prevent movement of the vehicle system.

The control unit 3802 can implement one or more of these safety features responsive to a loss of the operational data received from the remote vehicles 3800. As a result, re-booting or re-setting of the control unit 3802 can result in stopping or preventing movement of the vehicle system unless and until new or updated operational data is obtained onboard the lead vehicle from the remote vehicles. In order to prevent the control unit 3802 from stopping or preventing movement of the vehicle system as a consequence of the loss of operational data, the control unit 3802 can distribute operational data received at the lead vehicle from one or more remote vehicles 3800 among one or more of the remote vehicles 3800. For example, during movement of the vehicle system, the transceiver unit 3804 of the lead vehicle 3800 can receive operational data from several remote vehicles 3800. The control unit 3802 can obtain this operational data from the transceiver unit 3804 to determine an operational capability the vehicle system, as described above. The control unit 3802 can store some or all this operational data in the memory 3818, and can communicate some or all of this operational data received from the remote vehicles 3802 back to one or more of the remote vehicles 3800.

The operational data can be communicated back to the same remote vehicles that provide the operational data, and/or the operational data can be communicated to different remote vehicles that previously provided the operational data. For example, if a first remote vehicle provides first operational data to a lead vehicle, the lead vehicle can then communicate this first operational data to a second remote vehicle, and/or back to the first remote vehicle. The remote vehicles can store the operational data obtained by the lead vehicle from the remote vehicles and communicated back to the remote vehicles in one or more memories 3818 onboard the remote vehicles 3800.

If a loss of some or all the operational data at the lead vehicle occurs, then the lead vehicle can notify the remote vehicles of this loss of operational data. For example, the control unit 3802 can direct the transceiver unit 3804 to communicate an error or loss data message to the remote vehicles to indicate that some or all the operational data is no longer onboard the lead vehicle 3800. Responsive to this loss of operational data at the lead vehicle, one or more of the remote vehicles can communicate copies of some or all of the operational data that was lost back to the lead vehicle.

Different remote vehicles can communicate the same or different parts of the operational data. For example, if the amount of lost operational data is significantly large, different remote vehicles can communicate different segments of the operational data back to lead vehicle. Optionally, two or more remote vehicles may communicate all of the lost operational data back to lead vehicle. In one aspect, two or more of the remote vehicles can communicate redundant sets of the operational data back to lead vehicle. Additionally or alternatively, the lead vehicle can communicate with the remote vehicles to notify the remote vehicles of what operational data was lost. Responsive to receiving this identification of the lost operational data, one or more of the remote vehicles may then communicate copies of the lost operational data identified by the lead vehicle back to the lead vehicle.

In one embodiment, the lead vehicle may repeatedly send the operational data back to the remote vehicles that sent the operational data to the lead vehicle over the course of a trip of the vehicle system. Responsive to a loss of some or all of the operational data onboard the lead vehicle, the communication system may want to ensure that recent operational data is communicated back from the remote vehicles to the lead vehicle, instead of older or out-of-date operational data. Recent operational data may include data that is communicated from the lead vehicle to the remote vehicles more recently in time than other operational data (e.g., the older or out-of-date operational data). For example, if a first set of the operational data was sent from the lead vehicle back to the remote vehicles ten minutes ago, a second set of the operational data was sent from the lead vehicle back to the remote vehicles five minutes ago, and a third set of the operational data was sent from the lead vehicle back to the remote vehicles thirty seconds ago, then the third set of the operational data may be the recent operational data with respect to the first and second sets of the operational data.

The control units and/or transceiver units onboard the remote vehicles may determine which of the operational data is the recent operational data and communicate the recent operational data (as opposed to older operational data) back to the lead vehicle responsive to a loss of the operational data. For example, data packets that include the operational data and that are communicated from the lead vehicle to the remote vehicles may include time stamps or other information that identifies when the operational data is obtained, communicated, or the like. Optionally, the control units and/or transceiver units onboard the remote vehicles may locally store the operational data received from the lead vehicle with time stamps or other information identifying when the operational data is received. The transceiver units and/or control units may examine this time information in order to identify or distinguish recent operational data from older operational data, and to send the recent operational data back to the lead vehicle.

In one aspect, the remote vehicles can distinguish between the recent and older operational data received from the lead vehicle based on the type of operational data that is received from the lead vehicle. Different types of operational data may be received from the lead vehicle at the remote vehicles at different times. Based on the type of operational data and when the different operational data is received from the lead vehicle, the remote vehicles can identify the recent operational data and send that operational data back to the lead vehicle. For example, if a first set of brake pressure data was received at the remote vehicles from the lead vehicle ten minutes ago, a first set of brake air flow data was received at the remote vehicles from the lead vehicle two minutes ago, a second set of the brake pressure data was received at the remote vehicle from the lead vehicle one minute ago, and a second set of the brake air flow data was received at the remote vehicles from the lead vehicle ten seconds ago, then the control units and/or transceiver units of the remote vehicles can identify the second set of the brake pressure data as being the recent operational data with respect to brake pressure data, even though air flow data was received more recently than second set of the brake pressure data.

Responsive to receiving at least some of the operational data that was lost by the lead vehicle from one or more of the remote vehicles, the control unit 3802 of the lead vehicle can determine the operational capability of the vehicle system using the copy of the lost operational data received from the remote vehicles. For example, responsive to the control unit 3802 re-booting or re-setting, thereby resulting in a loss of operational data, one or more of the remote vehicles may communicate copies of the operational data that previously was sent to the lead vehicle and lost by the lead vehicle back to lead vehicle. The lead vehicle may then determine the operational capability of the vehicle system using the copy of the lost operational data to determine the operational capabilities of vehicle system. This can allow the vehicle system to continue operating without stopping movement or waiting for new operational data to be obtained. Without the remote vehicles communicating replacement copies of the lost operational data to the lead vehicle, the lead vehicle may need to wait for new measurements be made by the sensing devices 3822 of the remote vehicles and for new operational data to be communicated back to lead vehicle. Sending copies of the lost operational data from the remote vehicles to the lead vehicle can save time in that can be faster to send the operational data back to lead vehicle from the remote vehicles then to measure new operational data that is communicated to the lead vehicle.

The operational data can be communicated from the lead vehicle to the remote vehicles and/or from the remote vehicles the lead vehicle via the conductive communication pathway 3808. For example, the operational data can be communicated in network data packets or as network data over a MU cable of the vehicle system. Alternatively, some or all the operational data may be wirelessly communicated between the vehicles in the vehicle system.

In one embodiment, operational data is first obtained by sensing devices 3822 onboard the remote vehicles with the remote vehicles communicating this operational data only to the lead vehicle. The lead vehicle can then communicate the operational data back to one or more of the remote vehicles, as described above. Alternatively, the operational data is first obtained by the sensing devices 3822 of the remote vehicles, and is then communicated both to the lead vehicle and to one or more other remote vehicles. For example, instead of just communicating the operational data from the remote vehicles to the lead vehicle, the remote vehicles may share the operational data among the remote vehicles. This sharing of the operational data among the remote vehicles can be useful in situations where one or more of the remote vehicles is unable to communicate copies of lost operational data to the lead vehicle.

Figure 39:
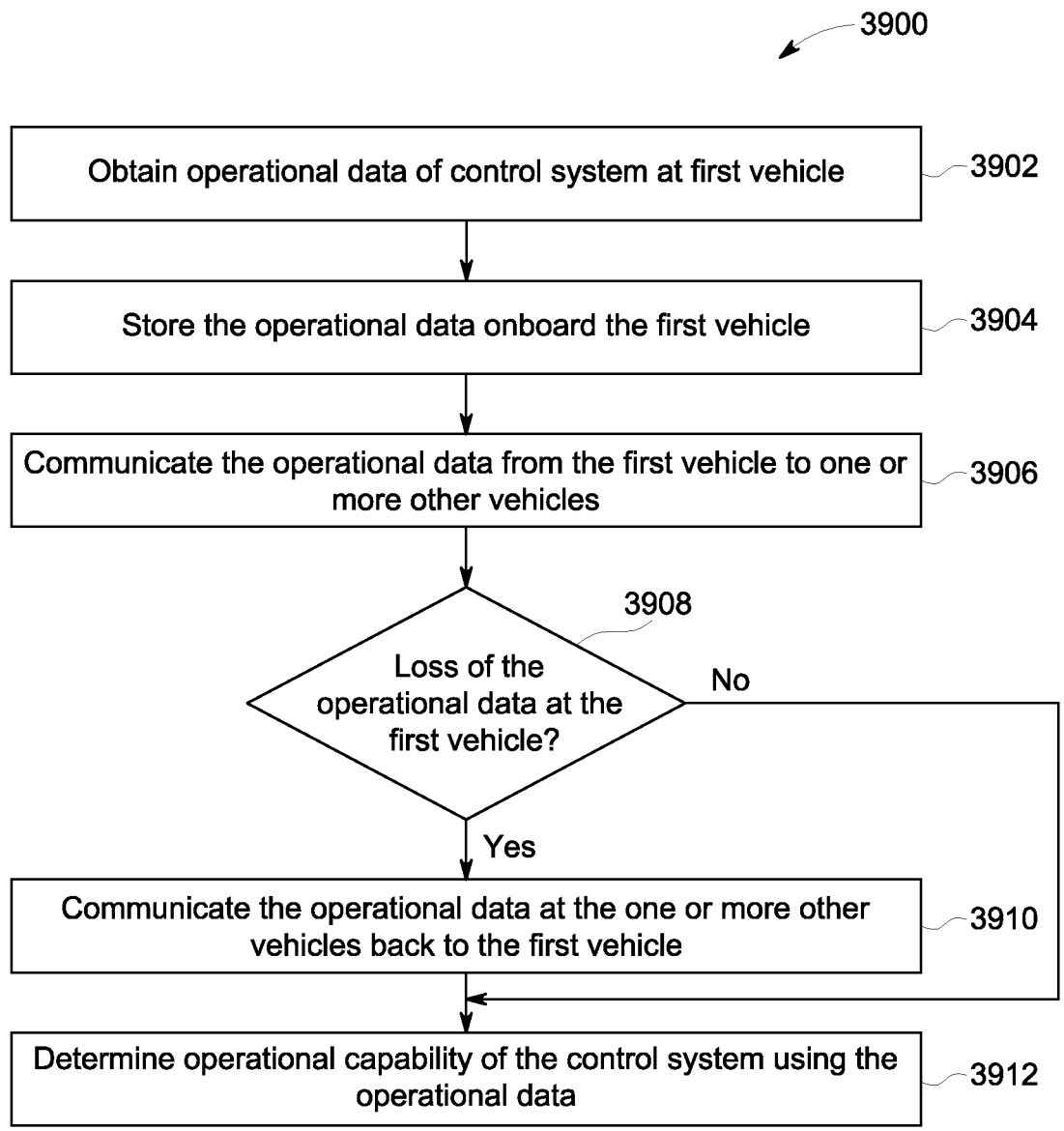
FIG. 39 is a flowchart of one embodiment of a method for communicating data.

FIG. 39 is a flowchart of one embodiment of a method 3900 for communicating data. The method 3900 may be practiced by one or more embodiments of the command systems described herein. The method 3900 allows for a lead vehicle in the vehicle system to obtain operational data from remote vehicles in the vehicle system, and to then communicate some or all this operational data back to the remote vehicles. In the event of a loss of some or all of this operational data at the lead vehicle, one or more of the remote vehicles may then supplant the lost operational data onboard the lead vehicle with some or all the operational data received onboard the remote vehicles from the lead vehicle.

At 3902, operational data of a control system is obtained at a first vehicle. For example, one or more measurements of the control system, such as a brake system, may be obtained onboard remote vehicles in a vehicle consist and then communicated to the lead vehicle of the vehicle consist. The operational data may be communicated as network data packets over an MU cable, may be communicated wirelessly, or may be communicated over one or more other wired connections. In one aspect, command messages may be communicated from the lead vehicle to the remote vehicles, where the command messages direct changes in throttle settings, brake settings, speeds, or the like, for the lead vehicle to remotely control the remote vehicles. The command messages may be communicated wirelessly, while the operational data is communicated over one or more wired connections (e.g., an MU cable). Alternatively, the command messages may be communicated wirelessly, the operational data may be communicated from the remote vehicles to the lead vehicles wirelessly, and the copies of the operational data can be communicated from the lead to the remote vehicles and/or from the remote vehicles to the lead vehicle over the wired connection (e.g., the MU cable). Alternatively, the command messages may be communicated wirelessly, the operational data may be communicated from the remote vehicles to the lead vehicles wirelessly, the copies of the operational data can be communicated from the lead to the remote vehicles wirelessly, and the copies of the lost operational data can be communicated from the remote vehicles to the lead vehicle over the wired connection (e.g., the MU cable).

At 3904, at least some of the operational data is stored onboard the first vehicle. For example, the operational data received from the remote vehicles may be stored onboard one or more memories of the lead vehicle. At 3906, some or all this operational data is communicated from the first vehicle to one or more other vehicles in the vehicle system. For example, after receiving the operational data from the remote vehicles, the lead vehicle may then send some or all of this operational data to one or more of the remote vehicles for keeping in the event of a loss of the operational data at the lead vehicle. The operational data that is sent from the lead vehicle to the remote vehicles may be referred to as repeated operational data, and may be communicated to the same or different remote vehicles that originally provided the operational data to the lead vehicle.

At 3908, a determination is made as to whether or not some or all the operational data is lost at the first vehicle. For example, as described above, a re-set or re-boot of the control unit of the lead vehicle can result in some or all operational data received from the remote vehicles being lost or otherwise erased from the memory. In the event of such a loss of the operational data, the control unit may be unable to determine operational capability of the vehicle system and, as a result, one or more safety features that stop or significantly restrict movement of the vehicle system may be automatically implemented. In order to prevent or reduce the duration of such safety features being implemented, the control unit of the lead vehicle may obtain replacement operational data from the remote vehicles. For example, if a loss of some or all the operational data occurs, then flow the method 3900 may proceed to 3910, so that the lead vehicle can obtain copies of replacement operational data from the remote vehicles. If, on the other hand, there is no loss of some or all the operational data at the first vehicle, then flow the method 3900 can proceed to 3912.

At 3910, copies of some or all of the operational data that is lost at the first vehicle is communicated back to the first vehicle from one or more of the second vehicles. For example, the operational data previously reported from the remote vehicles to lead vehicle, and then communicated from the lead vehicle back to the remote vehicles, may be resent from one or more of the remote vehicles back to the lead vehicle. This operational data can be referred to as copied operational data or replacement operational data. At 3912, an operational capability of the control system is determined using the operational data received at the first vehicle from the one or more other vehicles. For example, responsive to losing operational data received from a remote vehicle, the lead vehicle may receive copies of the same operational data that was lost from the same remote vehicle or from another remote vehicle in the vehicle system. The lead vehicle may then use this copy of the previously obtained operational data to determine the operational capability of control system, such as a braking effectiveness of a brake system of the vehicle and/or the vehicle system.

Figure 40:
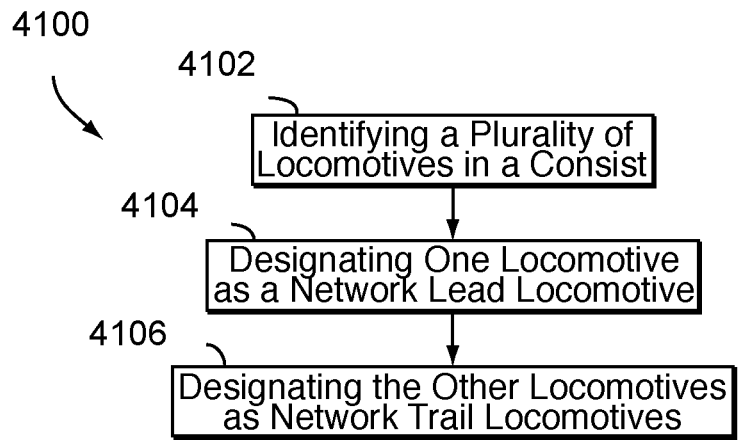
FIG. 40 is a flowchart illustrating an exemplary method for establishing a network across a plurality of locomotives in a consist, according to an embodiment of the present invention.

Embodiments of the present invention relate to a system and method for determining the network lead vehicle among a plurality of vehicles in a consist. In an embodiment, the vehicles may be locomotives, although the system and method may also be used in connection with other rail vehicles and non-rail vehicles. FIG. 40 illustrates an exemplary method 4100 for establishing a network across a plurality of locomotives in a consist, according to one embodiment of the present invention.

In embodiments, a network lead locomotive is designated to configure all the services for a respective data network of the locomotives in the consist, and may be responsible for signal/traffic coordination for various devices on board each locomotive. In an embodiment, when a locomotive is by itself such that there are no other locomotives in communication with it in a train or other rail vehicle consist, the locomotive is designated as the network lead locomotive. As the network lead locomotive, the locomotive establishes a set of services and operations it is capable of performing and manages this "network" of a single locomotive. The set of services established and managed by the locomotive may include conventional available devices, for example, 220 MHz radio gear and components for communication purposes and GPS systems and components, as well as horns, lights and other indicators and systems utilized during operation of the consist.

In another embodiment, the consist may include more than one locomotive that is capable of functioning as the network lead locomotive. As shown in FIG. 40, the method first includes the step 4102 of identifying a plurality of locomotives in the consist. In such an instance, the locomotives may be mechanically coupled and in communication with one another, such as being linked through a multiple unit cable. If there is more than one "lead" locomotive, however, such as if a single network lead locomotive has not been designated, then a network conflict may arise which could cause network traffic and packets to be missed because of a trail locomotive attempting to find a lead or a lead trying to find a trail.

Accordingly, in consists containing more than one locomotive that is capable as functioning as a network lead locomotive, it becomes necessary to then determine which of the locomotives in the consist will be designated, and serve as, the network lead locomotive of the data network for the consist, at step 4104. In an embodiment, the network lead locomotive may be determined by one or more locomotive parameters or characteristics. In one embodiment, the parameter may be one or more positions of one or more of the locomotives in the consist. For example, the first locomotive in the consist may be designated the network lead locomotive of the data network based on its position at the head of the consist. After designating a network lead locomotive, the remaining locomotives or vehicles in the consist are designated network trail locomotives or vehicles, at step 4106. In an embodiment, the steps of designating the network lead and trail locomotives may be carried out automatically subsequent to the locomotives being linked to establish the data network. In an embodiment, designating a locomotive as a network lead locomotive includes configuring the locomotive for operations as the network lead locomotive and communicating status information indicative of its designation as network lead to the other locomotives in the consist, and configuring the other locomotives in the consist as network trail locomotives.

In another embodiment, the lead network locomotive may be designated based on a temporal sequence of addition to the consist. In particular, if a data network already exists and has a designated network lead locomotive, other locomotives that are subsequently added to the consist may automatically be designated as trail locomotives.

In yet another embodiment, the network lead locomotive may be designated based upon movement of the locomotives in the consist, such as a GPS or otherwise determined direction of movement of the consist. In particular, in an embodiment a locomotive may be designated as the network lead locomotive based on the locomotive being a leading locomotive of the consist in a designated direction of travel of the consist.

In other embodiments, the network lead locomotive may be designated after the consist begins moving based upon an algorithm. In this embodiment, GPS information (e.g., direction and speed), wheel speed information, locomotive engineer handle direction information and/or switch settings for lead/trail or headlight configuration may be utilized by the locomotives to determine and then designate lead and trail locomotives in the consist. In an embodiment, a wheel speed sensor may be utilized to detect and relay wheel speed to at least one available device, such as a controller, on board at least one of the locomotives. The sensor may also be configured to sense a direction of the locomotive. With respect to engineer handle direction, i.e., handle position, in an embodiment, if the handle is in the forward position and the locomotive is travelling above a threshold speed, then the position of the locomotives from a GPS unit can determine the front, middle and rear of the consist. Given this information, an algorithm can then determine and designate a lead and trail locomotives.

In another embodiment, the locomotives within the consist, once linked to establish a data network, may communicate setup data to one another. One locomotive in the consist may then be designated as the network lead locomotive in the data network and other locomotives designated as network trail locomotives based on the setup data. Communication of the setup data may be carried out automatically subsequent to the locomotives being linked. In the event that another locomotive is subsequently added to the consist, setup data may be communicated between the added locomotive and a first locomotive in the consist (which may have been previously designated as network lead). Based upon the setup data, the added locomotive may be designated as an additional network trail locomotive. Alternatively, the added locomotive may be designated as the network lead locomotive in conjunction with designating the first locomotive as a now network trail locomotive of the data network.

Once the locomotives have been linked to establish a data network, and lead and trail locomotives of the data network have been designated, network data may be communicated between the locomotives based at least in part on the one locomotive designated as the network lead locomotive and one or more other locomotives designated as network trail locomotives, as discussed hereinafter. As alluded to above, designating a single locomotive to serve as the network lead locomotive is important from a controls perspective. In an embodiment, the designated network lead locomotive may configure services available to entities in the data network and coordinate data traffic in the data network. In particular, the network lead locomotive may store, create and update the master routing tables relating to services of the respective locomotives in the consist and is also capable of transitioning services from one locomotive to another, such as from the network lead locomotive to one of the trail locomotives. In addition, the network trail locomotives may request overall network information from the network lead locomotive.

Moreover, by knowing the network lead locomotive, network services can be managed across the consist and traffic may be sent to lead or trail vehicles in the consist. For example, in an embodiment, a device on the network lead locomotive may want to utilize a radio on a trail locomotive because the radio on the lead locomotive is broken or otherwise non-functional. By recognizing that the radio of the lead locomotive is non-functional, and that a trail locomotive has a functioning radio, the network lead locomotive can route radio traffic to the functioning radio on board the trail locomotive to maintain desired functionality. In addition, the lead locomotive may update the master routing tables such that all radio traffic is routed to the functioning radio, as opposed to the currently non-functioning radio on board the lead locomotive.

In an embodiment, the consist data network is established and the network lead locomotive is automatically designated through the communication of the locomotives, as discussed above. In particular, upon being placed in communication with one another, such as through a MU cable bus, dedicated network cables, through wireless communications, etc., the locomotives determine, according to a predetermined set of commands and in view of one or more locomotive parameters, as discussed above, which locomotive will be designated the network lead locomotive and which will then be designated trail locomotives.

Figure 41:
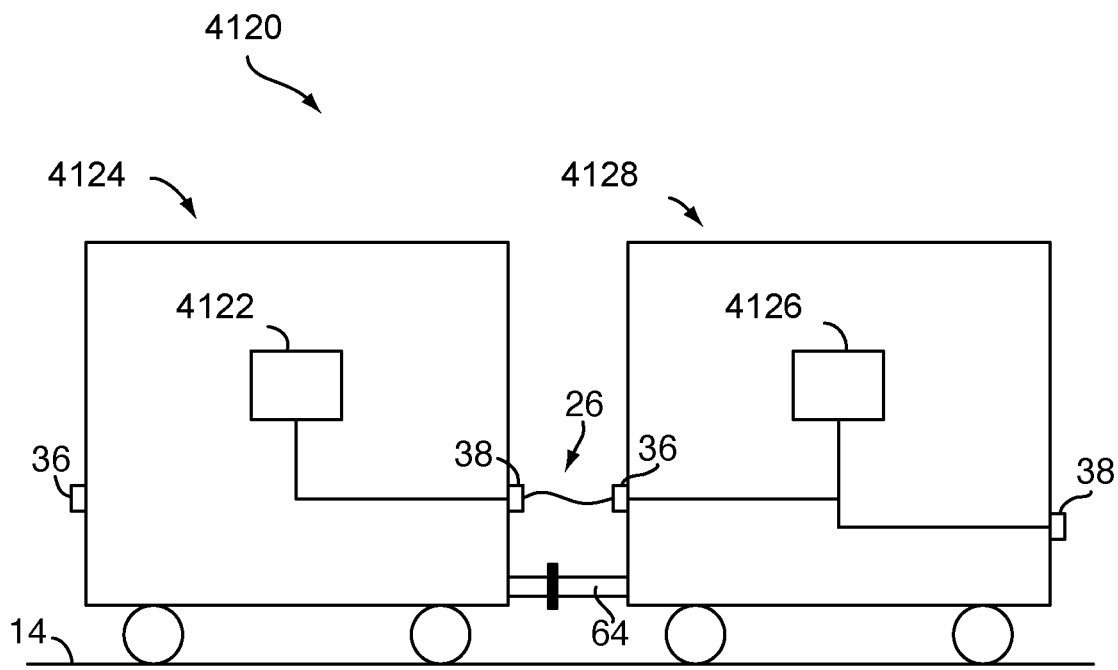
FIG. 41 is a schematic diagram of a system for establishing a network across a plurality of locomotives in a consist, according to an embodiment of the present invention.

FIG. 41 is a schematic diagram of a system 4120 for establishing a network across a plurality of locomotives in a consist, according to an embodiment of the present invention. As shown therein, the system includes an electronic component such as a first controller unit 4122 positioned in a first locomotive 4124 in the consist, and a second electronic component such as a second controller 4126 unit positioned in a second locomotive 4128 in the consist and in communication with the first controller unit 4122 in the first locomotive 4124. The first locomotive 4124 is adjacent to and mechanically coupled with the second locomotive 4128 though a coupler 4464, as discussed above. The first controller 4122 and second controller 4126 are configured to designate the network lead locomotive and network trail locomotive(s) according to at least one parameter of the locomotives in the consist, as discussed above.

In connection with this, the first controller 4122 is configured to designate one of the locomotives in the data network of the consist as a network lead locomotive of the data network and to designate all other locomotives in the consist as network trail locomotives of the data network. Moreover, the first controller unit is further configured to control communications of network data between the lead locomotive and trail locomotives based at least in part on the network lead locomotive and network trail locomotive designations. In connection with designating network lead and trail locomotives based on at least one parameter of the locomotives, the at least one parameter may be one or more of a position of a first locomotive relative to one or more other locomotives in the consist, a sequence of locomotives added to the consist, or an identification of which locomotive in the consist is a leading locomotive of the consist in a designated direction of travel.

In another embodiment, the first controller unit 4122 is configured to automatically control communication setup data between the first locomotive 4124 and one or more second locomotives 4128 subsequent to establishment of the data network in the consist. In addition, the first controller unit 4122 may designate the network lead locomotive and trail locomotive(s) based at least in part on the setup data. In an embodiment, information of the parameter (e.g., sequence of the locomotives added to the consist, or the like) may be included in the setup data.

Once network lead and trail locomotives are designated (regardless of the exact manner in which such designations are effected) the first controller 4122 is adapted to configure services available to entities in the data network and to coordinate data traffic in the data network.

Figure 42:
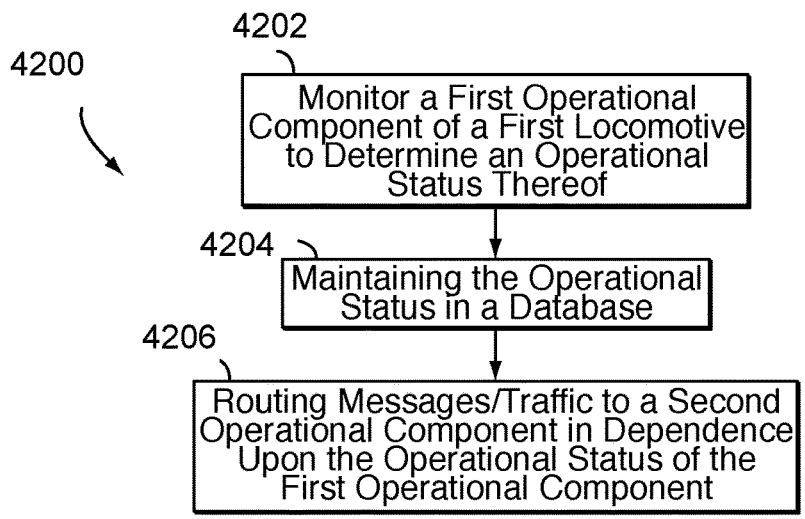
FIG. 42 is a flowchart illustrating an exemplary method for managing network services among a plurality of networked locomotives in a consist, according to an embodiment of the present invention.
Figure 43:
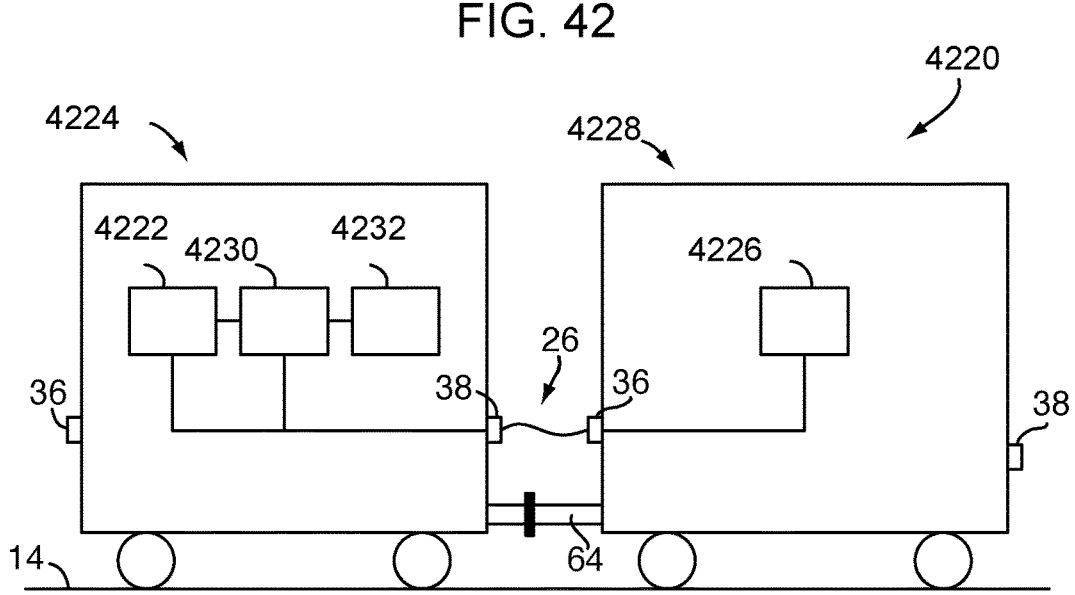
FIG. 43 is a schematic diagram of a system for managing network services among locomotives in a consist, according to an embodiment of the present invention.

As shown in FIGS. 42 and 43, embodiments of the present invention also relate to a system and method for managing network services and devices among a plurality of vehicles or locomotives in a consist. FIG. 42 illustrates an exemplary method 4200 for managing network services among a plurality of networked locomotives in a consist, according to an embodiment of the present invention.

As discussed above, a locomotive consist includes a plurality of locomotives that are mechanically coupled or linked together to travel along a route and which are in communication with one another such that they function together as a single unit on a network. As further discussed above, the locomotives may be in communication with one another wirelessly, through dedicated network cables, through an MU cable bus interconnecting adjacent locomotives in the consist, etc. In this manner, the on-board available devices of the locomotives may be linked together as a computer data network such that the devices of the vehicles can communicate with one another. (As noted elsewhere herein, device refers to an electronic equipment, and service refers to a function performable by the electronic equipment. "Available" service or device refers to a service or device that is operably connected for potentially using network data communicated in the data network, not necessarily that the service or device is currently operational for doing so.)

In an embodiment, a vehicle consist includes a plurality of locomotives (or other vehicles), each having one or more available devices configured for deployment thereon. The plurality of locomotives includes a lead locomotive (or other lead vehicle), as discussed above, and at least one trail locomotive (or other trail vehicle). Upon joining the locomotives (or other vehicles) together in the consist, in an embodiment, a database of services and devices available across all of the networked locomotives (or other vehicles) in the consist is constructed, to avoid conflicts in routing data in the network. In an embodiment, the database is a part of at least one available device (e.g., a monitoring device and/or signal transmitting device) of the lead locomotive (or other lead vehicle) and is accessible by at least one of the trail locomotives (or other trail vehicles). The database may also be referred to as a master service list or routing list. Additional devices or services may be registered/listed in the database as they are joined to the network, including the services and devices/available devices of the lead locomotive.

In an embodiment, the operability of available devices/devices and services may be automatically determined based on port scan and/or network traffic to/from that component/device, at step 4202. In particular, one of the available devices on the lead locomotive (or other lead vehicle), such as a monitoring device (e.g., controller) and associated database, may orchestrate a periodic scan of available devices (and new devices) to maintain the master service and routing list, at step 4204. Scanning may include determining available services. Remote router transceiver units, for example, may be utilized to coordinate available services with the monitoring device. In this respect, trail locomotives (or other trail vehicles) do not need to know anything about the broad consist network, IP addresses of other locomotives (or other vehicles) in the consist, etc., but instead simply maintain a list of available services and/or devices thereon which can be communicated to the lead locomotive (or other lead vehicle of the consist) for compilation in the master device/service list.

Once the routing list/master service list is constructed, various threads of software, known as agents, can provide the information contained in the list to the devices across the consist, assist the devices in the routing of messages, and/or provide complete failover control of message routing to trail locomotives (or other trail vehicles), as discussed hereinafter. As noted above, the lead locomotive (or another designated vehicle) in the consist gathers and maintains the list of available services/devices and is capable of delegating services to trail locomotives (or other delegate vehicles) in the consist.

In an embodiment, the consist also includes a failover mechanism. In particular, an available device on the lead locomotive (or other designated vehicle of the consist), such as the monitoring device (e.g., controller), may also determine, in addition to the services and devices available across all of the locomotives (or other vehicles of the consist), which devices can or cannot be failed over to working devices. In an embodiment, a list of the devices that can/cannot be failed over can be constructed and maintained by the lead locomotive (or other designated vehicle of the consist) by any of device type, IP address range, or configuration file setup.

In operation, if a particular device is designated as a device that can be failed over, then message traffic may be routed according to a routing algorithm (executed by the monitoring device and/or signal transmitting device) to a substantially equivalent device on another locomotive (or other vehicle) for processing, such as at step 4206. In an embodiment, the routing algorithm may use a method, such as SNMP, to periodically scan to determine if a device is still operational. If it is, then data/messages/traffic will continue to be delivered to the device and the device will be listed with the master service list that it is operational as a candidate that can receive messages/data/traffic from another locomotive (or other vehicle). As will be readily appreciated, such an "operational" status also means that the device is also available to receive another device's failover messages. For example, if a 220 MHz radio fails on the lead locomotive, the traffic may be automatically routed to a 220 MHz radio on a trailing locomotive to maintain functionality for the consist as a whole.

In connection with the system described above, at any point in time, a device on a vehicle of the consist can request data/messages/traffic to be routed to an off-board vehicle (i.e., to another vehicle in the consist). The system (e.g., monitoring device and/or signal transmitting unit) can coordinate that traffic so that it is routed between the vehicles, delivered, and then any response routed back again.

With certain systems, such as Ethernet over MU systems, any traffic that comes into the Ethernet port of the consist is sent to all the other Ethernet over MU devices, whether desired or not. In contrast to this, the present invention only routes traffic that is destined for another locomotive (or other vehicle), instead of all traffic.

FIG. 43 is a schematic diagram of a system 4220 for managing network services among locomotives in a consist. The consist includes a first available device 4222 positioned in a first locomotive 4224 in the consist, and a second available device 4226 positioned in a second locomotive 4228 in the consist. The first and second available devices 4222, 4226 are substantially equivalent in function. The system comprises a monitoring device 4230 configured for deployment on one of the locomotives in the consist and to communicate with the first and second available devices 4222, 4226. The monitoring device is further configured to determine respective operational statuses of the first and second available devices 4222, 4226. The system further comprises a signal transmitting device 4232 configured to communicate with the first and second available devices 4222, 4226 and configured to route data traffic to one of the first available device 4222 or the second available device 4226 when the monitoring unit 4230 determines that the other of the first available device or the second available device is in a failure state. As discussed above, in an embodiment, the monitoring unit and the signal transmitting device may be a controller or a computer.

Figure 44:
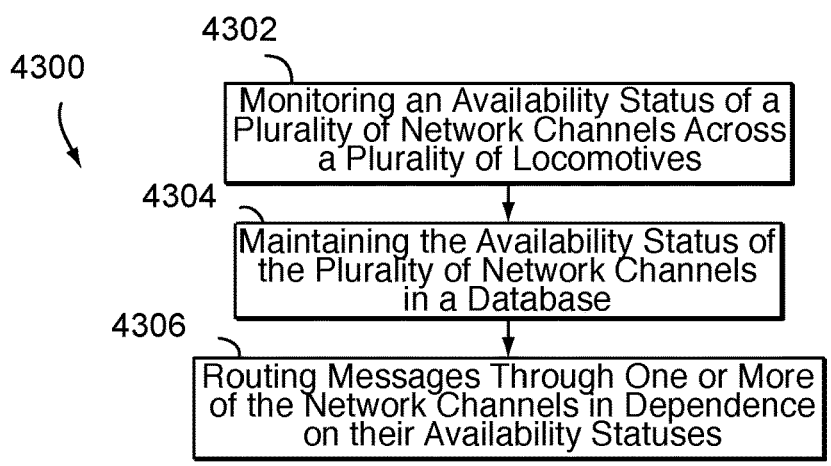
FIG. 44 is a flowchart illustrating an exemplary method for managing a high-availability network for a locomotive consist, according to an embodiment of the present invention.
Figure 45:
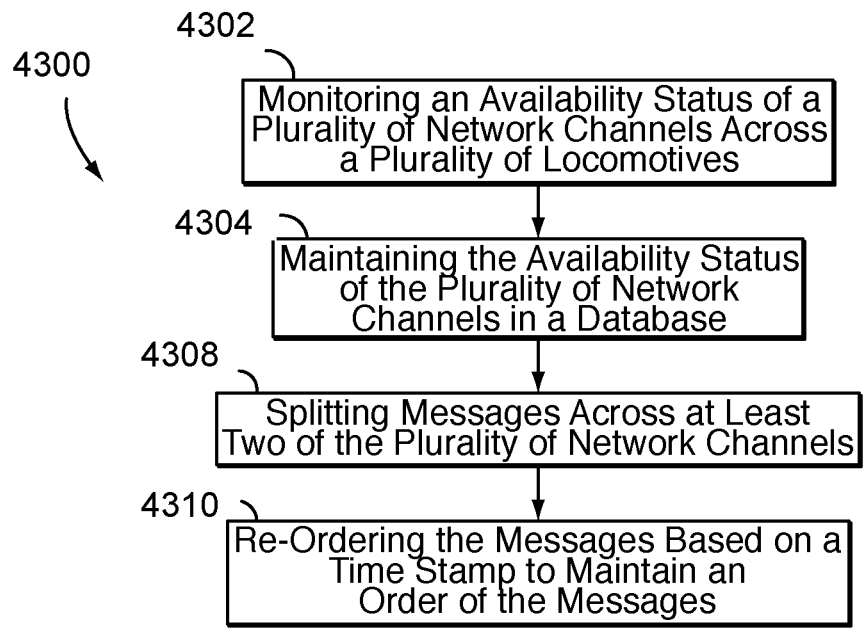
FIG. 45 is a flowchart illustrating an exemplary method for managing a high-availability network for a locomotive consist, according to another embodiment of the present invention.

Yet other embodiments of the present invention relate to a high-availability data network for a vehicle consist, and a method for creating and maintaining the same. FIGS. 44 and 45 illustrate exemplary methods for managing a high-availability network for a locomotive consist or other vehicle consist. In an embodiment, multiple networks are first created by any one or more of separate physical pathways (e.g., separate trainline wires or other separate cables/conductors), different network keys that allows traffic separation but network coordination between transmissions, and/or utilization of different encryption technologies so the networks are separate but such that there is no coordination of traffic between devices. In an embodiment, once the hardware (e.g., Ethernet bridges such as Ethernet over MU router transceiver units) for the network is established, then it is configured to use the different network keys or different encryption technologies to create the high-availability network. In another embodiment, the high-availability network may be constructed by running separate Ethernet bridge (e.g., Ethernet over MU) lines adjacent one another.

In connection with the above, in an embodiment, the present invention relates to a method for determining which types of networks are available such that traffic can be routed to the correct locomotives or other vehicles in the consist. Similar to the embodiment described above, at least one electronic component monitors an operational status of the network channels of each locomotive (or other vehicle) in the consist, such as at step 4302. The lead locomotive (or another designated vehicle) maintains a database/routing list of what networks/channels are available and operational across each locomotive (or other vehicle) in the consist and which are non-operational, such as at step 4304, so that traffic can be routed across the consist, at step 4306, to desired locomotives or other vehicles accordingly, as discussed hereinafter.

First, if a locomotive or other vehicle is present that has only one available network or network channel, i.e., the network channel is not redundant, then communications/traffic that are sent and received by the devices on such vehicle occurs on this network or network channel. Accordingly, because the routing list knows that the device on this locomotive or other vehicle only has a single available network or network channel, this network or channel is automatically selected for any traffic to that particular vehicle/device.

In an embodiment, for locomotives or other vehicles that have more than one available channel/network, the traffic to devices on such locomotives, or across such locomotives, may be split across both paths, at step 4308, and re-ordered at step 4310 based on time stamp so that no out of order messaging occurs.

In another embodiment, the system may be configured such that messages/traffic are always sent across a primary network or network channel(s), with status check messages between network communication devices (e.g., router transceiver units) to check the integrity of a secondary network or network channel(s) so that messages/traffic may be switched over to the secondary network or network channel(s) with a high degree of confidence that it is actually available.

In an embodiment, management of the high-availability network involves keeping track of the communications networks/network channel(s) that are available across each locomotive (or other vehicle) in the consist, from both a configuration and operation standpoint. If a locomotive (or other vehicle) does not have a high-availability option, i.e., only a single network/network channel is operational, then traffic will always be routed down that particular channel, as discussed above. In contrast, if a locomotive or other vehicle does have another network/network channel, an available device will periodically check for the operability of the alternate network or channel, as well as notify the lead locomotive (or other designated vehicle of the consist, e.g., network lead vehicle) of the success or failure (operability or non-operability) of that channel. Traffic that may appear back at the source over the other channel(s) accidentally may also be filtered out of the overall traffic that is supposed to be received, by analyzing the packets' routing information.

Figure 46:
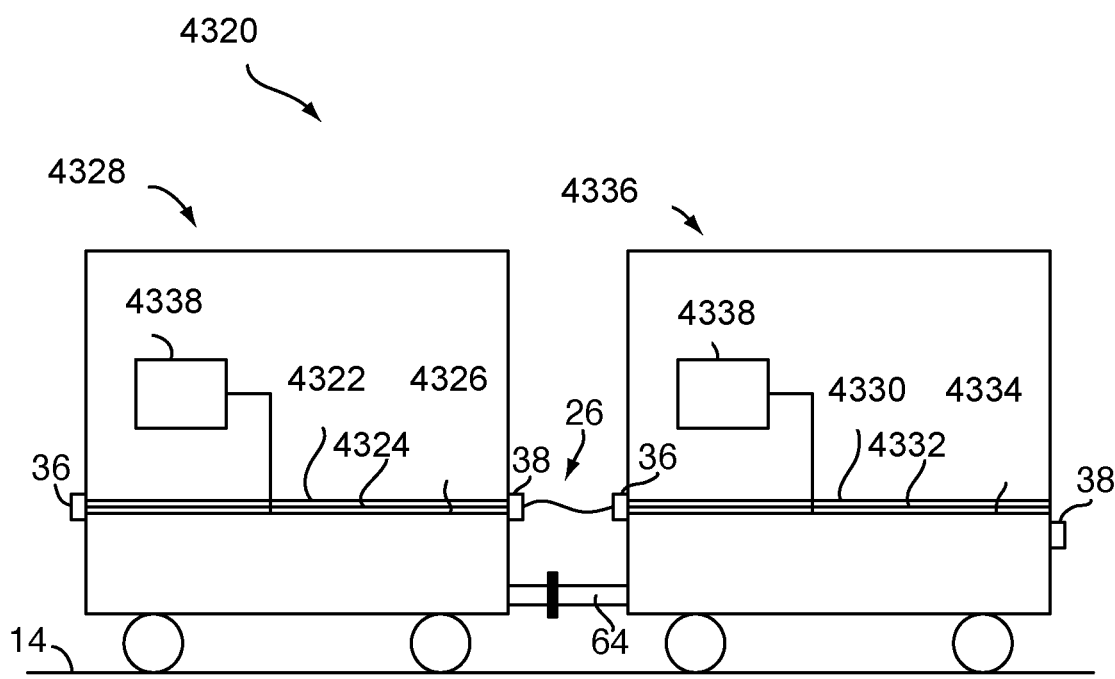
FIG. 46 is a schematic diagram of a system for managing a high-availability network for a locomotive consist, according to an embodiment of the present invention.

FIG. 46 is a schematic diagram of a system 4320 for managing network services among locomotives in a consist. As shown therein, the system 4320 includes a first plurality of communication channels (or networks), e.g., channels 4322, 4324, 4326, associated with a first locomotive 4328, a second plurality of communication channels (or networks), e.g., channels 4330, 4332, 4334 associated with a second locomotive 4336, and a router or routing unit 4338 configured to communicate over the first and second pluralities of communication channels (4322, 4324, 4326 and 4330, 4332, 4334). The routing unit 4338 is configured for routing a data message through at least one of the first plurality of communication channels 4322, 4324, 4326 of the first locomotive 4328 or at least one of the second plurality of channels 4330, 4332, 4334 of the second locomotive 4336 in dependence upon respective operational statuses of the first and second pluralities of communication channels (4322, 4324, 4326 and 4330, 4332, 4334).

Figure 47:
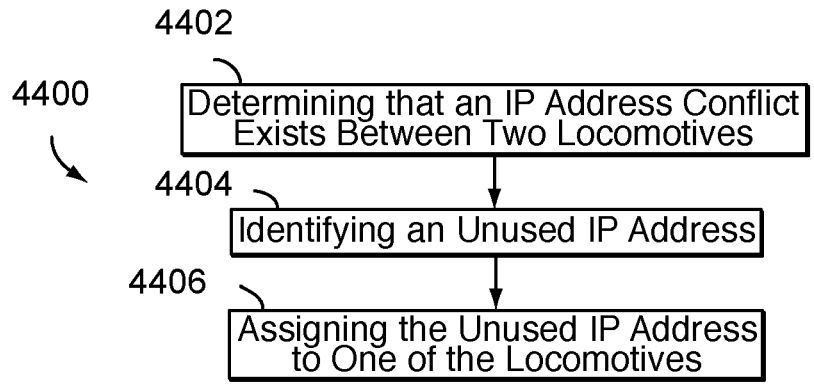
FIG. 47 is a flowchart illustrating an exemplary method for resolving a conflict between IP addresses of locomotives in a consist, in accordance with an embodiment of the present invention.
Figure 48:
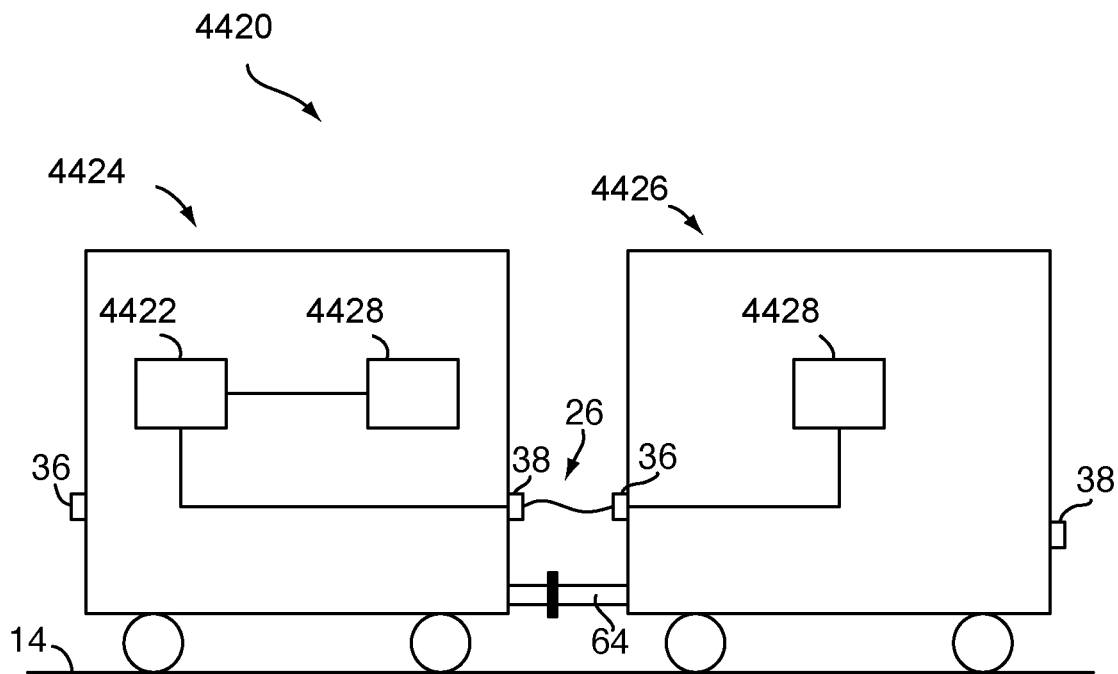
FIG. 48 is a schematic diagram of a system for resolving a conflict between IP addresses of locomotives in a consist, in accordance with an embodiment of the present invention.

As shown in FIGS. 47 and 48, other embodiments of the present invention to relate to a method and system for handling IP addressing (or other network addressing) between multiple train networks or multiple locomotives (or other vehicles) in a consist having the same IP address or other network address. As will be readily appreciated, when a locomotive is connected to another locomotive, it is possible that the locomotives will have the same IP address (static or dynamic). In order to have locomotives with the same IP address co-exist on the same network, in embodiments, an IP address configuration method is utilized to resolve the conflict.

In an embodiment, a method for configuring IP addresses for locomotives in a consist includes utilizing fixed but configurable IP addresses so that the locomotives can all be on the same subnet (e.g., WAN-type subnet). As will be readily appreciated, this will allow for communications between locomotives as long as they are routed to the same subnet. In the method, for the last octet of the IP address, a locomotive will use a MAC address entry (e.g., fixed) to translate and determine the last octet. For example, a MAC address of xx-xx-xx-xx-10 would correspond to using an IP address of xxx.xxx.xxx.16. In another embodiment, the locomotive train ID may be utilized, however, conflicts may still manifest. Accordingly, in order to resolve duplicates in train ID items, a customer number may be used.

In any event, it is possible that IP address conflicts between locomotives in a consist may still be encountered. Accordingly, the present invention also relates to a method for resolving a conflict between IP addresses of locomotives. FIG. 47 illustrates an exemplary method 4400 for resolving a conflict between IP addresses of locomotives in a consist. The method includes the steps of determining that a first locomotive in the consist has an IP address that is the same as the IP address of a second locomotive in the consist (step 4402), identifying an unused IP address (step 4404), and assigning the unused IP address to either the first locomotive or the second locomotive (step 4406). An unused IP address may be identified by listening for an unused IP address on the channel.

In another embodiment, the conflict may be resolved by using a different MAC address entry for the IP address determination in event of a conflict for the conflicting locomotives. In another embodiment, the IP address conflict may be resolved by using signal level or any other dynamic but specific factor in determining a difference between the Ethernet over MU units so it can be decided which locomotive should move to another IP address.

FIG. 48 is a schematic diagram of a system 4420 for resolving a conflict between IP addresses of locomotives in a consist. As shown therein, the system includes a conflict determination module 4422 configured for deployment on and/or in communication with a first locomotive 4424 having a first IP address and a second locomotive 4426 having a second IP address, and configured to determine that the first IP address is the same as the second IP address and a controller 4428 configured for deployment on at least one of the first locomotive 4404 and the second locomotive 4426 and further configured for identifying an unused IP address. The controller 4428 or other available device is capable of assigning the unused IP address to one of the first locomotive 4424 and the second locomotive 4406. In an embodiment, the controller 4428 may function as the conflict determination module 4422.

In one embodiment, a method (e.g., for communicating data) includes obtaining operational data associated with one or more control systems of a vehicle consist formed by at least a first vehicle and one or more second vehicles traveling together along a route. The operational data can be obtained at the first vehicle of the vehicle consist, and can be configured to be used to determine an operational capability of the vehicle consist. The method also can include communicating the operational data from the first vehicle to at least one of the one or more second vehicles in the vehicle consist and, responsive to a loss of the operational data at the first vehicle, communicating at least the operational data that was lost at the first vehicle from at least one of the one or more second vehicles to the first vehicle. The method also can include determining, onboard the first vehicle, the operational capability of the vehicle consist to perform a movement event using the at least the operational data that was lost at the first vehicle and communicated from the at least one of the one or more second vehicles to the first vehicle.

In one aspect, the one or more control systems can include a brake system of the vehicle consist, and obtaining the operational data can include measuring one or more characteristics of the brake system and determining the operational capability includes calculating a braking effectiveness rating of the vehicle consist.

In one aspect, measuring the one or more characteristics of the brake system can include measuring one or more of air pressure in the brake system, a rate of air flow in the brake system, a braking force of the brake system, a temperature of the brake system, a temperature of the vehicle consist, and/or a volume of air in the brake system.

In one aspect, the vehicles in the vehicle consist can be communicatively coupled by one or more cables, and the operational data can be communicated from the first vehicle to the one or more second vehicles via the one or more cables.

In one aspect, the one or more cables can include a multiple unit (MU) cable and the operational data can be communicated from the first vehicle to the one or more second vehicles via the MU cable.

In one aspect, the method also can include detecting a fault event onboard the first vehicle, where the loss of the operational data occurs responsive to detecting the fault event.

In one aspect, the method also can include communicating a request for the operational data that was lost from the first vehicle to the one or more second vehicles responsive to the loss of the operational data at the first vehicle.

In one aspect, the method also can include, onboard the one or more second vehicles, identifying recent operational data from among the operational data received from the first vehicle. The recent operational data can be received at the one or more second vehicles more recently than one or more other parts of the operational data received at the one or more second vehicles from the first vehicle. The recent operational data can be communicated from at least one of the one or more second vehicles responsive to receiving the request for the operational data.

In one aspect, the method also can include communicating at least part of the operational data received from the first vehicle between two or more of the second vehicles.

In another embodiment, a system (e.g., a communication system) includes a transceiver unit and a memory. The transceiver unit can be configured to be disposed onboard a first vehicle of a vehicle consist formed by the first vehicle and one or more second vehicles traveling together along a route. The transceiver unit also can be configured to obtain operational data associated with one or more control systems of the vehicle consist. The operational data can be configured to be used to determine an operational capability of the vehicle consist. The memory can be configured to be disposed onboard the first vehicle and to store the operational data obtained from the one or more second vehicles in the vehicle consist. The transceiver unit also can be configured to communicate the operational data from the first vehicle to at least one of the one or more second vehicles in the vehicle consist and, responsive to a loss of the operational data from the memory onboard the first vehicle, the transceiver unit can be configured to receive at least the operational data that was lost at the first vehicle from at least one of the one or more second vehicles. A controller can be configured to be disposed onboard the first vehicle and to determine the operational capability of the vehicle consist to perform a movement event using the at least the operational data that was lost at the first vehicle and communicated from the at least one of the one or more second vehicles to the first vehicle.

In one aspect, the one or more control systems can include a brake system of the vehicle consist, and the transceiver unit can be configured to receive one or more measured characteristics of the brake system as the operational data obtained from the one or more second vehicles in the vehicle consist. The controller can be configured to calculate a braking effectiveness rating of the vehicle consist as the operational capability of the vehicle consist.

In one aspect, the transceiver unit can be configured to receive one or more of air pressure in the brake system, a rate of air flow in the brake system, a braking force of the brake system, a temperature of the brake system, a temperature of the vehicle consist, and/or a volume of air in the brake system as the one or more measured characteristics.

In one aspect, the vehicles in the vehicle consist can be communicatively coupled by one or more cables, and the transceiver unit can be configured to communicate the operational data from the first vehicle and receive the at least the operational data that was lost to the first vehicle via the one or more cables.

In one aspect, the one or more cables can include a multiple unit (MU) cable and the transceiver unit can be configured to communicate the operational data from the first vehicle and receive the at least the operational data that was lost as one or more network data packets via the MU cable.

In one aspect, the system also can include plural additional transceiver units configured to be disposed on two or more of the second vehicles. The additional transceiver units can be configured to communicate at least part of the operational data received from the first vehicle between the two or more of the second vehicles.

In one aspect, the transceiver unit can be configured to communicate a request for the operational data that was lost from the first vehicle to the one or more second vehicles responsive to the loss of the operational data at the first vehicle.

In another embodiment, a system (e.g., a communication system) includes a controller and a brake sensing device. The controller can be configured to be disposed onboard a first (e.g., lead) vehicle in a vehicle consist that includes the first vehicle and one or more remote vehicles. The controller also can be configured to remotely control operation of the one or more remote vehicles to control movement of the vehicle consist. The brake sensing device can be configured to be disposed onboard the vehicle consist and to measure characteristic of an air brake system of the vehicle consist. The controller can be configured to store the characteristic of the air brake system that is measured by the brake sensing device and to communicate the characteristic of the air brake system to at least one of the remote vehicles for storage onboard the at least one of the remote vehicles. Responsive to a fault at the controller that causes loss of the characteristic of the air brake system at the controller of the first vehicle, the controller can be configured to receive, from the at least one of the remote vehicles, the characteristic of the air brake system that was communicated from the controller to the at least one of the remote vehicles.

In one aspect, the characteristic of the air brake system can include one or more of air pressure in the brake system, a rate of air flow in the brake system, a braking force of the brake system, a temperature of the brake system, a temperature of the vehicle consist, and/or a volume of air in the brake system.

In one aspect, the controller also can be configured to determine a brake effectiveness rating of the air brake system using the characteristic of the air brake system and the controller can be configured to prevent the movement of the vehicle consist responsive to the fault at the controller until at least a time at which the characteristic of the air brake system is received from the at least one of the remote vehicles and the controller determines that the brake effectiveness rating exceeds one or more designated thresholds.

In one aspect, the controller can be configured to communicate the characteristic of the air brake system to the at least one of the remote vehicles and to receive the characteristic of the air brake system from the at least one of the remote vehicles as one or more network data packets via a multiple unit (MU) cable extending along the vehicle consist.

An embodiment relates to a communication method for a consist comprising a plurality of vehicles. The method comprises linking the plurality of vehicles to establish a data network. For example, linking may include communicating over a communications path established between the vehicles, according to established protocols, in a manner that is designated for establishing the data network. The method further comprises designating a first vehicle of the plurality of vehicles as a network lead vehicle of the data network. The method further comprises designating a second vehicle of the plurality of vehicles as a network trail vehicle of the data network. The method further comprises communicating network data between the plurality of vehicles based at least in part on the first vehicle designated as the network lead vehicle and the second vehicle designated as the network trail vehicle.

In another embodiment, the method further comprises controlling operations of at least one of the plurality of vehicles based on the network data that is communicated.

In another embodiment, the method further comprises designating all vehicles of the plurality of vehicles other than the first vehicle as network trail vehicles and communicating the network data between the plurality of vehicles based at least in part on said all vehicles of the plurality of vehicles other than the first vehicle designated as the network trail vehicles.

In another embodiment of the method, the first vehicle is designated as the network lead vehicle based on one or more positions of one or more of the vehicles in the consist.

In another embodiment of the method, the first vehicle is designated as the network lead vehicle based on the first vehicle being a leading vehicle of the consist in a designated direction of travel of the consist.

In another embodiment of the method, the first vehicle is designated as the network lead vehicle based on a sequence of vehicles added to the consist.

In another embodiment of the method, the steps of designating the first vehicle as the network lead vehicle and designating the second vehicle as the network trail vehicle are carried out automatically subsequent to the plurality of vehicles being linked to establish the data network.

In another embodiment of the method, the step of designating the first vehicle as the network lead vehicle comprises configuring the first vehicle for operations as the network lead vehicle and communicating status information indicative of the first vehicle designated as the network lead vehicle to the second vehicle, and configuring the second vehicle for operations as the network trail vehicle.

In another embodiment, the method further comprises the first vehicle, responsive to the designation of the first vehicle as the network lead vehicle, at least one of configuring plural services available to entities in the data network or coordinating data traffic in the data network.

In another embodiment of the method, configuring the plural services comprises at least one of storing, creating, or updating at least one master routing table of the services.

In another embodiment, the method further comprises the first vehicle transitioning services between the plurality of vehicles.

In another embodiment, the method further comprises the first and second vehicles communicating setup data to one another. The first vehicle is designated as the network lead vehicle and the second is designated as the network trail vehicle based at least in part on the setup data. The step of communicating the setup data is carried out automatically subsequent to the plurality of vehicles being linked to establish the data network.

In another embodiment, the method further comprises, subsequent to a third vehicle being added to the consist: communicating setup data at least between the third vehicle and the first vehicle; and based on the setup data, either: designating the third vehicle as an additional network trail vehicle of the data network; or designating the third vehicle as the network lead vehicle in conjunction with designating the first vehicle as an additional network trail vehicle of the data network.

In an embodiment where the vehicles are rail vehicles (e.g., locomotives) in a rail vehicle consist, a communication method comprises linking the plurality of rail vehicles (e.g., locomotives) to establish a data network. The method further comprises designating a first rail vehicle (e.g., a first locomotive) of the plurality of rail vehicles (e.g., locomotives) as a network lead rail vehicle (e.g., network lead locomotive) of the data network. The method further comprises designating a second rail vehicle (e.g., a second locomotive) of the plurality of locomotives or other rail vehicles as a network trail rail vehicle (e.g., network trail locomotive) of the data network. The method further comprises communicating network data between the plurality of rail vehicles (e.g., locomotives) based at least in part on the first rail vehicle (e.g., first locomotive) designated as the network lead rail vehicle (e.g., network lead locomotive) and the second rail vehicle (e.g., second locomotive) designated as the network trail rail vehicle (e.g., network trail locomotive).

In another embodiment, the method further comprises controlling operations of at least one of the plurality of rail vehicles (e.g., locomotives) based on the network data that is communicated.

In another embodiment, the method further comprises designating all rail vehicles (e.g., locomotives) of the plurality of rail vehicles (e.g., locomotives) other than the first rail vehicle (e.g., first locomotive) as network trail rail vehicles (e.g., network trail locomotives) and communicating the network data between the plurality of rail vehicles (e.g., locomotives) based at least in part on said all rail vehicles (e.g., locomotives) of the plurality of rail vehicles (e.g., locomotives) other than the first rail vehicle (e.g., first locomotive) designated as the network trail rail vehicles (e.g., network trail locomotives).

In another embodiment of the method, the first rail vehicle (e.g., first locomotive) is designated as the network lead rail vehicle (e.g., network lead locomotive) based on one or more positions of one or more of the rail vehicles (e.g., locomotives) in the consist.

In another embodiment of the method, the first rail vehicle (e.g., first locomotive) is designated as the network lead rail vehicle (e.g., network lead locomotive) based on the first rail vehicle (e.g., first locomotive) being a leading rail vehicle (e.g., leading locomotive) of the consist in a designated direction of travel of the consist.

In another embodiment of the method, the first rail vehicle (e.g., first locomotive) is designated as the network lead rail vehicle (e.g., network lead locomotive) based on a sequence of rail vehicles (e.g., locomotives) added to the consist.

In another embodiment of the method, the steps of designating the first rail vehicle (e.g., first locomotive) as network lead rail vehicle (e.g., network lead locomotive) and designating the second rail vehicle (e.g., second locomotive) as the network trail rail vehicle (e.g., network trail locomotive) are carried out automatically subsequent to the plurality of rail vehicles (e.g., locomotives) being linked to establish the data network.

In another embodiment of the method, the step of designating the first rail vehicle (e.g., first locomotive) as the network lead rail vehicle (e.g., network lead locomotive) comprises configuring the first rail vehicle (e.g., first locomotive) for operations as the network lead rail vehicle (e.g., network lead locomotive) and communicating status information indicative of the first rail vehicle (e.g., first locomotive) designated as the network lead rail vehicle (e.g., network lead locomotive) to the second rail vehicle (e.g., second locomotive), and configuring the second rail vehicle (e.g., second locomotive) for operations as the network trail rail vehicle (e.g., network trail locomotive).

In another embodiment, the method further comprises the first rail vehicle (e.g., first locomotive), responsive to the designation of the first rail vehicle (e.g., first locomotive) as the network lead rail vehicle (e.g., network lead locomotive), at least one of configuring plural services available to entities in the data network or coordinating data traffic in the data network. In another embodiment of the method, configuring the plural services comprises at least one of storing, creating, or updating at least one master routing table of the services.

In another embodiment, the method further comprises the first rail vehicle (e.g., first locomotive) controlling transitioning services between the plurality of rail vehicles (e.g., locomotives).

In another embodiment, the method further comprises the first and second rail vehicles (e.g., first and second locomotives) communicating setup data to one another. The first rail vehicle (e.g., first locomotive) is designated as the network lead rail vehicle (e.g., network lead locomotive) and the second is designated as the network trail rail vehicle (e.g., network trail locomotive) based at least in part on the setup data. The step of communicating the setup data is carried out automatically subsequent to the plurality of rail vehicles (e.g., locomotives) being linked to establish the data network.

In another embodiment, the method further comprises, subsequent to a third locomotive or other rail vehicle being added to the consist: communicating setup data at least between the third locomotive (or other rail vehicle) and the first rail vehicle (e.g., first locomotive); and based on the setup data, either: designating the third locomotive (or other rail vehicle) as an additional network trail rail vehicle (e.g., additional network trail locomotive) of the data network; or designating the third locomotive (or other rail vehicle) as the network lead rail vehicle (e.g., network lead locomotive) in conjunction with designating the first rail vehicle (e.g., first locomotive) as an additional network trail rail vehicle (e.g., additional network trail locomotive) of the data network.

Another embodiment relates to a communication system (e.g., for a vehicle consist) comprising a first controller unit configured for operative coupling in a first vehicle. The first controller unit is configured, when the first vehicle is linked with one or more second vehicles in a data network of a consist, to designate one of the first vehicle or one of the one or more second vehicles as a network lead vehicle of the data network and to designate all other vehicles in the consist as network trail vehicles of the data network. The first controller unit is further configured to control communications of network data between the first vehicle and the one or more second vehicles based at least in part on the network lead vehicle and network trail vehicle designations.

In another embodiment of the communication system, the first controller unit is configured to designate the network lead vehicle and the network trail vehicles according to at least one parameter of the consist. The at least one parameter comprises one or more of a position of the first vehicle relative to the one or more second vehicles in the consist, a sequence of vehicles added to the consist, or an identification of which vehicle in the consist is a leading vehicle of the consist in a designated direction of travel.

In another embodiment of the communication system, the first controller unit is configured to automatically control communication of setup data between the first vehicle and the one or more second vehicles subsequent to establishment of the data network in the consist. The first controller unit is configured to designate the network lead vehicle and the network trail vehicles based at least in part on the setup data. In another embodiment of the communication system, the first controller unit is configured to designate the network lead vehicle and the network trail vehicles according to at least one parameter of the consist. Further, information of the parameter is included in the setup data, and the at least one parameter comprises one or more of a position of the first vehicle relative to the one or more second vehicles in the consist, a sequence of vehicles added to the consist, or an identification of which vehicle in the consist is a leading vehicle of the consist in a designated direction of travel.

In another embodiment of the communication system, the first controller is configured, when the first vehicle is designated as the network lead vehicle, to at least one of configure plural services available to entities in the data network or coordinate data traffic in the data network.

Another embodiment relates to a communication system (e.g., for a train or other rail vehicle consist) comprising a first controller unit configured for operative coupling in a first rail vehicle (e.g., a first locomotive). The first controller unit is configured, when the first rail vehicle (e.g., first locomotive) is linked with one or more second rail vehicles (e.g., one or more second locomotives) in a data network of a consist, to designate one of the first rail vehicle (e.g., first locomotive) or one of the one or more second rail vehicles (e.g., one of the one or more second locomotives) as a network lead rail vehicle (e.g., network lead locomotive) of the data network and to designate all other rail vehicles (e.g., locomotives) in the consist as network trail rail vehicles (e.g., network trail locomotives) of the data network. The first controller unit is further configured to control communications of network data between the first rail vehicle (e.g., first locomotive) and the one or more second rail vehicles (e.g., one or more second locomotives) based at least in part on the network lead rail vehicle (e.g., network lead locomotive) and network trail rail vehicle (e.g., network trail locomotive) designations.

In another embodiment of the communication system, the first controller unit is configured to designate the network lead rail vehicle (e.g., network lead locomotive) and the network trail rail vehicles (e.g., network trail locomotives) according to at least one parameter of the consist. The at least one parameter comprises one or more of a position of the first rail vehicle (e.g., first locomotive) relative to the one or more second rail vehicles (e.g., one or more second locomotives) in the consist, a sequence of rail vehicles (e.g., locomotives) added to the consist, or an identification of which locomotive or other rail vehicle in the consist is a leading locomotive or other rail vehicle of the consist in a designated direction of travel.

In another embodiment of the communication system, the first controller unit is configured to automatically control communication of setup data between the first rail vehicle (e.g., first locomotive) and the one or more second rail vehicles (e.g., one or more second locomotives) subsequent to establishment of the data network in the consist. The first controller unit is configured to designate the network lead rail vehicle (e.g., network lead locomotive) and the network trail rail vehicles (e.g., network trail locomotives) based at least in part on the setup data. In another embodiment of the communication system, the first controller unit is configured to designate the network lead rail vehicle (e.g., network lead locomotive) and the network trail rail vehicles (e.g., network trail locomotives) according to at least one parameter of the consist. Further, information of the parameter is included in the setup data, and the at least one parameter comprises one or more of a position of the first rail vehicle (e.g., first locomotive) relative to the one or more second rail vehicles (e.g., one or more second locomotives) in the consist, a sequence of rail vehicles (e.g., locomotives) added to the consist, or an identification of which locomotive or other rail vehicle in the consist is a leading locomotive or other rail vehicle of the consist in a designated direction of travel.

In another embodiment of the communication system, the first controller is configured, when the first rail vehicle (e.g., first locomotive) is designated as the network lead rail vehicle (e.g., network lead locomotive), to at least one of configure plural services available to entities in the data network or coordinate data traffic in the data network.

In another embodiment of a communication system, the communication system comprises a first controller unit configured for operative coupling in a first vehicle. The first controller unit is configured, when the first vehicle is linked with one or more second vehicles in a data network of a consist, to enter a first designated mode of operation responsive to communications between the first vehicle and the one or more second vehicles for selecting the first vehicle to operate in the first designated mode of operation and the one or more second vehicles to operate in a different, second designated mode of operation. The first controller unit is further configured, when in the first designated mode of operation, to at least one of: coordinate data traffic in the data network of the consist; and/or configure and manage services available to plural entities of the data network of the consist.

In another embodiment of a communication system, the communication system comprises a first controller unit configured for operative coupling in a first locomotive or other first rail vehicle. The first controller unit is configured, when the first locomotive (or other first rail vehicle) is linked with one or more second vehicles (e.g., one or more second locomotives) in a data network of a consist, to enter a first designated mode of operation responsive to communications between the first locomotive (or other first rail vehicle) and the one or more second rail vehicles (e.g., one or more second locomotives) for selecting the first rail vehicle (e.g., first locomotive) to operate in the first designated mode of operation and the one or more second rail vehicles (e.g., one or more second locomotives) to operate in a different, second designated mode of operation. The first controller unit is further configured, when in the first designated mode of operation, to at least one of: coordinate data traffic in the data network of the consist; and/or configure and manage services available to plural entities of the data network of the consist.

In an embodiment, a method for communications in a vehicle consist (e.g., a locomotive or other rail vehicle consist) comprises determining that a first vehicle in the vehicle consist (e.g., a first locomotive or other first rail vehicle) has a network address (e.g., a first IP address) that is the same as a network address (e.g., a second IP address) of a second vehicle in the vehicle consist (e.g., a second locomotive or other second rail vehicle). The method further comprises identifying a first unused network address (e.g., generating, calculating, determining, or the like), and communicating signals for assignment of the first unused network address to one of the first vehicle or the second vehicle. By referring to a vehicle having a network address, this includes: the vehicle itself having the network address associated with the vehicle; and/or that a component of the vehicle capable of network communications has the network address assigned, determined, or otherwise associated with it.

In another embodiment, the method further comprises assigning the network address of the first vehicle and/or the network address of the second vehicle based on a first MAC (media access control) address associated with a data network of the vehicle consist. (In other words, according to one aspect, the first and second network addresses may be initially generated based on the first MAC address.) The unused network address is identified based on a different, second MAC address associated with the data network.

In another embodiment, the method further comprises identifying a second unused network address based on the second MAC address, and communicating second signals for assignment of the second unused network address to the other of the one of the first vehicle or the second vehicle (i.e., to whichever of the vehicles was not assigned the first unused network address).

In another embodiment, the method further comprises determining a difference between dynamic (i.e., changing or changeable) operational states of network equipment (e.g., signal levels) of the first vehicle and network equipment of the second vehicle. The first unused network address is determined based at least in part on the difference that is determined.

In another embodiment, the method further comprises determining a difference between dynamic operational states of network equipment of the first vehicle and network equipment of the second vehicle, wherein the first vehicle or the second vehicle to which the first unused network address is assigned is selected based at least in part on the difference that is determined.

In another embodiment, the method further comprises assigning the network address of the first vehicle and/or the network address of the second vehicle based at least in part on at least one vehicle identifier associated with at least one of the first vehicle or the second vehicle. For example, the vehicle identifiers may be locomotive road numbers, automobile VIN's, fleet numbers, license plate numbers, or the like.

In another embodiment, the method further comprises communicating data to the first vehicle and/or to the second vehicle based on the first unused network address assigned to the first vehicle or the second vehicle and on the network address of the other of the first vehicle or the second vehicle.

In another embodiment, the method further comprises controlling the vehicle consist for movement along a route based on the data that is communicated to the first vehicle and/or the second vehicle.

In another embodiment, the first unused network address that is assigned to the first vehicle or the second vehicle and the network address of the other of the first vehicle or the second vehicle are associated with a same subnet (e.g., WAN-type subnet) of a data network of the vehicle consist.

In another embodiment, the first unused network address is identified by listening to a channel of a data network of the vehicle consist (e.g., processing incoming data indicative that the unused network address is available).

In another embodiment, a method for communications in a vehicle consist (e.g., a locomotive or other rail vehicle consist) comprises determining (e.g., calculating, identifying, allocating, or the like) a first network address (e.g., a first IP address) for a first vehicle in the vehicle consist (e.g., a first locomotive or other first rail vehicle) and a second network address (e.g., a second IP address) for a second vehicle in the vehicle consist (e.g., a second locomotive or other second rail vehicle). The first vehicle and the second vehicle are linked in a data network. The method further comprises identifying a conflict between the first network address and the second network address. For example, the conflict might be that the first network address is the same as the second network address. Responsive to identifying the conflict, the method further comprises selecting the first vehicle for network address re-assignment (i.e., one of the first vehicle or the second vehicle is selected, and in this example it is the first vehicle that is selected). The method further comprises determining a third network address that is not in conflict with the second network address of the second vehicle, and assigning the third network address to the first vehicle in place of the first network address. Data is communicated in the data network based at least in part on the second network address and the third network address.

In another embodiment, the first network address and the second network address are determined based on a first MAC address associated with the data network. The third network address is determined based on a different, second MAC address associated with the data network.

In another embodiment, the method further comprises identifying a fourth network address based on the second MAC address, and assigning the fourth network address to the second vehicle in place of the second network address.

In another embodiment, the method further comprises determining at least one of the first network address, the second network address, or the third network address based at least in part on at least one vehicle identifier associated with at least one of the first vehicle or the second vehicle.

In another embodiment, the method further comprises controlling the vehicle consist for movement along a route based on the data that is communicated.

In another embodiment, a method for communications in a vehicle consist (e.g., a locomotive or other rail vehicle consist) comprises determining that a first vehicle in the vehicle consist (e.g., a first locomotive or other first rail vehicle) has a first network address that is the same as a second network address of a second vehicle in the vehicle consist (e.g., a second locomotive or other second rail vehicle). The first vehicle and the second vehicle are linked in a network. The method further comprises identifying an unused network address of the network, and communicating signals for assignment of the unused network address to one of the first vehicle or the second vehicle.

In another embodiment of the method, the determining step is automatically carried out responsive to when the first and second vehicles are linked and communicate to establish the network.

In another embodiment, the method further comprises, at the one of the first vehicle or the second vehicle to which the signals are communicated, using the unused network address in place of the first network address or the second network address, as applicable, for communications in the network.

In another embodiment, a method for communications in a vehicle consist (e.g., a locomotive or other rail vehicle consist) comprises generating first and second network addresses for first and second vehicles in the consist, respectively, based on at least one of vehicle identifiers respectively associated with the first and second vehicles and/or a first MAC address associated with a data network. (The vehicles of the vehicle consist are linked to form the data network, for data communications with the consist.) The method further comprises, if the first and second network addresses are the same: generating third and fourth network addresses for the first and second vehicles, respectively, based on a different, second MAC address associated with the data network (e.g., the third and fourth network addresses are used in place of the first and second network addresses); and/or determining a third network address that is different from the first and second network addresses, and assigning the third network address to the first vehicle or to the second vehicle.

Another embodiment relates to a system for communications in a vehicle consist (e.g., a locomotive or other rail vehicle consist). The system comprises a conflict determination module configured for communication with a first vehicle (e.g., a first locomotive or other first rail vehicle) having a first network address (e.g., a first IP address) and a second vehicle (e.g., a second locomotive or other second rail vehicle) having a second network address (e.g., a second IP address). The conflict determination module is further configured to determine if the first network address is the same as the second network address. The system further comprises a control module configured for deployment on at least one of the first vehicle or the second vehicle and further configured to identify an unused network address. The control module is configured to assign the unused network address to one of the first vehicle or the second vehicle if the conflict determination module determines that the first network address is the same as the second network address.

In another embodiment of the system, the conflict determination module and the control module are integrated into a single unit.

In another embodiment of the system, the unused network address is identified (e.g., determined, generated, or the like) and/or assigned at least in part by one or more of the following: assessing communications of data on a channel of the network for the unused network address; using a different MAC address entry for identifying the unused network address in event of a conflict for the conflicting vehicles; and/or using signal level or any other dynamic but designated factor in determining which of the first or second vehicles to communicate the signals to for assignment of the unused network address.

As noted, in any of the embodiments, the network addresses may be IP addresses.

Another embodiment relates to a communication method. The method comprises, in a vehicle consist comprising a plurality of vehicles connected in a data network, storing in a first vehicle of the consist a list of available services that are available across one or more of the vehicles of the consist connected in the data network. For example, the services may comprise functions that can be performed by available devices of the network, which process, communicate, or otherwise use network data. (As noted above, "available" service or device refers to a service or device that is operably connected for potentially using network data that is communicated in the data network, not necessarily that the service or device is currently operational for doing so.) The method further comprises, at the first vehicle, communicating first information of the list of available services to other vehicles in the consist.

In another embodiment, the communication method further comprises, at the first vehicle, receiving second information of the available services, and creating and/or revising the list based on the received second information.

In another embodiment, the communication method further comprises, at the first vehicle, periodically transmitting control signals to other vehicles in the consist, and receiving the second information responsive to the control signals.

In another embodiment, the communication method further comprises one or more of the vehicles in the consist periodically transmitting the second information to the first vehicle.

In another embodiment, the communication method further comprises routing data within the data network of the vehicle consist based on the list of available services. The method may further comprise controlling the vehicle consist for travel along a route based at least in part on the data.

In another embodiment, the communication method further comprises receiving a request for the list of available services from a network device in the consist, and communicating the first information to the network device responsive to receiving the request.

In another embodiment, the communication method further comprises storing information of available devices that are available across one or more of the vehicles of the consist connected in the data network.

In another embodiment, the communication method further comprises storing, for one or more of the available services, respective failover information indicative of services and/or devices in the data network that are substantially equivalent to the one or more of the available services. The method further comprises routing data based on the failover information if one of the one or more available services ceases to become available. The data may be routed to a different vehicle in the consist than a designated recipient vehicle of the consist (i.e., the data may be routed to a vehicle other than the vehicle to which the data is addressed).

In another embodiment, the communication method further comprises monitoring plural available devices of the vehicles of the consist to determine respective operational statuses of the available devices, and maintaining the list of available services based at least in part on the operational statuses of the available devices that are monitored.

In another embodiment of a communication method in a vehicle consist comprising a plurality of vehicles linked together in a data network, the method comprises monitoring plural available devices of the vehicles in the consist to determine respective operational statuses of the plural available devices. The method further comprises maintaining information of the operational statuses of the plural available devices in a database, and communicating the information of the operational statuses to the plural vehicles in the consist.

In another embodiment, the communication method further comprises routing data in the data network of the vehicle consist based at least in part on the information of the operational statuses of the plural available devices. For example, the data may be routed to a second, substantially equivalent available device of the consist if a first available device to which the data is addressed is non-operational.

In another embodiment of the communication method, monitoring the plural available devices of the vehicles in the consist comprises receiving information relating to the plural available devices from the vehicles. Additionally or alternatively, the information of the operational statuses may be communicated to the plural vehicles in the consist responsive to receiving requests from the plural vehicles.

In another embodiment of a communication method in a vehicle consist comprising a plurality of vehicles linked together in a data network, the method comprises receiving information of respective operational statuses of plural available devices and/or services of the vehicles in the consist. The method further comprises maintaining information of the operational statuses of the plural available devices and/or services in a database, communicating the information of the operational statuses to the plural vehicles in the consist, and routing data in the data network based at least in part on the information of the operational statuses.

Another embodiment relates to a communication system. The system comprises a monitoring device configured for deployment on board a vehicle consist having a plurality of vehicles linked together in a data network. The monitoring device is further configured to communicate with plural available devices of the vehicles for determining respective operational statuses of the available devices. The monitoring device is further configured to store information of the operational statuses of the available devices (e.g., the information may be stored in a database that is operably coupled to the monitoring device). The system further comprises a signal transmitting device configured for deployment on board the vehicle consist, and further configured to communicate the information of the operational statuses of the available devices to the plural vehicles and/or to route network data based on the information of the operational statuses of the available devices.

In another embodiment of the communication system, the signal transmitting device is configured to route the network data to a substantially equivalent device of the plural available devices if an available device to which the network data is addressed enters a failure state. As noted above, failure state means incapable of performing a designated function at all, or incapable of performing the designated function above designated performance level threshold(s).

In another embodiment of the communication system, the monitoring device is a simple network management protocol (SNMP) supported router.

Another embodiment relates to a method for communications in a vehicle consist. The method comprises monitoring respective operational statuses of a plurality of network channels across a plurality of vehicles in the consist, and routing messages through one or more of the network channels in dependence upon the monitored operational statuses of the network channels.

In another embodiment of the method, the plurality of network channels comprises at least one channel of a first network and at least one channel of a second network. The first and second networks are at least logically distinct.

In another embodiment of the method, the first network and the second network are established by way of at least one of: the first network having a first physical pathway that is different than a second physical pathway of the second network; the first network having a first network key that is different than a second network key of the second network; and/or the first network having a first data encryption that is different than a second data encryption of the second network.

In another embodiment, the method further comprises splitting the messages across the plurality of network channels, and re-ordering the messages based on a time-stamp to maintain an order of the messages. (In the case of plural networks, the messages are split across the plural network channels of the plural networks.) Splitting includes transmitting some messages across one channel and other messages across other channels, and/or transmitting some data packets of a message across one channel and other data packets of the message across a different, second channel.

In another embodiment, the method further comprises routing the messages through the at least one channel of the first network only, unless the at least one channel of the first network is unavailable, in which case the method comprises routing the messages through the at least one channel of the second network.

In another embodiment, the method further comprises filtering duplicates of the messages and duplicate portions of the messages that are routed over plural of the network channels. More specifically, if in communicating over the plural network channels message and/or packet duplication occurs, duplicate messages and packets are identified and deleted.

In another embodiment, the method further comprises maintaining the operational statuses of the plurality of network channels in a database. In another embodiment, alternatively or additionally, the method further comprises communicating the operational statuses to the plurality of vehicles.

In another embodiment of a method for communications in a vehicle consist, the method comprises monitoring respective operational statuses of a first network and a second network of the vehicle consist. The first and second networks are at least logically distinct. The method further comprises routing messages through the first network and the second network based at least in part on the monitored operational statuses of the first network and the second network.

In another embodiment of the method, if the first network and the second network are operational, the method comprises at least one of routing the messages through the first network only, or splitting the messages for routing over both the first network and the second network. On the other hand, if the first network is non-operational, the messages are routed through the second network.

In another embodiment of the method, the method further comprises re-ordering the messages that are split for routing over both the first network and the second network based on a time-stamp to maintain an order of the messages.

In another embodiment of the method, the method further comprises filtering duplicates of the messages and duplicate portions of the messages that are routed over both the first network and the second network.

In another embodiment of a method for communications in a vehicle consist, the method comprises, at a first vehicle of the vehicle consist, transmitting and/or receiving first signals of a first network established between the first vehicle and one or more second vehicles of the vehicle consist. The method further comprises, at the first vehicle, transmitting and/or receiving second signals of a second network established between the first vehicle and one or more second vehicles of the vehicle consist. The first and second networks are at least logically distinct. In another embodiment, a system comprises a communication unit comprising one or more hardware and/or software modules configured for transmitting and/or receiving first and second signals according to: at a first vehicle of the vehicle consist, transmitting and/or receiving first signals of a first network established between the first vehicle and one or more second vehicles of the vehicle consist; and at the first vehicle, transmitting and/or receiving second signals of a second network established between the first vehicle and one or more second vehicles of the vehicle consist.

In another embodiment of the method, the first and second networks have a plurality of network channels, and the method further comprises monitoring respective operational statuses of the plurality of network channels across the plurality of vehicles in the consist, and routing messages through one or more of the network channels in dependence upon the monitored operational statuses of the network channels.

In another embodiment, the method further comprises translating the first signals for transmission as the second signals over the second network.

In another embodiment, the method further comprises tracking whether the first network and the second network are operational in the second vehicles, and routing the first signals and/or the second signals based on the tracking.

Another embodiment relates to a system for communications in a vehicle consist. The system comprises a routing unit configured for communication across a first plurality of communication channels associated with a first vehicle of the vehicle consist and a second plurality of communication channels associated with a second vehicle of the vehicle consist. The routing unit is configured for deployment on board one of the first vehicle or the second vehicle. The routing unit is further configured for routing a message through at least one of the first plurality of communication channels and at least one of the second plurality of channels in dependence upon respective operational statuses of the first and second pluralities of communication channels.

In an embodiment, a system includes a routing unit (data router) having an electrical output and communication circuitry coupled to the electrical output. The electrical output is configured for electrical connection inside a first vehicle to an inter-vehicle infrastructure that interconnects the first vehicle to a second vehicle in a vehicle consist. The routing unit is configured to route data across the inter-vehicle infrastructure over at least first and second logically separate networks, based on respective determined operational statuses of the first and second logically separate networks.

In an embodiment, a system includes a routing unit having an electrical output and communication circuitry coupled to the electrical output. The electrical output is configured for electrical connection inside a first vehicle to an inter-vehicle infrastructure that interconnects the first vehicle to a second vehicle in a vehicle consist. The routing unit is configured to route data across the inter-vehicle infrastructure over at least first and second logically separate networks, based on respective determined operational statuses of the first and second logically separate networks. The routing unit is configured to communicate over the first logically separate network using network data addresses having a most-significant bit-group with a first network prefix and to communicate over the second logically separate network using network data addresses having the most-significant bit-group with a second network prefix that is different than the first network prefix.

Although embodiments are set forth herein in regards to router transceiver units, aspects of such embodiments may also be applicable to routers/routing units more generally.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a controller configured to be disposed onboard a first vehicle in a vehicle consist that includes the first vehicle and one or more remote vehicles that are wirelessly communicatively linked with the first vehicle by plural wireless communication channels for the first vehicle and the one or more remote vehicles to travel together along a route; and
plural brake sensing devices configured to be disposed onboard the first vehicle and the one or more remote vehicles and to measure characteristics of plural brake systems of the first vehicle and the one or more remote vehicles,
wherein the controller is configured to receive brake system data of the characteristics of the brake systems that are measured by the brake sensing devices and to communicate with the one or more remote vehicles for coordinated movement of the vehicle consist along the route based at least in part on the received brake system data.

2. The system of claim 1, wherein the plural wireless communication channels include first and second wireless communication channels, and the controller is configured to:
check an integrity of the second wireless communication channel;
receive the brake system data from the one or more remote vehicles and communicate with the one or more remote vehicles over the first wireless communication channel; and
switch to receiving the brake system data from the one or more remote vehicles and communicating with the one or more remote vehicles over the second wireless communication channel responsive to the first wireless communication channel becoming unavailable.

3. The system of claim 1, wherein the first vehicle and the one or more remote vehicles are rail vehicles.

4. The system of claim 1, wherein the first vehicle and the one or more remote vehicles are automobiles.

5. A system comprising:
a controller configured to be disposed onboard a first vehicle in a vehicle consist that includes the first vehicle and one or more remote vehicles that are wirelessly communicatively linked with the first vehicle by plural wireless communication channels for the first vehicle and the one or more remote vehicles to travel together along a route; and
plural brake sensing devices configured to be disposed onboard the first vehicle and the one or more remote vehicles and to measure characteristics of plural brake systems of the first vehicle and the one or more remote vehicles,
wherein the controller is configured to receive brake system data of the characteristics of the brake systems that are measured by the brake sensing devices and to communicate with the one or more remote vehicles for coordinated movement of the vehicle consist based at least in part on the received brake system data, and
wherein the controller is further configured to allocate a bandwidth of at least one of the plural wireless communication channels into a safety category, a control category, and an informational category, wherein data in the safety category, including a first portion of the brake system data, is given at least one of a larger portion of the bandwidth or a higher priority than communications in the control and informational categories, and data in the control category, including a different, second portion of the brake system data, is given at least one of a larger portion of the bandwidth or a higher priority than communications in the informational category, and data in the informational category is given at least one of a smallest portion of the bandwidth or a lowest priority than communications in the safety and control categories.

6. The system of claim 5, wherein the first vehicle and the one or more remote vehicles are rail vehicles.

7. The system of claim 5, wherein the first vehicle and the one or more remote vehicles are automobiles.

8. A communication system comprising:
a bandwidth module configured to allocate different portions of a data communication bandwidth of a communication pathway to data signals that include data received from one or more data sources disposed on board plural vehicles of a vehicle consist, wherein the allocation is based on categories of the data, the categories representing at least one of the one or more data sources or contents of the data, and wherein the plural vehicles are in wireless for coordinated travel along a route; and
a transceiver module configured to transmit the data signals through the communication pathway using the portions of the bandwidth that are allocated to the data signals, wherein the data signals include brake system data of brake systems of the plural vehicles.

9. The system of claim 8, further comprising a prioritization module configured to assign different priority ranks to the data signals based on the categories of the data included in the data signals, wherein the bandwidth module is configured to allocate the portions of the data communication bandwidth based on the priority ranks of the data signals.

10. The system of claim 8, wherein the categories of the data include:
a first category comprising data associated with controlling propulsion systems of the plural vehicles;
a second category comprising data associated with enforcement of a safety limitation on operations of the plural vehicles;
a third category comprising data representative of information about at least one of a state or condition of one or more of the plural vehicles; and
a fourth category comprising data used by one or more software applications, wherein the brake system data is in at least one of the first category or the second category.

11. The system of claim 8, wherein the different portions of the data communication bandwidth represent at least one of different physical portions of the communication pathway or subsets of a range of frequencies available for communicating the data signals through the communication pathway.

12. The system of claim 8, wherein the bandwidth module is configured to allocate physical portions of the data communication bandwidth among the categories of the data included in the data signals.

13. The system of claim 8, wherein the bandwidth module is configured to dynamically allocate the portions of the data communication bandwidth among the categories of the data included in the data signals.

14. The system of claim 13, wherein the bandwidth module is configured to dynamically allocate the portions of the data communication bandwidth by changing respective amounts of the data communication bandwidth in a plurality of the portions one or more times during movement of the vehicle consist.

15. The system of claim 13, wherein the bandwidth module is configured to dynamically allocate the portions of the data communications bandwidth based on at least one of an operating condition of one or more of the plural vehicles, a failure rate of communication between the plural vehicles, or an amount of available data communication bandwidth on the communication pathway.

16. The system of claim 8, further comprising an input module configured to be operatively coupled with at least one of the bandwidth module or the transceiver module and further configured to receive the data from the one or more data sources disposed on board the vehicle consist.

17. The system of claim 8, wherein the vehicles are rail vehicles.

18. The system of claim 8, wherein the vehicles are automobiles.

* * * * *